United States Patent
Roberts et al.

(10) Patent No.: US 11,507,516 B2
(45) Date of Patent: Nov. 22, 2022

(54) ADAPTIVE CACHE PARTITIONING

(71) Applicant: Micron Technology, Inc., Boise, ID (US)

(72) Inventors: David Andrew Roberts, Wellesley, MA (US); Joseph Thomas Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 175 days.

(21) Appl. No.: 16/997,811

(22) Filed: Aug. 19, 2020

(65) Prior Publication Data

US 2022/0058132 A1    Feb. 24, 2022

(51) Int. Cl.
*G06F 12/00* (2006.01)
*G06F 13/00* (2006.01)
*G06F 13/28* (2006.01)
*G06F 12/0895* (2016.01)
*G06F 12/0862* (2016.01)

(52) U.S. Cl.
CPC ...... *G06F 12/0895* (2013.01); *G06F 12/0862* (2013.01); *G06F 2212/1021* (2013.01); *G06F 2212/282* (2013.01); *G06F 2212/602* (2013.01)

(58) Field of Classification Search
CPC ............. G06F 12/0895; G06F 12/0862; G06F 2212/1021; G06F 2212/282; G06F 2212/602
USPC .......................................................... 711/137
See application file for complete search history.

(56) References Cited

U.S. PATENT DOCUMENTS

| | | | |
|---|---|---|---|
| 5,721,874 A | 2/1998 | Carnevale et al. | |
| 7,873,791 B1 * | 1/2011 | Yu | G06F 12/0862 711/144 |
| 9,767,028 B2 | 9/2017 | Cheng et al. | |
| 9,769,030 B1 * | 9/2017 | Ramalingam | H04L 67/535 |
| 10,001,927 B1 | 6/2018 | Trachtman et al. | |
| 11,294,808 B2 | 4/2022 | Roberts et al. | |

(Continued)

FOREIGN PATENT DOCUMENTS

| KR | 20170028228 | 3/2017 |
|---|---|---|
| WO | 2021236800 | 11/2021 |

OTHER PUBLICATIONS

"Final Office Action", U.S. Appl. No. 16/937,671, dated Nov. 16, 2021, 16 pages.

(Continued)

*Primary Examiner* — Edward J Dudek, Jr.
*Assistant Examiner* — Sidney Li
(74) *Attorney, Agent, or Firm* — Colby Nipper PLLC

(57) ABSTRACT

Described apparatuses and methods partition a cache memory based, at least in part, on a metric indicative of prefetch performance. The amount of cache memory allocated for metadata related to prefetch operations versus cache storage can be adjusted based on operating conditions. Thus, the cache memory can be partitioned into a first portion allocated for metadata pertaining to an address space (prefetch metadata) and a second portion allocated for data associated with the address space (cache data). The amount of cache memory allocated to the first portion can be increased under workloads that are suitable for prefetching and decreased otherwise. The first portion may include one or more cache units, cache lines, cache ways, cache sets, or other resources of the cache memory.

29 Claims, 15 Drawing Sheets

(56) References Cited

U.S. PATENT DOCUMENTS

| | | | |
|---|---|---|---|
| 2008/0005466 | A1 | 1/2008 | Lubbers et al. |
| 2009/0172293 | A1 | 7/2009 | Sun |
| 2010/0228941 | A1 | 9/2010 | Koob et al. |
| 2010/0306222 | A1 | 12/2010 | Freedman et al. |
| 2012/0054443 | A1 | 3/2012 | Nakra |
| 2012/0124318 | A1 | 5/2012 | Bivens et al. |
| 2012/0278560 | A1 | 11/2012 | Benzion et al. |
| 2013/0138892 | A1 | 5/2013 | Loh et al. |
| 2014/0028693 | A1 | 1/2014 | Wang et al. |
| 2016/0154750 | A1* | 6/2016 | Park .................. G06F 3/061 |
| | | | 711/153 |
| 2016/0227236 | A1 | 8/2016 | Matsumoto et al. |
| 2016/0364146 | A1* | 12/2016 | Kuttner .............. G06F 3/0644 |
| 2017/0116118 | A1 | 4/2017 | Artieri et al. |
| 2017/0142217 | A1 | 5/2017 | Misra et al. |
| 2017/0192887 | A1 | 7/2017 | Herdrich et al. |
| 2017/0212837 | A1 | 7/2017 | Breternitz |
| 2018/0285278 | A1 | 10/2018 | Appu et al. |
| 2019/0087341 | A1 | 3/2019 | Pugsley et al. |
| 2019/0258579 | A1* | 8/2019 | Carey ............... G06F 12/0873 |
| 2021/0365376 | A1 | 11/2021 | Roberts et al. |
| 2022/0019530 | A1 | 1/2022 | Roberts |
| 2022/0019537 | A1 | 1/2022 | Roberts |
| 2022/0222180 | A1 | 7/2022 | Roberts et al. |

OTHER PUBLICATIONS

"Final Office Action", U.S. Appl. No. 16/928,932, dated Nov. 18, 2021, 21 pages.

"Notice of Allowance", U.S. Appl. No. 16/880,248, dated Nov. 24, 2021, 6 pages.

"Radix Tree", retrieved from https://en.wikipedia.org/wiki/Radix_tree on Jan. 27, 2020, 8 pages.

Gervasi, "Overcoming System Memory Challenges with Persistent Memory and NVDIMM-P", JEDEC Server Forum 2017, Jan. 2017, 14 pages.

Hashemi, et al., "Learning Memory Access Patterns", retrieved from https://arxiv.org/pdf/1803.02329.pdf on Jan. 27, 2020, Mar. 6, 2018, 15 pages.

Nesbit, et al., "AC/DC: An Adaptive Data Cache Prefetcher", University of Wisconsin—Madison; Department of Electrical and Computer Engineering; In Proceedings of the 13th International Conference on Parallel Architectures and Compilation Techniques (PACT '04); IEEE Society, Jan. 2004, 11 pages.

Rothman, et al., "Sector Cache Design and Performance", Report No. UCB/CSD-99-1034; Computer Science Division (EECS); University of California, Jan. 1999, 63 pages.

Shi, et al., "Dynamic Page Size Adjustment in Operating System", IEEE; 2016 International Conference on Information System and Artificial Intelligence, Jun. 2016, 5 pages.

"Notice of Allowance", U.S. Appl. No. 16/928,932, dated Mar. 22, 2022, 9 pages.

"Notice of Allowance", U.S. Appl. No. 16/937,671, dated Apr. 13, 2022, 21 pages.

"International Search Report and Written Opinion", Application No. PCT/US2021/033210, dated Sep. 3, 2021, 10 pages.

"Non-Final Office Action", U.S. Appl. No. 16/937,671, dated Jun. 23, 2021, 14 pages.

"Non-Final Office Action", U.S. Appl. No. 16/928,932, dated Jun. 28, 2021, 20 pages.

"Non-Final Office Action", U.S. Appl. No. 16/880,248, dated Jul. 9, 2021, 15 pages.

Madan, et al., "Optimizing Communication and Capacity in a 3D Stacked Reconfigurable Cache Hierarchy", Jan. 2008, pp. 262-273.

Salkhordeh, et al., "ReCA: An Efficient Reconfigurable Cache Architecture for Storage Systems with Online Workload Characterization", May 3, 2018, 14 pages.

Zhang, et al., "A Self-Tuning Cache Architecture for Embedded Systems", May 2004, pp. 407-425.

Bakhshalipour, et al., "Domino Temporal Data Prefetcher", Proceedings of the 24th International Symposium on High-Performance Architecture (HPCA); Department of Computer Engineering, Sharif Universtity of Technology; School of Computer Science, Institute for Research in Fundamental Sciences (IPM); IEEE, 2018, 12 pages.

Huang, et al., "Open Prefetch—Let There Be Industry—Competitive Prefetching in RISC-V Processors", Institute of Computing Technology (ICT); Chinese Academy of Sciences (CAS); Retrieved from https://content.riscv.org/wp-content/uploads/2018/07/Shanghai-1350_OpenPrefetch.pdf on Jan. 27, 2020, 20 pages.

"Non-Final Office Action", U.S. Appl. No. 17/657,922, filed Oct. 6, 2022, 29 pages.

* cited by examiner

ADAPTIVE CACHE PARTITIONING

BACKGROUND

To operate efficiently, some computing systems include a hierarchical memory system, which may include multiple levels of memory. Here, efficient operation can entail cost efficiency and speed efficiency. Faster memories are typically more expensive than relatively slower memories, so designers attempt to balance their relative costs and benefits. One approach is to use a smaller amount of faster memory with a larger amount of slower memory. The faster memory is deployed at a higher level in the hierarchical memory system than the slower memory such that the faster memory is preferably accessed first. An example of a relatively faster memory is called a cache memory. An example of a relatively slower memory is a backing memory, which can include primary memory, main memory, backing storage, or the like.

A cache memory can accelerate data operations by storing and retrieving data of the backing memory using, for example, high-performance memory cells. The high-performance memory cells enable the cache memory to respond to memory requests more quickly than the backing memory. Thus, a cache memory can enable faster responses from a memory system based on desired data being present in the cache. One approach to increasing a likelihood that desired data is present in the cache is prefetching data before the data is requested. To do so, a prefetching system attempts to predict what data will be requested by a processor and then loads this predicted data into the cache. Although a prefetching system can make a cache memory more likely to accelerate memory access operations, data prefetching can introduce operational complexity that engineers and other computer designers strive to overcome.

BRIEF DESCRIPTION OF THE DRAWINGS

The details of one or more aspects of adaptive cache partitioning are described in this document with reference to the following drawings. The same numbers are used throughout the drawings to reference like features and components:

FIG. 2 illustrates an example of an apparatus that can implement aspects of adaptive cache partitioning.

FIG. 3 illustrates another example of an apparatus that can implement aspects of adaptive cache partitioning.

FIGS. 4-1 through 4-3 illustrate example operational implementations of adaptive cache partitioning.

FIGS. 5-1 through 5-3 illustrate further example operational implementations of adaptive cache partitioning.

DETAILED DESCRIPTION

Overview

Figure 1:
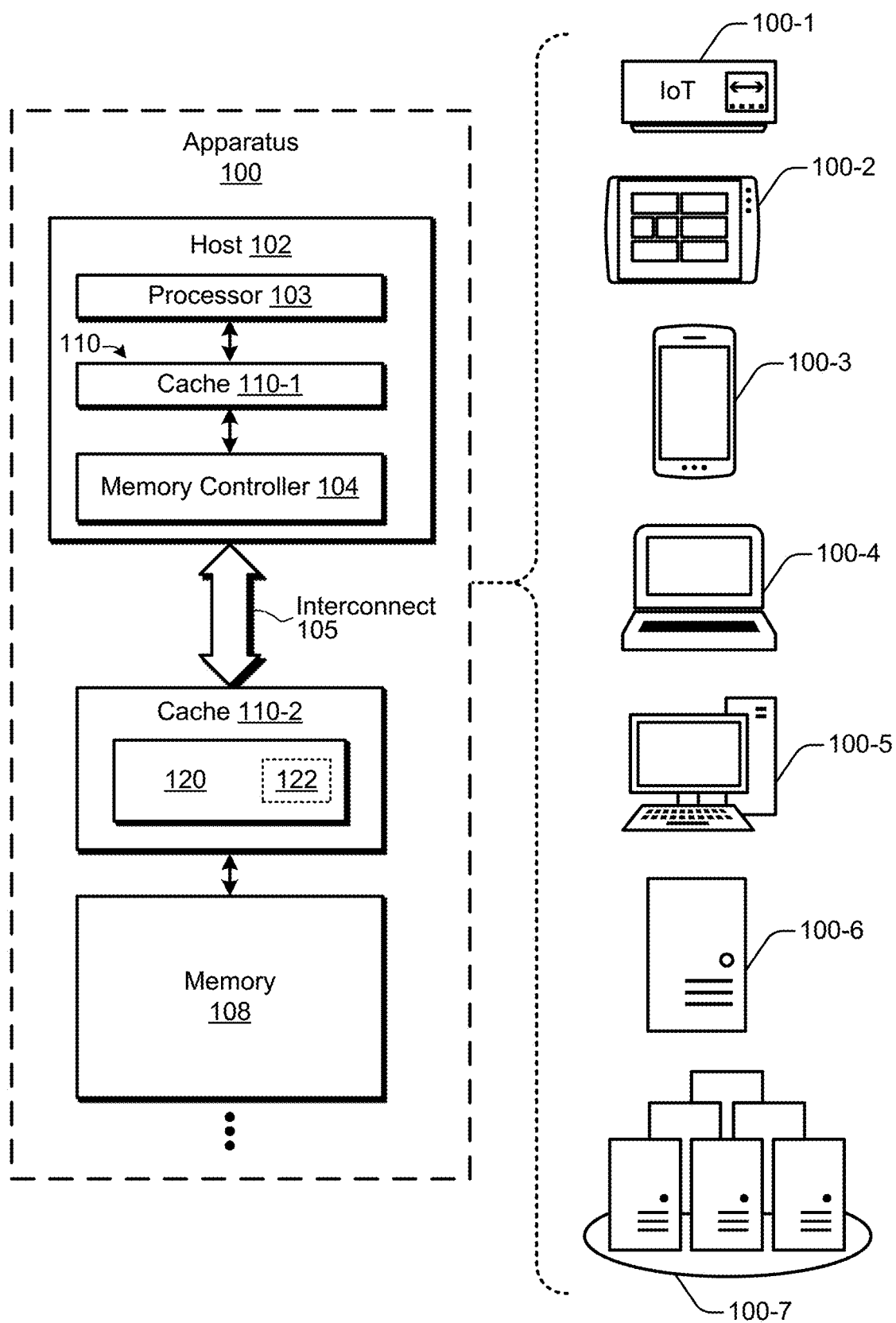
FIGS. 1-1 through 1-3 illustrate example environments in which techniques for adaptive cache partitioning can be implemented.

Advances in semiconductor process technology and microarchitecture have led to significant reductions in processor cycle times and increased processor density. Meanwhile, advances in memory technology have led to increasing memory density but relatively minor reductions in memory access times. Consequently, memory latencies measured in processor clock cycles are continually increasing. Cache memory, however, can help to bridge the processor-memory latency gap. Cache memory, which can store data of a backing memory, may be capable of servicing requests much more quickly than the backing memory. In some aspects, cache memory can be deployed "above" or "in front of" a backing memory in a memory hierarchy so that the cache memory is preferably accessed before accessing the slower backing memory.

Due to, inter alia, cost considerations, the cache memory may have a lower capacity than the backing or main memory. The cache memory may, therefore, load a selected subset of the address space of the backing memory. Data can be selectively admitted and/or evicted from the cache memory in accordance with suitable criteria, such as cache admission policies, eviction policies, replacement policies, and/or the like.

During operations, data can be loaded into the cache in response to "cache misses." A cache miss refers to a request pertaining to an address that has not been loaded into the cache and/or is not included in the working set of the cache. Servicing a cache miss may involve fetching data from the slower backing memory, which can significantly degrade performance. By contrast, servicing requests that result in "cache hits" may involve accessing the relatively higher-performance cache memory without incurring latencies for accessing the relatively lower-performance backing memory.

In some circumstances, cache performance can be improved through prefetching. Prefetching typically involves loading addresses into cache memory before the addresses are requested. A prefetcher can predict addresses of upcoming requests and preload the addresses into the cache memory in the background so that, when requests pertaining to the predicted addresses are subsequently received, the requests can be serviced from the cache memory as opposed to triggering cache misses. In other words, requests pertaining to the prefetched addresses may be serviced using the relatively higher-performance cache memory without incurring the latency of the relatively lower-performance backing memory.

The benefits of prefetching can be quantified in terms of hit rate, quantity of "useful" prefetches, a ratio of useful prefetches to "bad" prefetches, or the like. As used herein, a "useful" prefetch refers to a prefetch that results in a subsequent cache hit, which is termed a "prefetch hit." In other words, a useful prefetch is achieved with the prefetching of data associated with an address that is subsequently requested and/or otherwise accessed from the cache memory. By contrast, a "bad" prefetch or "prefetch miss" refers to a prefetch for data that is not subsequently requested and, as such, does not produce a cache or prefetch hit. Bad prefetches can adversely impact performance. Bad prefetches can consume limited cache memory resources with data that is unlikely to be requested (e.g., poison the cache), resulting in increased cache miss rate, lower hit rate, increased thrashing, higher bandwidth consumption, and so on.

A prefetcher can try to avoid these problems by attempting to detect patterns in which a memory is accessed and then prefetching data in accordance with the detected patterns. The prefetcher may utilize metadata to detect, predict, derive, and/or exploit memory access patterns to determine accurate prefetch predictions (e.g., predict addresses of upcoming requests). The metadata utilized by the prefetcher may be referred to as "prefetcher metadata," "prefetch metadata," "request metadata," "access metadata," "memory metadata," "memory access metadata," or the like. This metadata may include any suitable information pertaining to an address space including, but not limited to: a sequence of previously requested addresses or address offsets, an address history, an address history table, an index table, access frequencies for respective addresses, access counts (e.g., accesses within respective windows), access time(s), last access time(s), and so on.

The prefetcher may implement prefetch operations for workloads that are suitable for prefetching. As used herein, a "suitable" workload or workload that is "suitable for prefetching" refers to a "predictable" workload that produces memory accesses according to patterns that are detectable (and/or exploitable) by the prefetcher. A suitable workload may, therefore, refer to a workload associated with metadata from which the prefetcher is capable of deriving a predictable access pattern. Examples of suitable workloads include workloads in which memory requests are offset by a consistent offset or stride. These types of workloads may be produced by programs that access structured data repeatedly and/or in regular patterns. By way of non-limiting example, a program may repeatedly access data structures of size D, resulting in a predictable workload in which memory accesses are offset by a relatively constant offset delta $\Delta$ or stride, where $\Delta \approx D$. Stride and other types of access patterns may be derived from metadata pertaining to previous memory accesses of the workload. The prefetcher can utilize the memory access patterns derived from such metadata to prefetch data that is likely to be requested in the future. In the stride example above, the prefetcher can load data of addresses $a\Delta$, $a+2\Delta$, . . . through $a+d\Delta$ into the cache memory in response to a cache miss for address a (where d is a configurable prefetch degree). Given the predictable memory access pattern derived from metadata associated with the workload, the data prefetched from addresses $a+\Delta$ through $a+d\Delta$ will likely result in subsequent prefetch hits, thereby preventing cache misses and resulting in improved performance.

Some types of workloads may not be suitable for prefetching. As used herein, an "unsuitable" workload or workload that is "unsuitable for prefetching" refers to a workload that accesses memory in a manner that the prefetcher is incapable of predicting, modeling, and/or otherwise exploiting to produce accurate prefetch predictions. An unsuitable workload may refer to a workload associated with metadata from which the prefetcher is incapable of deriving address predictions, patterns, models, and/or the like. Examples of unsuitable workloads include workloads produced by programs that do not access memory in repeated and/or regular patterns, programs that access memory at seemingly random addresses and/or address offsets, programs that access memory according to patterns that are too complex or varied to be detected by the prefetcher (and/or captured in the prefetcher metadata), and/or the like. Attempting to prefetch data for unsuitable workloads may result in poor prefetch performance. Since prefetch decisions for unsuitable workloads are not guided by discernable access patterns, little, if any, of the prefetched data is likely to be subsequently requested before being evicted from the cache. As disclosed herein, inaccurate prefetch predictions may result in bad prefetches that consume the relatively limited capacity of the cache memory with data that is unlikely to be subsequently accessed to the exclusion of other data that may be accessed more frequently. Attempting prefetch for unsuitable workloads may therefore decrease cache performance (e.g., result in lower hit rate, increased miss rate, thrashing, increased bandwidth consumption, and so on). To avoid these and other problems, prefetching may not be implemented for unsuitable workloads (and/or within address regions associated with unsuitable workloads).

A cache may service a plurality of different workloads, each having respective workload characteristics (e.g., respective memory access characteristics, patterns, and/or the like). As disclosed in further detail herein, workload characteristics within respective regions of the address space may depend on a number of factors, which may vary over time. Programs operating within different regions of the address space may, therefore, produce workloads having different characteristics (e.g., different memory access patterns). For example, a first program operating within a first region of the address space may access memory per a first stride pattern ($\Delta_1$); a second program operating within a second region may access memory per a second, different stride pattern ($\Delta_2$); a third program operating within a third region of the address space may access memory according to a more complex pattern, such as a correlation pattern; a further program operating within a fourth region of the address space may access memory unpredictably; and so on. Although the first stride pattern may be capable of producing accurate prefetches within the first region, the first stride pattern will likely produce poor results if used in the other regions (and vice versa).

In some implementations, prefetching performance can be improved by maintaining metadata pertaining to respective regions of the address space. The metadata utilized by the prefetcher may include a plurality of entries, with each entry including information pertaining to memory accesses with a respective region of the address space. The prefetcher may utilize metadata pertaining to respective regions to inform prefetch operations within the respective regions. More specifically, the prefetcher can utilize metadata pertaining to respective regions of the address space to determine characteristics of the workload within the respective regions, determine whether the workloads are suitable for prefetching (e.g., distinguish workloads and/or regions that are suitable for prefetching from workloads and/or regions that are unsuitable for prefetching), determine access patterns within the respective regions, implement prefetch operations within the respective regions per the determined access patterns, and so on. In some implementations, the prefetcher metadata covers a plurality of fixed-sized address regions. Alternatively, the prefetcher metadata may be configured to cover adaptively sized address regions in which workload characteristics, such as access patterns, are consistent. In these implementations, the size of the address ranges covered by respective entries of the prefetcher metadata may vary within respective regions of the address space depending on, inter alia, workload characteristics and/or prefetch performance within the respective regions.

Metadata pertaining to memory accesses are often tracked at and/or within performance-sensitive functionality of the hierarchical memory system, such as memory I/O paths or the like. Moreover, prefetch operations that utilize such metadata may be performance-sensitive (e.g., to ensure that prefetched data are available before such data is requested). Therefore, it can be advantageous to maintain metadata pertaining to memory accesses (prefetcher metadata) within high-performance memory resources. In some implementations, prefetch metadata may be maintained within high-performance cache memory. For example, a fixed portion of the high-performance memory resources of the cache may be allocated for the storage of prefetcher metadata (and/or be allocated to the prefetcher and/or prefetch logic of the cache). The size and/or configuration of the fixed portion may be determined at design, manufacturing, and/or fabrication of the cache and/or component in which the cache is deployed, such as a processor, System-on-Chip (SoC), or the like. In some implementations, the fixed portion of cache memory allocated for prefetch metadata may be set in hardware, a Register Level Transfer (RTL) implementation, and/or the like.

The fixed allocation of cache memory may improve prefetch performance by, inter alia, decreasing the latency of metadata updates, address predictions, prefetch operations, and so on. Since the size of the cache memory is finite, allocation of the fixed portion of the cache memory for metadata storage may adversely impact other aspects of cache performance. For example, allocation of the fixed portion may reduce the amount of data that can be loaded into the cache, which can result in decreased cache performance (e.g., lead to increased miss rate, decreased hit rate, increased replacement rate, and/or the like). These disadvantages may be outweighed by the benefits of improved prefetch performance in some circumstances. For example, when servicing suitable workloads having access patterns that can be accurately predicted and/or exploited, the prefetcher can utilize metadata maintained within the fixed allocation of high-performance cache memory to implement accurate, low-latency prefetch operations that result in better overall cache performance despite the reduced cache capacity.

In other circumstances, however, the benefits of improved prefetch performance may not outweigh the disadvantages of decreased cache capacity. For example, when servicing unsuitable workloads, the fixed portion of the cache memory resources allocated for prefetcher metadata may be effectively wasted. More specifically, when servicing workloads having access patterns that cannot be accurately predicted and/or exploited by the prefetcher, the fixed portion of the cache memory allocated for storage of prefetcher metadata may not yield useful prefetches and, as such, may not improve cache performance, much less outweigh the performance penalties incurred due to reduced cache capacity. When servicing unsuitable workloads, the fixed allocation of the cache memory would be better utilized to increase the available capacity of the cache rather than storage of prefetcher metadata.

To address these and other issues, the amount of cache memory allocated for prefetch metadata (the fixed prefetch metadata capacity) may be predetermined. The fixed prefetch metadata capacity may be configured to provide acceptable performance under a range of different operating conditions. In some implementations, the fixed prefetch metadata capacity may be determined by testing, experience, simulation, machine-learning, and/or the like. Although the fixed amount of prefetch metadata capacity may yield acceptable performance under some conditions, performance may suffer under other conditions. Moreover, the cache may be incapable of adapting to changes in workload conditions.

Consider, for example, situations in which a cache having a fixed prefetch metadata capacity services or otherwise operates with predominantly unsuitable workloads (e.g., workloads that produce memory accesses that the prefetcher is incapable of modeling, predicting, and/or exploiting to determine accurate prefetch predictions). The fixed prefetch metadata capacity may, therefore, not yield performance improvements. In these situations, cache performance could be improved by reducing the fixed prefetch metadata capacity or removing the fixed allocation altogether.

Consider other situations in which the cache having the fixed prefetch metadata capacity services predominantly suitable workloads, such as a large number of workloads having different respective access patterns (tracked in respective prefetcher metadata), workloads having more complex access patterns, workloads having access patterns that involve larger amounts of prefetcher metadata, and/or the like. The fixed prefetch metadata capacity may not be sufficient to accurately capture access patterns of the workloads, resulting in decreased prefetch accuracy and decreased cache performance. Under these conditions, cache performance could be improved by increasing the metadata capacity available to the prefetcher (and/or further reducing available cache capacity).

Workload characteristics, such as access patterns, may vary from address region to address region. Moreover, the characteristics of respective workloads, and/or corresponding address regions, may vary over time. Workload characteristics within respective regions of the address space may depend on a number of factors, including, but not limited to: the programs utilizing the respective regions, the state of the programs, the processing task(s) being performed by the programs, the execution phase of the programs, characteristics of the data structure(s) being accessed by the programs, the manner in which the data structure(s) are accessed, and/or the like. The prefetcher may utilize metadata pertaining to workload characteristics within respective address regions to determine accurate prefetch predictions within the respective address regions. The amount of prefetcher metadata needed to produce accurate prefetch predictions may, therefore, depend on a number of factors, which may vary over time, including, but not limited to: the quantity of workloads (and/or corresponding address regions), the amount of metadata needed to track access patterns within respective address regions, the prefetch technique(s) implemented by the prefetcher within the respective address regions, the complexity of the access patterns, and so on. The prefetch metadata capacity needed to produce accurate prefetch predictions under first operating conditions (and/or during a first time interval) may differ from the prefetch metadata capacity needed to produce accurate prefetch predictions under second operating conditions (and/or during a second time interval).

To address these and other disadvantages, this document describes adaptive cache partitioning techniques that enable the amount of cache memory allocated for storage of prefetcher metadata to be dynamically adjusted. The cache memory capacity allocated to prefetch operations may therefore be tuned to improve cache performance.

In one implementation, the prefetcher implements a stride prefetch technique for a plurality of workloads, with each workload corresponding to a respective region of the address space. The prefetcher may detect stride patterns for respective workloads using metadata pertaining to accesses within the respective regions. Detecting the stride access patterns for Y workloads may involve maintaining metadata pertaining to accesses within Y different address regions. A fixed prefetch metadata capacity, however, may be incapable of maintaining metadata capable of capturing the Y patterns, which may reduce the accuracy of the prefetch predictions, resulting in decreased cache performance. For example, the fixed prefetch metadata capacity may only be capable of tracking a subset of the Y patterns, leaving X address regions uncovered. This can cause the prefetcher to implement inaccurate prefetches within the X address regions or prevent prefetching within the X address regions altogether. By contrast, the disclosed adaptive cache partitioning techniques may be capable of improving cache performance by, inter alia, increasing the amount of cache memory allocated to the prefetcher, such that the prefetcher is capable of storing metadata pertaining to stride patterns of each of the Y workloads and/or regions. The disclosed adaptive cache partitioning may be capable of modifying prefetch metadata capacity in response to changing workload conditions. For example, one or more of the Y workloads may transition from suitable to unsuitable over time, resulting in decreased prefetch performance. In response to the decrease in prefetch performance, the amount of cache memory allocated for the prefetcher metadata may be decreased, which may produce a corresponding increase to available cache capacity, thereby improving overall cache performance.

In another example, a prefetcher may implement a correlation prefetch technique that learns access patterns that may repeat but are not as consistent as simple stride or delta address patterns (correlation patterns). The correlation patterns may include delta sequences including a plurality of elements and, as such, may be derived from larger amounts of metadata than simple stride patterns. For example, a correlation prefetch for a delta sequence that includes two elements ($\Delta_1$, $\Delta_2$) may include prefetching addresses $a+\Delta_1$, $a+\Delta_1+\Delta_2$, $a+2\Delta_1+\Delta_2$, $a+2\Delta_1+2\Delta_2$, and so on, depending on the degree of the correlation prefetch operation. Since correlation prefetch techniques attempt to extract more complex patterns, these techniques may involve larger amounts of metadata. In situations where correlation patterns are tracked for multiple workloads and/or regions, a cache having a fixed prefetch metadata capacity may be insufficient, resulting in decreased performance. By contrast, the adaptive cache partitioning techniques disclosed herein can increase the amount of cache memory allocated to the prefetcher, resulting in improved prefetch accuracy and better overall performance, despite corresponding reductions to the available cache capacity. The disclosed adaptive cache partitioning techniques may adjust cache memory allocations responsive to changing workload conditions, such as workloads with simpler single stride access patterns, those with fewer workloads, and/or the like.

The disclosed adaptive cache partitioning techniques can also improve the performance of machine-learning and/or machine-learned (ML) prefetch implementations, such as classification-based prefetchers, artificial neural network (NN) prefetchers, Deep Neural Network (DNN) prefetchers, Recurrent NN (RNN) prefetchers, Long Short-Term Memory (LSTM) prefetchers, and/or the like. For example, an LSTM prefetcher may be trained to model the "local context" of memory accesses within an address space, with each "local context" corresponding to a respective address range of the address space. These types of ML prefetch techniques may attempt to leverage local context since, as disclosed herein, data structures accessed by programs running within respective local contexts tend to be stored in contiguous data structures or blocks that are accessed repeatedly and/or in regular patterns. An ML prefetcher can be trained to develop and/or refine ML models within respective local contexts and can use the ML models to implement prefetch operations. Local context, however, can vary significantly across the address space due to differences in workload produced by programs operating within various regions of the address space. An ML model trained to learn the local context within one region of the address space (and/or that is produced by one program) may not be capable of accurately modeling the local context within other regions of the address space (and/or that is produced by another program). The ML models may, therefore, rely on metadata covering respective local contexts. A fixed allocation of cache memory may be insufficient to maintain ML models for the workloads being serviced by the cache, leading to poor prefetch performance. The disclosed adaptive cache partitioning techniques, however, may be capable of adjusting the amount of prefetch metadata capacity allocated to the prefetcher in accordance with the quantity and/or complexity of ML models being tracked thereby.

The described techniques for adaptive cache partitioning can be used with caches, prefetchers, and/or other components of hierarchical memory systems. In some implementations, logic coupled to a cache memory is configured to balance performance improvements enabled by allocation of cache memory capacity for prefetch metadata against the impacts of corresponding decreases to available cache capacity. The logic can be configured to allocate a first portion of the cache memory for metadata pertaining to an address space (e.g., prefetch metadata), allocate cache data to a second portion of the cache memory that is different from the first portion, and/or modify a size of the first portion of the cache memory allocated for the metadata based, at least in part, on a metric pertaining to data prefetched into the second portion of the cache memory. The metric may be configured to quantify any suitable aspect of cache and/or prefetch performance including, but not limited to: prefetch hit rate, prefetch miss rate, quantity of useful prefetches, quantity of bad prefetches, ratio of useful prefetches to bad prefetches, cache hit rate, cache miss rate, request latency, average request latency, and/or the like. The amount of cache memory allocated for prefetcher metadata may be increased when the metric exceeds a first threshold and may be decreased when the metric falls below a second threshold.

The metadata maintained within the first portion of the cache memory may be updated in response to requests pertaining to the address space, such as read requests, write requests, transfer requests, cache hits, cache misses, prefetch hits, prefetch misses, and/or the like. A prefetcher (and/or prefetch logic) of the cache may be configured to select data to prefetch into the second portion of the cache memory based, at least in part, on the metadata pertaining to the address space maintained within the first portion of the cache memory. The metadata may include any suitable information pertaining to addresses and/or ranges of the address space including, but not limited to: address sequence, address history, index table, delta sequence, stride pattern, correlation pattern, feature vectors, ML features, ML feature vectors, ML model, ML modeling data, and/or the like.

The size of the first portion of the cache memory allocated for the metadata may be modified in response to monitoring one or more metrics pertaining to data prefetched into the second portion of the cache memory. The metrics may be configured to quantify prefetch performance and may include, but are not limited to: prefetch hit rate, quantity of useful prefetches, quantity of bad prefetches, ratio of useful prefetches to bad prefetches, and so on. The size of the first portion may be increased when one or more of the metrics exceeds a first threshold or may be decreased when the metrics are below a second threshold. In some implementations, the amount of cache memory allocated for storage of metadata pertaining to the address space (prefetcher metadata) may be incrementally and/or periodically increased while prefetch performance remains above the first threshold. The amount of cache memory allocated for the metadata may be increased until a maximum or upper bound is reached. Conversely, the amount of cache memory allocated for the metadata may be incrementally and/or periodically reduced while prefetch performance remains below the second threshold. The amount of cache memory allocated for the metadata may be decreased until a minimum or lower bound is reached. In some aspects, at the lower bound, no cache resources are allocated for metadata storage, and substantially all of cache memory is available as cache capacity.

In these manners, adaptive cache partitioning provides flexible apparatuses and techniques for efficiently handling different prefetching environments. A cache memory can include a first portion allocated for metadata pertaining to an address space and a second portion allocated for caching data of the address space. In example implementations, relative sizes of the first and second portions are adapted based, at least in part, on current processing workloads. If a current processing workload is suitable for prefetching, the first portion can be sized appropriately. For example, logic can increase a size of the first portion and decrease a size of the second portion. The logic can shift some memory storage from being used for caching data to being used for storing metadata to increase prefetch capabilities for the workload that is suitable for prefetching. On the other hand, if a current processing workload is not suitable for prefetching, the first portion can be down-sized appropriately to provide greater resources for caching data. In this case, the logic can decrease the size of the first portion and increase the size of the second portion. Thus, logic can shift some cache memory storage from being used for maintaining the metadata to being used for storing cache data to decrease the resources consumed by the prefetcher for the workload that is not suitable for prefetching. The described cache partitioning can therefore adapt to efficiently provide more prefetch functionality or more cache storage depending on the current processing workload.

Example Operating Environment

FIG. 1-1 illustrates an example apparatus 100 that can implement aspects of adaptive cache partitioning. The apparatus 100 can be realized as, for example, at least one electronic device. Example electronic-device implementations include an internet-of-things (IoTs) device 100-1, a tablet device 100-2, a smartphone 100-3, a notebook computer 100-4, a desktop computer 100-5, a server computer 100-6, a server cluster 100-7, and/or the like. Other apparatus examples include a wearable device, such as a smartwatch or intelligent glasses; an entertainment device, such as a set-top box or a smart television; a motherboard or server blade; a consumer appliance; vehicles; industrial equipment; a network-attached storage (NAS) device, and so forth. Each type of electronic device includes one or more components to provide some computing functionality or feature.

In example implementations, the apparatus 100 includes at least one host 102, at least one processor 103, at least one memory controller 104, interconnect 105, memory 108, and at least one cache 110. The memory 108 may represent main memory, system memory, backing memory, backing storage, a combination thereof, and/or the like. The memory 108 may be realized with any suitable memory and/or storage facility including, but not limited to: a memory array, semiconductor memory, read-only memory (ROM), random-access memory (RAM), Static RAM (SRAM), Dynamic RAM (DRAM), Synchronous DRAM (SDRAM), thyristor random access memory (TRAM), ferroelectric RAM (Fe-RAM), magnetic RAM (MRAM), resistive RAM (RRAM), magnetoresistive RAM (MRAM), spin-torque transfer RAM (STT RAM), phase-change memory (PCM), three-dimensional (3D) stacked DRAM, Double Data Rate (DDR) memory, high bandwidth memory (HBM), a hybrid memory cube (HMC), solid-state memory, Flash memory, NAND Flash memory, NOR Flash memory, 3D XPoint™ memory, and/or the like. Other examples of the memory 108 are described herein. In some aspects, the host 102 can further include and/or be coupled to non-transitory storage, which may be realized with a device or module including any suitable non-transitory, persistent, solid-state, and/or non-volatile memory.

As shown, the host 102, or host device 102, can include the processor 103, memory controller 104, and/or other components (e.g., cache 110-1). The processor 103 can be coupled to the cache 110-1, and the cache 110-1 can be coupled to the memory controller 104. The processor 103 can also be coupled, directly or indirectly, to the memory controller 104. The host 102 can be coupled to the cache 110-2 through the interconnect 105. The cache 110-2 can be coupled to the memory 108.

The depicted components of the apparatus 100 represent an example computing architecture with a memory hierarchy (or hierarchical memory system). For example, the cache 110-1 can be logically coupled between the processor 103 and the cache 110-2. Further, the cache 110-2 can be logically coupled between the processor 103 (and/or cache 110-1) and the memory 108. In the FIG. 1-1 example, the cache 110-1 is at a higher level of the memory hierarchy than is the cache 110-2. Similarly, the cache 110-2 is at a higher level of memory hierarchy than is the memory 108. The indicated interconnect 105, as well as the other interconnects that couple various components, can enable data to be transferred between or among the various components. Interconnect examples include a bus, a switching fabric, one or more wires that carry voltage or current signals, and/or the like.

Although particular implementations of the apparatus 100 are depicted in FIG. 1-1 and described herein, an apparatus 100 can be implemented in alternative manners. For example, the host 102 may include additional caches, including multiple levels of cache memory (e.g., multiple cache layers). In some implementations, the processor 103 may include one or more internal memory and/or cache layers, such as instruction registers, data registers, an L1 cache, an L2 cache, an L3 cache, and/or the like. Further, at least one other cache and memory pair may be coupled "below" the illustrated cache 110-2 and/or memory 108. The cache 110-2 and the memory 108 may be realized in various manners. In some implementations, the cache 110-2 and the memory 108 are both disposed on, or physically supported by, a motherboard with the memory 108 comprising "main memory." In other implementations, the cache 110-2 includes and/or is realized by DRAM, and the memory 108 includes and/or is realized by a non-transitory memory device or module. Nonetheless, the components may be implemented in alternative ways, including in distributed or shared memory systems. Further, a given apparatus 100 may include more, fewer, or different components.

The cache 110-2 can be configured to improve memory performance by storing data of the relatively lower-performance memory 108 within a relatively higher-performance cache memory 120. The cache memory 120 can be provided and/or be embodied by cache hardware, which can include, but is not limited to: semiconductor integrated circuitry, memory cells, memory arrays, memory banks, memory chips, and/or the like. In some aspects, the cache memory 120 includes a memory array. The memory array may be configured as cache memory 120 including a plurality of cache units, such as cache lines or the like. The memory array may be a collection (e.g., a grid) of memory cells, with each memory cell being configured to store at least one bit of digital data. The cache memory 120 (and/or memory array thereof) may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping mechanism. The disclosure is not limited in this regard, however; the cache memory 120 may include any suitable memory and/or memory mechanism including, but not limited to: a memory, a memory array, semiconductor memory, volatile memory, RAM, SRAM, DRAM, SDRAM, non-volatile memory, solid-state memory, Flash memory, and/or the like.

Data may be loaded into the cache memory 120 in response to cache misses so that subsequent requests for the data can be serviced more quickly. Further performance improvements can be realized by prefetching data into the cache memory 120, which may include predicting addresses that are likely to be requested in the future and prefetching the predicted addresses into the cache memory 120. When requests pertaining to the prefetched addresses are subsequently received at the cache 110-2, the requests can be serviced from the relatively higher-performance cache memory 120, without triggering cache misses (and without accessing the relatively lower-performance memory 108).

Addresses may be selected for prefetching based on, inter alia, metadata 122 pertaining to the address space of the memory 108. In some implementations, access patterns within respective regions of the address space can be derived from the metadata 122, and the access patterns can be used to prefetch data into the cache memory 120. In some implementations, at least some of the metadata 122 is maintained within the cache memory 120. A portion or partition of the cache memory 120 may be allocated for storage of the metadata 122. The amount of cache memory 120 allocated for the metadata 122 may be adjusted, tuned, modified, varied, and/or otherwise managed based, at least in part, on one or more metrics. The metrics may pertain to one or more aspects of prefetch performance (may include one or more prefetch performance metrics), such as quantity of useful prefetches, quantity of bad prefetches, ratio of useful prefetches to bad prefetches, prefetch hit rate, prefetch miss rate, and/or the like. Alternatively, or in addition, the metrics may pertain to one or more aspects of cache performance (may include one or more cache performance metrics), such as cache hit rate, cache miss rate, and/or the like. The amount of cache memory 120 allocated to the metadata 122 may be increased when one or more of the metrics exceeds a first threshold, may be decreased when the metrics fall below a second threshold, and so on.

In the FIG. 1-1 example, aspects of adaptive cache partitioning are implemented by cache 110-2. The disclosure, however, is not limited in this regard. The disclosed techniques for adaptive cache partitioning may be implemented in any cache 110 (e.g., cache 110-1) and/or cache layer, including across multiple caches 110 and/or cache layers. In some examples, the cache 110-2 may be configured to allocate cache memory for metadata 122 pertaining to the address space. Alternatively, or in addition, one or more internal cache(s) of the processor 103 may be configured to implement adaptive cache partitioning as disclosed herein (e.g., an L3 cache of the processor 103 may allocate cache memory to store metadata 122 pertaining to the address space).

Figures 1, 2:
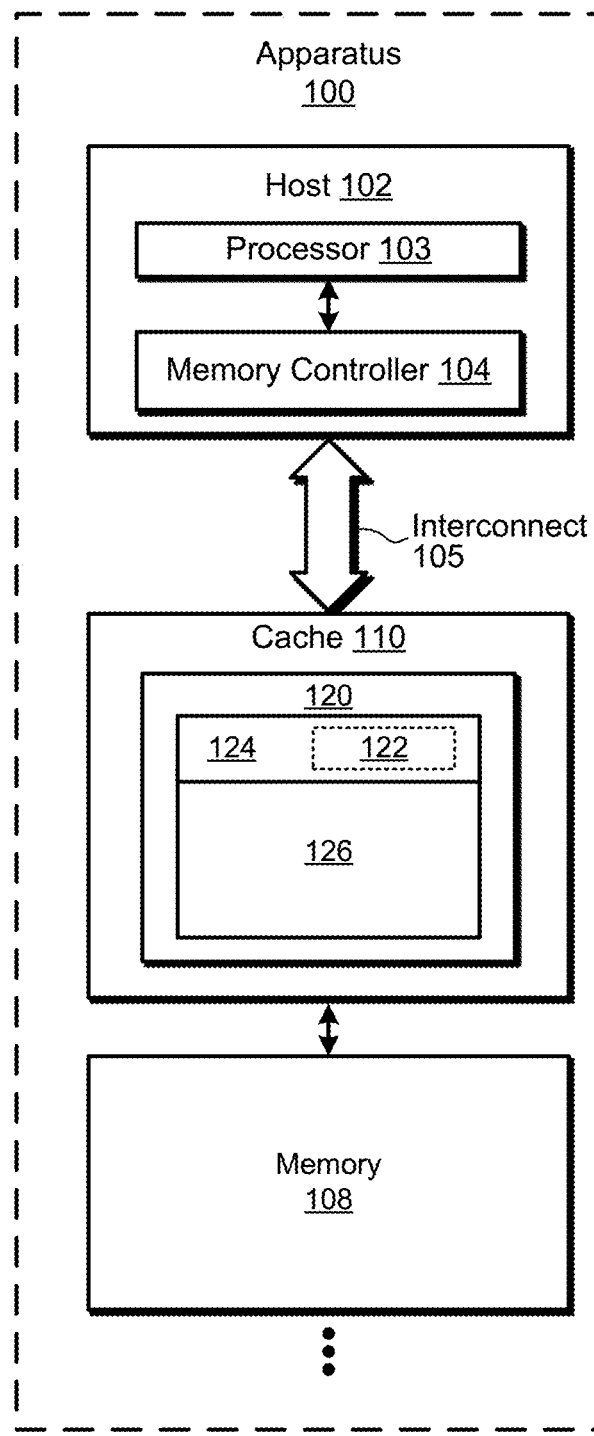

FIG. 1-2 illustrates further examples of apparatuses that can implement adaptive cache partitioning. The apparatus 100 can include a cache 110 configured to cache data associated with an address space. The cache 110 can be configured to cache data pertaining to any suitable address space including, but not limited to: a memory address space, a storage address space, a host address space, an input/output (I/O) address space, a main memory address space, a physical address space, a virtual address space, a virtual memory address space, an address space managed by, inter alia, the processor 103, memory controller 104, memory management unit (MMU), and/or the like. In the FIG. 1-2 example, the cache 110 is configured to cache data pertaining to an address space of the memory 108. The memory 108 may, therefore, represent a backing memory of the cache 110 within the memory hierarchy.

The cache 110 can load addresses and/or corresponding data of the relatively slower memory 108 into the relatively faster cache memory 120. Data may be loaded in response to cache misses (e.g., in response to requests pertaining to addresses and/or data that are not available within the cache 110). Servicing a cache miss may involve transferring data from the relatively slower memory 108 to the relatively faster cache memory 120. Cache misses may, therefore, lead to increased request latency and poor performance. The cache 110 can address these and other issues by prefetching addresses into the cache memory 120 before requests pertaining to the addresses are received. Accurate prefetches may result in prefetch hits that can be serviced using the cache memory 120, without incurring the latencies involved in cache misses. Inaccurate prefetches, however, may consume cache memory resources with data that are not subsequently accessed, which can adversely impact performance (e.g., increase miss rate, decrease cache hit rate, increase bandwidth consumption, and so on).

Metadata 122 pertaining to the address space can be used to, inter alia, inform prefetch operations. In some implementations, address access patterns are derived from the metadata 122, and the address access patterns are leveraged accurately to predict addresses of upcoming requests. The metadata 122 may include any information pertaining the address space and/or data associated with the backing memory of the cache 110 (e.g., the memory 108) including, but not limited to: a sequence of previously requested addresses or address offsets, an address history, an address history table, an index table, access frequencies for respective addresses, access counts (e.g., accesses within respective windows), access time(s), last access time(s), ML features or parameters, ANN features or parameters (e.g., weight and/or bias parameters), DNN features or parameters, LSTM features or parameters, and so on. In some aspects, the metadata 122 includes a plurality of entries, each entry including information pertaining to a respective region of the address space. The metadata 122 pertaining to respective regions of the address space may be used to, inter alia, determine address access patterns within the respective regions, which may be used to inform prefetch operations within the respective regions.

The metadata 122 may be performance sensitive. The metadata 122 pertaining to the address space may be retrieved, updated, and/or otherwise accessed in performance-sensitive operations, such as operations to service requests, cache operations, prefetch operations, and so on. It may be advantageous, therefore, to maintain the metadata 122 in high-performance memory resources. In the FIG. 1-2 example, at least some of the metadata 122 pertaining to the address space are maintained within the cache memory 120. A portion of the cache memory 120 may be allocated for storage of the metadata 122. As illustrated in FIG. 1-2, a first portion 124 (or first partition) of the cache memory 120 is reserved for the metadata 122. Data corresponding to addresses of the address space associated with the memory 108 (cache data) may be cached within a second portion 126 of the cache memory 120 (or second partition), which may be different and/or separate from the first portion 124. The first portion 124 may include any suitable resources of the cache memory 120 including, but not limited to zero or more: cache units, cache blocks, cache lines, hardware cache lines, sets, ways, rows, columns, banks, and/or the like. The first portion 124 (or first partition) may be referred to as a metadata portion, a metadata partition, a prefetch portion, a prefetch partition, or the like. The second portion 126 (or second partition) may be referred to as a cache portion, cache partition, or the like.

The size of the first portion 124 may be adjusted based, at least in part, on one or more metrics. The metrics may pertain to any suitable aspect(s) of the cache 110 and/or memory hierarchy including, but not limited to: request latency, average request latency, throughput, cache performance, cache hit rate, cache miss rate, prefetch performance, prefetch hit rate, prefetch miss rate, quantity of useful prefetches, quantity of bad prefetches, ratio of useful prefetches to bad prefetches, and/or the like. The size of the first portion 124 may be increased in response to metrics indicating that cache and/or prefetch performance satisfies one or more first thresholds and may be reduced in response to metrics that fail to satisfy one or more second thresholds. The metrics may be configured to quantify the degree to which the workload on the cache 110 is suitable for prefetching. The amount of cache memory 120 allocated storage of the metadata 122 pertaining to prefetch operations may, therefore, correspond to a degree to which the workload is suitable for prefetching (as quantified by the one or more metrics). Under workload conditions that are suitable for prefetching, the size of the first portion 124 may be increased (and the size of the second portion 126 may be decreased), which may enable more accurate prefetching and further improve overall cache performance, despite the decrease to available cache capacity. Under workload conditions that are unsuitable for prefetching, the size of the first portion 124 may be decreased (and the size of the second portion 126 may be increased), which may increase the available capacity of the cache 110. Under suitable workloads, the increased availability of cache capacity may result in improved performance (e.g., reduced cache miss rate, lower replacement rate, and so on).

Figures 1, 2, 3:
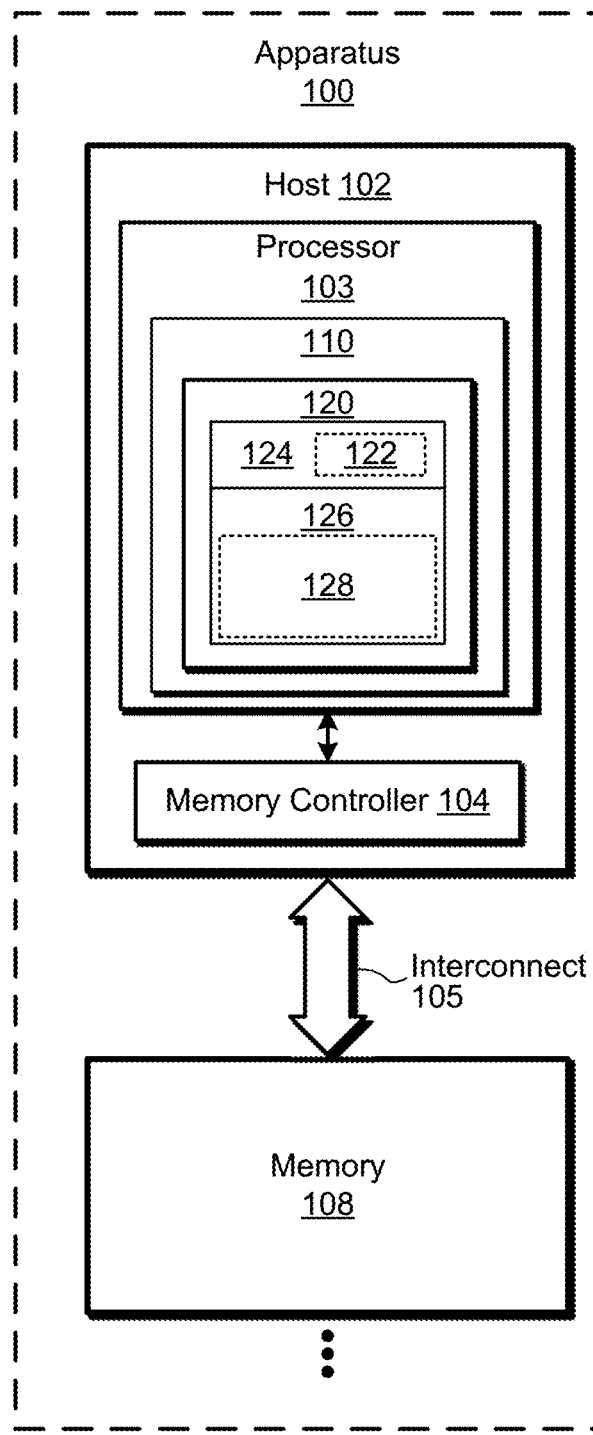
Figure 2:
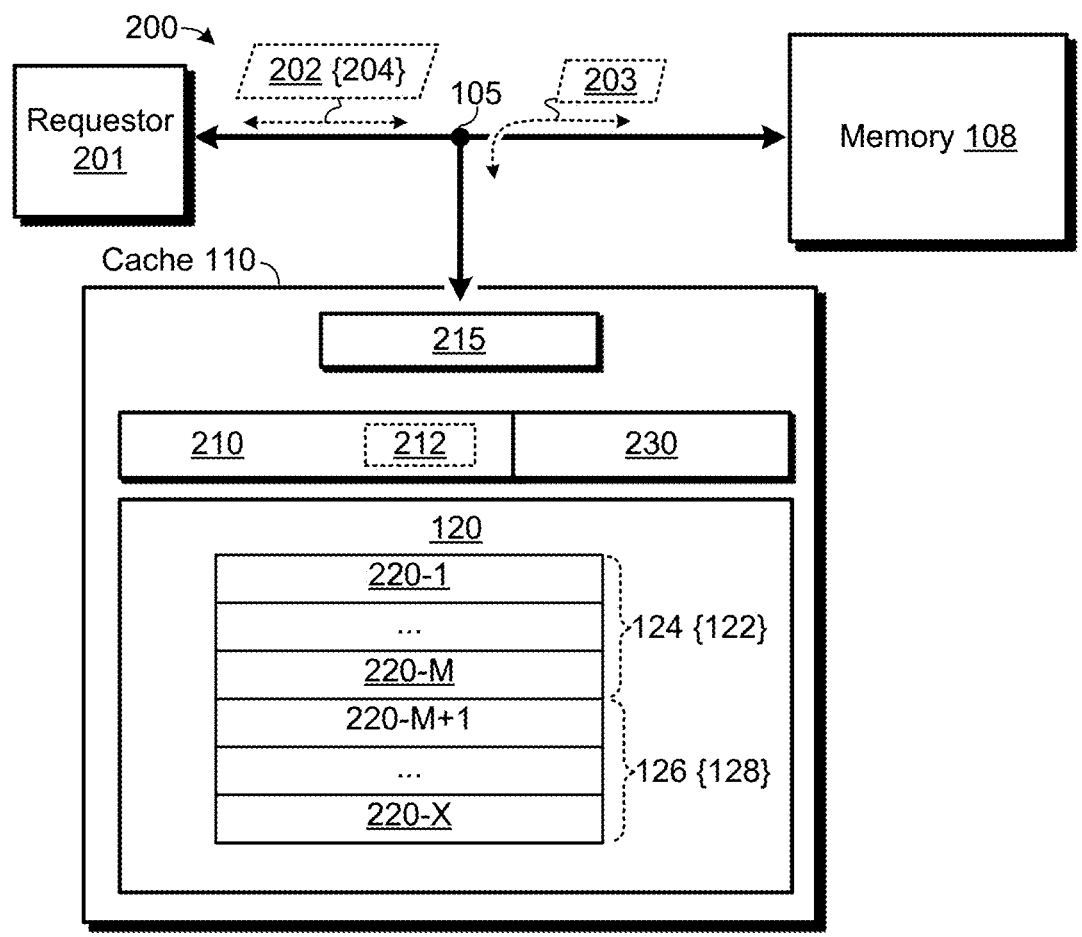
Figure 3:
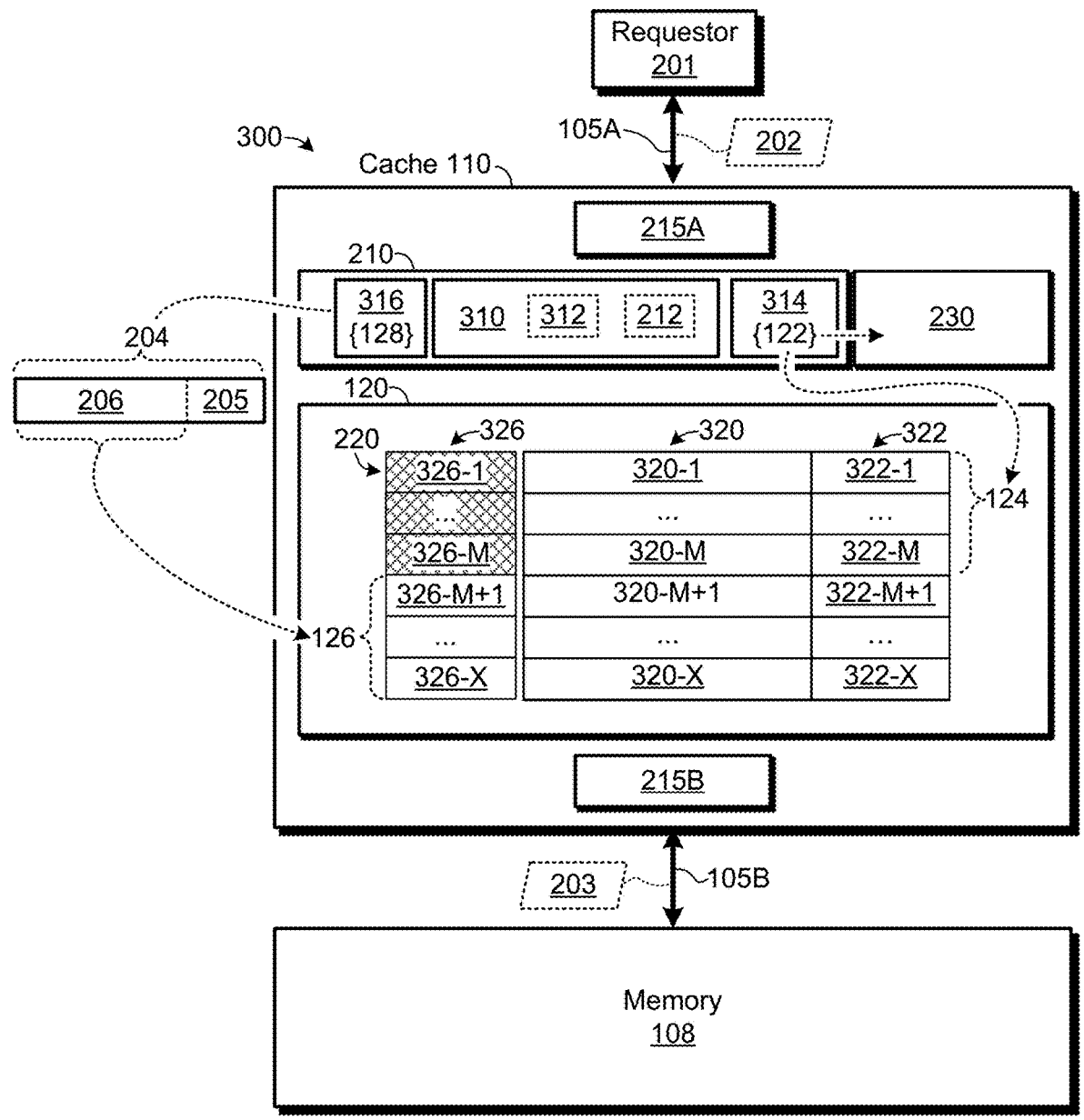

FIG. 1-3 illustrates further examples of apparatuses that can implement adaptive cache partitioning. In the FIG. 1-3 example, the cache 110 may be an internal cache and/or cache layer of the processor 103 (and/or a processor core thereof), such as an L1 cache, L2 cache, L3 cache, or the like. In some aspects, the memory hierarchy may further include a cache 110 disposed between the processor 103 and memory 108 (a cache 110-2 as illustrated in FIG. 1-1).

The cache 110 may be configured to cache data associated with addresses of an address space. In the FIG. 1-3 example, the cache 110 is configured to cache data pertaining to a virtual address space managed by an MMU, such as the memory controller 104, an operating system, or the like. The address space may be larger than the physical address space of the memory resources of the host 102 (e.g., the address space may be larger than the physical address space of the memory 108). The address space may be a 32-bit address space, a 64-bit address space, a 128-bit address space, or the like.

The cache 110 can allocate a first portion 124 of the cache memory 120 for storage of metadata 122 pertaining to the address space. The metadata 122 may include information pertaining to accesses to respective addresses and/or address regions of the address space, which may be used to, inter alia, prefetch data into the second portion 126 of the cache memory 120 (prefetch cache data 128 pertaining to respective addresses of the address space). The cache 110 can adjust the amount of cache memory 120 allocated to storage of the metadata 122 based, at least in part, on one or more metrics, as disclosed herein. The cache 110 can increase the amount of cache memory 120 allocated to the first portion 124 under workload conditions that are suitable for prefetching and can decrease the amount allocated to the first portion 124 under workload conditions that are unsuitable for prefetching.

Example Schemes and Apparatuses for Adaptive Cache Partitioning

FIG. 2 illustrates an example 200 of an apparatus for implementing adaptive cache partitioning. The illustrated apparatus includes a cache 110 configured to accelerate memory storage operations pertaining to a memory 108 (a backing memory). The memory 108 may be any suitable memory and/or storage facility, as disclosed herein.

The cache 110 may include and/or be coupled to an interface 215, which may be configured to receive requests 202 pertaining to an address space associated with the memory 108 from at least one requestor 201. The requestor 201 can be a host 102, processor 103, processor core, client, computing device, communication device (e.g., smartphone), Personal Digital Assistant (PDA), tablet computer, Internet of Things (IoT) device, camera, memory card reader, digital display, personal computer, server computer, data management system, Database Management System (DBMS), embedded system, system-on-chip (SoC) device, or the like. The requestor 201 can include a system motherboard and/or backplane and can include processing resources (e.g., one or more processors, microprocessors, control circuitry, and/or the like). The interface 215 can be configured to couple the cache 110 to one or more interconnects, such as an interconnect 105 a host 102 or the like.

The cache 110 may be configured to service requests 202 pertaining to the memory 108 by use of high-performance memory resources, such as cache memory 120. The cache memory 120 may include cache memory resources. As used herein, a "cache memory resource" refers to any suitable data and/or memory storage resource. In the FIG. 2 example, the cache memory resources of the cache memory 120 include a plurality of cache units 220, each cache unit 220 capable of storing a respective quantity of data. The cache units 220 may include and/or correspond to any suitable type and/or arrangement of memory resource(s) including, but not limited to: a unit, a memory unit, a block, a memory block, a cache block, a cache memory block, a page, a memory page, a cache page, a cache memory page, a cache line, a hardware cache line, a set, a way, a memory array, a row, a column, a bank, a memory bank, and/or the like. In the FIG. 2 example, the cache memory 120 includes X cache units 220 (cache units 220-1 through 220-X).

In some implementations, the cache 110 may be logically disposed between the requestor 201 and the memory 108 (e.g., may be interposed between the requestor 201 and the memory 108). In the FIG. 2 example, the requestor 201, cache 110, and memory 108 may be communicatively coupled to an interconnect 105. The cache 110 may include and/or be coupled to logic (cache logic 210) that is configured to receive requests 202 pertaining an address space associated with the memory 108 by, inter alia, monitoring, filtering, sniffing, extracting, intercepting, identifying and/or otherwise retrieving requests 202 pertaining to the address space on the interconnect 105. The cache logic 210 can be further configured to map addresses 204 to cache units 220. Requests 202 pertaining to addresses 204 that map to cache units 220, including valid data associated with the addresses 204 result in cache hits, which can be serviced by use of the relatively higher-performance cache memory 120. Requests 202 pertaining to addresses 204 do not map to valid data stored within the cache memory 120 result in cache misses. Servicing a request 202 pertaining to an address 204 resulting in a cache miss may involve implementing a transfer operation 203 to fetch data associated with the address 204 from the relatively slower memory 108, which may increase the latency of the request 202.

In some implementations, the cache logic 210 includes and/or is coupled to prefetch logic 230. The prefetch logic 230 may be configured to predict the addresses 204 of upcoming requests 202. The prefetch logic 230 can be further configured to implement transfer operations 203 (or cause the cache logic 210 to implement transfer operations 203) to prefetch data corresponding to the predicted addresses 204 into the cache memory 120. The prefetch logic 230 may cause the transfer operations 203 to be implemented before requests 202 pertaining to the predicted addresses 204 are received at the cache 110. Subsequent requests 202 pertaining to the predicted addresses 204 may, therefore, result in prefetch hits that can be serviced using the relatively higher-performance cache memory 120, without incurring latencies involved with servicing cache misses (or accessing the relatively lower-performance memory 108). The latency of the requests 202 pertaining to prefetched addresses 204 may not include latencies involved in loading data of the predicted addresses 204 into the cache 110.

The prefetch logic 230 may determine addresses predictions based, at least in part, on metadata 122 pertaining to the address space (e.g., prefetcher metadata). As disclosed herein, the metadata 122 may include any suitable address access characteristics including, but not limited to: a sequence of previously requested addresses or address offsets, an address history, an address history table, an index table, access frequencies for respective addresses, access counts (e.g., accesses within respective windows), access time(s), last access time(s), and so on. The prefetch logic 230 may be configured to maintain and/or update the metadata 122 in response to events pertaining to respective addresses 204, which may include, but are not limited to: data access requests, read requests, write requests, copy requests, clone requests, trim requests, erase requests, delete requests, cache misses, cache hits, and/or the like. The prefetch logic 230 may utilize the metadata 122 to determine address access patterns and can use the determined address access patterns to predict the addresses 204 of upcoming requests 202. In some implementations, the metadata 122 may include a plurality of entries, each entry including information pertaining to a respective region of the address space. The prefetch logic 230 may utilize the metadata 122 to determine access patterns within respective regions of the address space and use the determined access patterns to predict addresses 204 of upcoming requests 202 within the respective regions.

In some implementations, at least a portion of the metadata 122 is maintained within the cache memory 120. The cache logic 210 may allocate a first portion 124 of the cache memory 120 for storage of the metadata 122 and/or use by the prefetch logic 230. The cache logic 210 may maintain data pertaining to addresses of the address space (cache data 128) within a second portion of the cache memory 120, which may be separate and/or distinct from the first portion 124 of the cache memory 120. In the FIG. 1-3 example, the cache logic 210 allocates M cache units 220 to storage of the metadata 122. The first portion 124 may include cache units 220-1 through 220-M, and the second portion 126 used to store cache data 128 may include C cache units, where C=X−M (cache units 220-M+1 through 220-X). Although FIG. 1-3 illustrates one example for adaptive cache partitioning, the disclosure is not limited in this regard and could be adapted to partition the cache memory 120 according to any suitable partitioning scheme. In another example, the cache logic 210 may allocate cache units 220-1 through 220-C to the second portion 126 and allocate cache units 220-C+1 through 220-X to the first portion 124. In other examples, the cache logic 210 may allocate other groupings of cache units 220, such as sets, ways, rows, columns, banks, and/or the like.

The cache logic 210 may be configured to implement a first mapping scheme (a metadata scheme) to map the metadata 122, and/or entries thereof, to cache units 220 within the first portion 124. The cache logic 210 may be further configured to implement a second mapping scheme (a cache or address mapping scheme 316) to map addresses 204 to cache units 220 allocated to the second portion 126. The cache logic 210 may be configured to modify the first mapping scheme and/or second mapping scheme in response to modifying the size and/or configuration of the cache memory 120 allocated to one or more of the first portion 124 and the second portion 126.

The cache logic 210 may adjust the quantity of cache memory 120 allocated to storage of the metadata 122 based, at least in part, on one or more metrics 212. The metrics 212 may be configured to quantify a degree to which a workload on the cache 110 is suitable for prefetching. More specifically, the metrics 212 may be configured to quantify aspects of prefetch performance (e.g., may include one or more prefetch performance metrics 212 and/or metrics 212 pertaining to prefetch performance), such as a prefetch hit rate, quantity or useful prefetches, ratio of useful prefetches to bad prefetches, and/or the like. Alternatively, or in addition, the metrics 212 may be configured to quantify other performance characteristics, including cache performance (e.g., may include one or more cache performance metrics 212 and/or metrics 212 pertaining to cache performance), such as cache hit rate, cache miss rate, and/or the like.

The cache logic 210 may use the metrics 212 to determine the degree to which workload(s) on the cache 110 are suitable for prefetching and dynamically partition the cache memory 120 accordingly. More specifically, the cache logic 210 can adjust the amount of cache memory 120 allocated to the first portion 124 and/or second portion 126 based, at least in part, on one or more of the metrics 212. The cache logic 210 may periodically monitor the metrics 212 and may determine whether to modify the size of the first portion 124 in response to the monitoring. The cache logic 210 may increase the amount of cache memory 120 allocated to the first portion 124 when one or more of the metrics 212 are above a first threshold (when prefetch performance exceeds the first threshold) and decrease the amount when the one or more metrics 212 are below a second threshold (when prefetch performance falls below the second threshold). The cache logic 210 may monitor the one or more metrics 212 in background operations, during idle periods (when not actively servicing requests 202, implementing prefetch operations, or the like), on a determined schedule, and/or the like. Increasing the size of the first portion 124 may include decreasing the size of the second portion 126, whereas decreasing the size of the first portion 124 may include increasing the size of the second portion 126. More specifically, increasing the size of the first portion 124 may include reallocating one or more cache units 220 of the second portion 126 to the first portion 124, whereas decreasing the size of the first portion 124 may include reallocating one or more cache units 220 of the first portion 124 to the second portion 126. Modifying the size of the first portion 124 may include modifying the number of cache units 220 included in the first portion 124 (e.g., modifying M), which may result in modifying the number of cache units 220 included in the second portion 126 (e.g., modify C where C=X−M).

Resizing the amount of cache memory 120 allocated to the metadata 122 may include manipulating the metadata 122 and/or cache data 128. Reducing the amount of cache memory 120 allocated to the metadata 122 may include evicting portions of the metadata 122. The metadata 122 may be evicted according to a policy (a metadata eviction policy). The metadata eviction policy may specify that the oldest and/or least recently used entries of the metadata 122 are to be evicted when the size of the first portion 124 is reduced. Similarly, reducing the size of the second portion 126 allocated for the second portion 126 may include evicting cache data 128 from one or more cache units 220. The cache data 128 may be evicted according to a policy (a replacement or eviction policy), which may include, but is not limited to: First In First Out (FIFO), Last In First Out (LIFO), Least Recently Used (LRU), Time Aware LRU (TLRU), Most Recently Used (MRU), Least-Frequently Used (LFU), random replacement, and/or the like.

The cache logic 210, prefetch logic 230, and/or components and functionality thereof may include, but are not limited to: circuitry, logic circuitry, control circuitry, interface circuitry, input/output (I/O) circuitry, fuse logic, analog circuitry, digital circuitry, logic gates, registers, switches, multiplexers, arithmetic logic units (ALU), state machines, microprocessors, processor-in-memory (PIM) circuitry, and/or the like. The cache logic 210 may be configured as a controller of the cache 110 (or cache controller). The prefetch logic 230 may be configured as a prefetcher (or cache prefetcher) of the cache 110.

FIG. 3 illustrates another example 300 of an apparatus for implementing adaptive cache partitioning. The cache 110 may be configured to cache data pertaining to an address space associated with a memory 108, as disclosed herein. In the FIG. 3 example, the apparatus includes a cache 110 coupled between the requestor 201 and memory 108. In some implementations, the cache 110 is interposed between the requestor 201 and memory 108. The cache 110 can include and/or be coupled to a first interface 215A and/or a second interface 215B. The first interface 215A may be configured receive requests 202 pertaining to addresses 204 of the address space through a first interconnect 105A and, as such, may be referred to as a front-end interconnect. The requests 202 may correspond to one or more requestors 201, as disclosed herein. The second interface 215B may be configured to, inter alia, couple the cache 110 (and/or cache logic 210) to a backing memory, such as the memory 108 and, as such, may be referred to as a back-end interface. Cache data 128 may be loaded into the cache 110 in transfer operations 203 implemented by and/or through the second interface 215B. Alternatively, the requestor 201, cache 110, and memory 108 may be coupled to a same interconnect, as illustrated in FIG. 2. The cache memory 120 may include a plurality of cache units 220 (e.g., X cache units 220-1 through 220-X). The cache units 220 may include memory cells, memory rows, memory columns, memory pages, cache lines, hardware cache lines, cache memory units 320, cache tags 326, and/or the like. In some implementations, the cache units 220 are organized into a plurality of sets, each set including a plurality of ways, each way including and/or corresponding to a respective cache unit 220.

In the FIG. 3 example, each cache unit 220 includes and/or is associated with a respective cache memory unit (CMU) 320 and/or cache tag 326. The cache tag 326 may be configured to identify the data stored within the CMU 320. The CMU 320 may be capable of storing cache data 128 associated with one or more addresses 204 of the address space (one or more addressable data units). In some aspects, each CMU 320 (and each cache unit 220) is capable of storing data of U addresses 204 (or U data units). In implementations where address space references respective bytes (is byte-addressable), each CMU 320 (and corresponding cache unit 220) may have a capacity of U bytes.

The cache units 220 may further include and/or be associated with cache metadata 322. The cache metadata 322 of a cache unit 220 may include information pertaining to the cache data 128 stored within the CMU 320 of the cache unit 220 (e.g., cache metadata 322-1 through 322-X pertaining to cache data 128 stored within CMU 320-1 through 320-X of cache units 220-1 through 220-X, respectively). The cache metadata 322 may include any suitable information pertaining to the contents of a cache unit 220 including, but not limited to: validity information indicating whether cache data 128 stored within the CMU 320 of the cache unit 220 is valid, a "dirty" flag indicating whether the cache data 128 has been modified since being loaded from the memory 108 (should be written to the memory 108 before eviction), access count, last access time, access frequency, a prefetch flag indicating whether the cache data 128 was loaded in a prefetch operation, and so on. In some implementations, the cache metadata 322 of a cache unit 220 may be maintained within the CMU 320 of the cache unit 220. Alternatively, cache metadata 322 may be maintained within separate cache memory resources.

The cache logic 210 may implement, include and/or be coupled to partition logic 310, which may be configured to, inter alia, partition the cache memory 120 into a first portion 124 and second portion 126 (e.g., divide the cache memory 120 into a first partition and second partition). The cache logic 210 may be configured to map, assign, and/or otherwise associate addresses 204 with cache units 220 allocated to the second portion 126. The cache logic 210 may associate addresses 204 with cache units 220 according to an address-cache mapping scheme (an address mapping scheme 316 or address mapping logic). In the FIG. 3 example, the address mapping scheme 316 may logically divide addresses 204 into a tag region (an address tag 206) and an offset region 205. The offset region 205 may be defined within a least significant bit (LSB) address region. The number of bits included in the offset region 205 may correspond to the capacity of the cache units 220 (e.g., $O=\log_2 U$, where O is the number of bits included in the offset region 205, and U is the capacity of the CMU 320 of the cache units 220 (in terms of addressable data units)). The address tag 206 may be defined within the remaining most significant bit (MSB) address region. The number of bits included in address tags 206 ($T_A$) may be $T_A = A_L - U$, where $A_L$ is the number of bits included in the address 204 (e.g., 64 bits). Although example addresses 204, offset regions 205, and address tags 206 are illustrated and described herein in reference to big-endian format, the disclosure is not limited in this regard and could be adapted for use with addresses 204 in any suitable format, encoding, or endianness.

The cache logic 210 can be configured to map address tags 206 to cache units 220 using any suitable address mapping scheme 316 (or map logic) including, but not limited to: a modulo scheme ($I_U = T_A \% C$, where $I_U$ is the index of the cache unit 220 to which address tag ($T_A$) 206 maps within a set or group of C cache units 220), a mapping function (e.g., by $I_U = f_U(T_A, C)$, where $f_U$ is a function that maps address tags ($T_A$) 206 to indexes $I_U$ within a group of C available cache units 220), a hash function (e.g., by $I_U = f_h(T_A, C)$, where $f_h$ is a function that maps address tags ($T_A$) 206 to indexes $I_U$ by hash values derived from the address tags ($T_A$) 206, a direct mapping, a fully associate mapping, a set-associative mapping, and/or the like. The cache logic 210 can lookup cache units 220 for addresses 204 and/or determine whether the cache memory 120 includes valid data corresponding to the addresses 204 (e.g., determine whether addresses 204 are cache hits or cache misses). The cache logic 210 can lookup cache units 220 for respective addresses 204 by, inter alia, matching address tags 206 of the addresses 204 to cache tags 326 of the cache units 220. Addresses 204 that match cache tags 326 may be identified as cache hits, whereas addresses 204 that do not match cache tags 326 may be identified as cache misses. In some implementations, the cache logic 210 implements a hierarchical or set-based address mapping scheme 316 in which address tags 206 are first mapped to one of a plurality of sets and then are compared to cache tags 326 of a plurality of ways of the set, each way corresponding to a respective cache unit 220.

The cache logic 210 may include and/or be coupled to prefetch logic 230, which may utilize metadata 122 pertaining to the address space to predict addresses of upcoming requests 202 and prefetch data corresponding to the predicted addresses into the cache memory 120, as disclosed herein. At least a portion of the metadata 122 may be maintained within the cache memory 120. The cache logic 210 may include, implement, and/or be coupled to partition logic 310, which may be configured to divide the cache memory 120 into a first portion 124 and a second portion 126 (partition the cache memory 120). The first portion 124 may be allocated for metadata 122 pertaining to the address space. The partition logic 310 may utilize a remaining available capacity of the cache memory 120 (the second portion 126) as available cache capacity. The cache logic 210 can use the second portion 126 of the cache memory 120 to maintain cache data 128, as disclosed herein.

The partition logic 310 may be configured to partition the cache memory 120 into a first partition comprising a first portion 124 of the cache memory resources of the cache memory 120 (e.g., a first quantity of cache units 220) and a second partition comprising a second portion 126 of the cache memory resources (e.g., a second quantity of cache units 220). The first portion 124 of the cache memory 120 may be allocated to store the metadata 122 pertaining to the address space, and the second portion 126 may be allocated as available cache capacity of the cache 110 (e.g., allocated to store cache data 128). The partition logic 310 may be configured to adjust the quantity to cache memory resources allocated to the first portion 124 and/or second portion 126 based, at least in part, on metrics 212 that are indicative of prefetch performance and/or a degree to which workload(s) being serviced by the cache 110 are suitable for prefetching. The partition logic 310 can be configured to zero or more cache units 220 to the first portion 124 and allocate one or more cache units 220 to the second portion 126.

In the example 300 illustrated in FIG. 3, the cache logic 210 (and/or partition logic 310) allocates M cache units 220 of X available cache units 220 of the cache memory 120 to the first portion 124, such that C cache units 220 are allocated to the second portion 126, where C=X−M. The first portion 124 of the cache memory 120 may include cache units 220-1 through 220-M, and the second portion 126 may include cache units 220-M+1 through 220-X. The disclosure is not limited in this regard, however, and could partition the cache memory 120 and/or allocate cache units 220 in any suitable pattern or in accordance with any suitable scheme or arrangement.

The cache logic 210 may implement, include and/or be coupled to a metadata mapping scheme 314 (and/or metadata mapping logic), which may be configured to map, address, associate, reference, and/or otherwise provide access to cache units 220 allocated to the first portion 220. The metadata mapping scheme 314 may enable the prefetch logic 230 (or external prefetcher) to access metadata 122 maintained within the first portion 124 of the cache memory 120. In some implementations, the metadata mapping scheme 314 implemented by the cache logic 210 (and/or partition logic 310) maps metadata addresses to cache units 220 allocated to the first portion 124 (and/or offsets within the respective cache units 220). The metadata mapping scheme 314 may define a metadata address space ($M_A$), $M_A \in \{0, \ldots, (M \cdot U)-1\}$, where U is the capacity of a cache unit 220 (capacity of a CMU 320), and M is the quantity of cache units 220 allocated to the first portion 124. Alternatively, or in addition, 220, the metadata address space ($M_A$) may define a range of cache unit indexes $M_I$, each corresponding to a respective one of the M cache units 220 allocated to the first portion 124, $M_A \in \{0, \ldots, M-1\}$. Although examples of metadata mapping schemes 314 (and/or metadata addressing and/or access schemes) are described herein, the disclosure is not limited in this regard and could be adapted to provide access to cache memory 120 allocated to the first portion 124 through any suitable mechanism or technique.

Partitioning the cache memory 120 into a plurality of portions (e.g., a first portion 124 and second portion 126) may include configuring mapping logic and/or mapping schemes of the portions to allocate, include, and/or incorporate designated cache memory resources of the cache memory 120. As used herein, "allocating," "partitioning," or "assigning" a portion of the cache memory 120 (or "allocating," "partitioning," or "assigning" cache memory resources to a portion or partition of the cache memory 120) may include configuring mapping logic and/or a mapping scheme of the portion (or partition) to "include" or "reference" the cache memory resources. Configuring mapping logic and/or a mapping scheme to "include" or "reference" cache memory resources allocated to the portion or partition of the cache memory 120 may include configuring the mapping logic and/or mapping scheme to reference, allocate, include, incorporate, add, map, address, associate and/or otherwise access (or provide access to) the cache memory resources. Allocating cache memory resources to a portion or partition of the cache memory 120 (e.g., the first portion 124) may further include "deallocating," "removing," or "excluding" the memory resources from other partitions or portions of the cache memory 120 (e.g., the second portion 126). As used herein, "deallocating," "removing," or "excluding" cache memory resources from a portion or partition of the cache memory 120 may include configuring mapping logic and/or a mapping scheme of the portion (or partition) to "remove," "exclude," or "dereference" the cache memory resources. Configuring mapping logic and/or a mapping scheme to "remove," "exclude," or "dereference" cache memory resources may include configuring the mapping logic and/or mapping scheme to remove, disable, ignore, deallocate, dereference, demap, bypass, and/or otherwise exclude the cache memory resources from the partition or portion (e.g., prevent the cache memory resources from being access by and/or through the mapping logic and/or mapping scheme).

In the FIG. 3 example, the cache logic 210 (and/or partition logic) may be configured to allocate M cache units 220 to the first portion 124 of the cache memory 120 (e.g., cache units 220-1 through 220-M). Allocating the M cache units 220 to the first portion 124 may include configuring the metadata mapping scheme 314 (and/or metadata mapping logic) to include and/or reference cache units 220-1 through 220-M, as disclosed herein. Allocating the M cache units to the first portion 124 may further include deallocating and/or excluding the M cache units 220 from the second portion 126. Deallocating or excluding cache units 220-1 through 220-M from the second portion 126 of the cache memory 120 may include configuring the address mapping scheme 316 to remove, exclude, and/or dereference the cache units 220-1 through 220-M. The address mapping scheme 316 may be configured such that addresses 204 (and/or address tags 206) do not map to cache units 220 allocated to the first portion 124. In the FIG. 3 example, the address mapping scheme 316 may be configured to index a subset of the X available cache units 220 of the cache memory 120, the subset including C cache units 220, where C=X−M (e.g., cache units 220-M+1 through 220-X) and excluding the M cache units 220 allocated to the first portion 124 (e.g., cache units 220-1 through 220-M). In some implementations, a cache unit 220 may be excluded from the address mapping scheme 316 by, inter alia, disabling the cache tag 326 associated with the cache unit 220. Allocating the cache units 220-1 through 220-M to the first portion 124 of the cache memory 120 may, therefore, include disabling cache tags 326-1 through 326-M. In FIG. 3, the cache tags 326 of the cache units 220 that are allocated to the first portion 124 of the cache memory 120 (and are excluded from the second portion 126 and/or address mapping scheme 316) are highlighted with crosshatching. Cache tags 326-M+1 through 326-X corresponding to the cache units 220-M+1 through 220-X included in the second portion 126 of the cache memory 120 may remain enabled and/or be indexable by address tags 206 in the address mapping scheme 316.

In some aspects, the cache logic 210 (and/or partition logic 310) divides the cache memory 120 in accordance with a partition scheme 312. The partition scheme 312 may logically define how cache memory resources are divided between the first portion 124 and the second portion 126 of the cache memory 120. The partition scheme 312 may also logically define how cache resources are allocated between the partitions. The partition scheme 312 may define rules, schemes, logic, and/or criteria by which the cache memory 120 may be dynamically allocated and/or partitioned between the first portion 124 and the second portion 126. The partition scheme 312 may be further configured to specify the amount, quantity, and/or capacity of cache memory resources to allocate to the first portion 124 and/or second portion 126, respectively. Adapting the partition scheme 312 may include modifying the amount, quantity, and/or capacity of the cache memory resources allocated to the first portion 124 and/or second portion 126. In the FIG. 3 example, the partition scheme 312 allocates M cache units 220 for metadata storage (e.g., allocates M cache units 220 to the first portion 124) and allocates X-M cache units 220 as available cache capacity (e.g., allocates the remaining X-M cache units 220 to the second portion 126).

In some implementations, the partition scheme 312 configures the cache logic 210 (and/or partition logic 310) to allocate cache units 220 to the first portion 124 by cache unit 220 (may partition the cache memory 120 in accordance with a cache-unit or cache-unit-based scheme). The partition scheme 312 may allocate cache units 220 sequentially by cache unit address or index. In a sequential partition scheme 312, allocating M cache units 220 to the first portion 124 may include allocating cache units 220-1 through 220-M to the first portion 124 such that cache units 220-M+1 through 220-X are allocated to the second portion 126, as illustrated in FIG. 3. Increasing the size of the first portion 124 may include allocating additional cache units 220 to the first portion 124 sequentially. In a sequential scheme, increasing the amount of cache units 220 allocated to the first portion 124 from M cache units 220 to M+R cache units 220 (e.g., increasing the size of the first portion 124 by R cache units 220) may include allocating cache units 220-M+1 through 220-M+R from the second portion 126 to the first portion 124. As a result, the first portion 124 may include cache units 220-1 through 220-M+R, and the second portion 126 may include cache units 220+M+R+1 through 220-X. Conversely, decreasing the size of the first portion 124 from M cache units 220 to M-R cache units 220 (e.g., decreasing the size of the first portion 124 by R cache units 220) may include allocating cache units 220-M-R through 220-M from the first portion 124 to the second portion 126. As a result, the first portion 124 may include cache units 220-1 through 220-M-R, and the second portion 126 may include cache units 220+M−R+1 through 220-X.

Although examples of partitioning schemes 312 are described herein, the disclosure is not limited in this regard. In other implementations, the partition scheme 312 may configure the cache logic 210 (and/or partition logic 310) to allocate cache units 220 in other patterns, sequences, and/or schemes. In one example, the partition scheme 312 may define an interleaved allocation pattern, a modulo pattern, a hash pattern, may allocate cache units 220 in accordance with the hardware structure of the cache memory 120 and/or manner in which cache units 220 of the cache memory 120 are organized, and/or the like.

In some implementations, the cache memory 120 includes a plurality of sets, each set including a plurality of ways, each way including and/or corresponding to a respective cache unit 220. The partition scheme 312 may allocate cache memory resources by way, set, or the like. In a way-based scheme, the cache logic 210 (and/or partition logic 310) may partition the cache memory 120 by way. In one example, the cache logic 210 may allocate a first quantity of zero or more ways within one or more sets to the first portion 124 and may allocate a second quantity of one or more ways within one or more sets to the second portion 126. In another example, the first portion 124 includes a first quantity of zero or more ways within each set of the cache memory 120, and the second portion 126 includes a second quantity of one or more ways within each set. In a cache memory 120 that includes N-way sets (e.g., each set including N ways of cache units 220), the first portion 124 may include a first group of ways within each set and the second portion 126 may include a second group of ways within each set (e.g., may include ways not allocated to the first portion 124). Allocating M cache units 220 to the first portion 124 of the cache memory 120 by way may include allocating $W_1$ ways to the first portion within each set, where $$W_1 = \frac{M}{S}$$

and S is the quantity of sets included in the cache memory. The second portion 126 may be allocated $W_2$ ways within each set, where $W_2 = N - W_1$ or $$W_2 = \frac{X - M}{S}$$

and N is the number of ways within each set. The first portion 124 may include ways 1 through $W_1$ within each set, and the second portion 126 may include ways $W_1+1$ through N within each set. The disclosure is not limited in this regard, however, and could distribute ways between the first portion 124 and second portion 126 in any suitable manner, scheme, and/or pattern.

In a way-based scheme, increasing the amount of cache memory 120 allocated to the first portion 124 from M to M+R cache units 220 may include allocating an additional $W_{1A}$ ways of each set to the first portion 124 (and deallocating the $W_{1A}$ ways of each set from the second portion 126), where $$W_{1A} = \frac{R}{S}.$$

As a result, the first portion 124 may include ways 1 through $W_1+W_{1A}$ within each set, and the second portion 126 may include ways $W_1+W_{1A}+1$ through N within each set. Conversely, decreasing the amount of cache memory 120 allocated to the first portion 124 from M to M-R cache units 220 may include allocating $W_{2A}$ ways of each set from the first portion 124 to the second portion 126, where $$W_{2A} = \frac{R}{S}.$$

As a result, the first portion 124 may include ways 1 through $W_1-W_{2A}$ within each set, and the second portion 126 may include ways $W_1-W_{2A}+1$ through N within each set.

Alternatively, or in addition, the cache logic (and/or partition logic 310) may be configured to partition the cache memory 120 by set. Allocating a set may include allocating each way (and/or corresponding cache unit 220) of the set. In a set-based scheme, the first portion 124 may include a first group of zero or more sets of the cache memory 120 and the second portion 126 may include a second group of one or more of the sets (may include each set of the cache memory 120 not allocated to the first portion 124). Allocating M cache units 220 of the cache memory 120 to the first portion 124 by set may include allocating $E_1$ sets to the first portion 124, where $$E_1 = \frac{M}{N}$$

and N is the number of ways included in each set such that $E_2$ sets are allocated to the second portion 126, where $E_2=S-E_1$ and S is the number of sets included in the cache memory 120. The first portion 124 may include sets 1 through $E_1$ of the cache memory 120 and the second portion 126 may include sets $E_1+1$ through S. The disclosure is not limited in this regard, however, and could distribute sets between the first portion 124 and second portion 126 in any suitable manner, scheme, and/or pattern.

In a set-based scheme, increasing the amount of cache memory 120 allocated to the first portion 124 from M to M+R cache units 220 may include allocating an additional $E_{1A}$ sets of the cache memory 120 to the first portion 124 (and deallocating the $E_{1A}$ sets from the second portion 126), where $$E_{1A} = \frac{R}{N}.$$

As a result, the first portion 124 may include sets 1 through $E_1+E_{1A}$ and the second portion 126 may include sets $E_1+E_{1A}+1$ through S. Conversely, decreasing the amount of cache memory 120 allocated to the first portion 124 from M to M-R cache units 220 may include allocating $E_{2A}$ sets from the first portion 124 to the second portion 126, where $$E_2 = \frac{R}{N}.$$

As a result, the first portion 124 may include sets 1 through $E_1-E_{2A}$, and the second portion 126 may include sets $E_1-E_{2A}+1$ through S.

As disclosed herein, the cache logic 210 (and/or partition logic 310) can adjust the amount of cache memory 120 allocated to the first portion 124 (and/or second portion 126) based, at least in part, on one or more metrics 212. The metrics 2121 may be configured to quantify the degree to which the workload on the cache 110 is suitable for prefetching. The metrics 212 may be configured to quantify aspects of prefetch performance. The cache logic 210 (and/or prefetch logic 310) can determine and/or monitor any suitable aspect of prefetch performance, such as prefetch hit rate, prefetch miss rate, quantity of useful prefetches, quantity of bad prefetches, ratio of useful prefetches to bad prefetches, and/or the like. Prefetch hit rate may be determined by tracking accesses to prefetched cache data 128 within the cache memory 120. As used herein, "prefetched" cache data 128 refers to cache data 128 that was loaded into the cache memory 120 before being requested (e.g., by the prefetch logic 230 and/or in a prefetch operation). Conversely, non-prefetched cache data 128 refers to cache data 128 that was loaded in response to a request 202, a cache miss, or the like. In some implementations, the cache logic 210 tracks prefetched cache data 128 by use of cache metadata 322. The cache logic 210 may record a prefetch flag or other indicator in the cache metadata 322 to distinguish prefetched cache data 128 from non-prefetched cache data 128. A prefetch hit rate may be determined based on access metrics of prefetched cache data 128 maintained within the cache metadata 322, such as access count, access frequency, last access time, and/or the like. Alternatively, or in addition, prefetch miss rate may be determined by identifying prefetched cache data 128 having no accesses or accesses below a threshold quantity or frequency.

In some aspects, the metrics 212 are further configured to quantify other aspects of cache performance, such as cache hit rate, cache miss rate, request latency, and so on. The cache logic 210 may be configured to determine and/or monitor aspects of cache performance. The cache logic 210 may be configured to determine a cache hit rate by, inter alia, monitoring a quantity of requests 202 that result in cache hits, monitoring a quantity of requests 202 that result in cache misses, and/or the like.

In some implementations, the one or more metrics 212 are configured to quantify aspects of cache and/or prefetch performance for respective regions of the address space. The cache logic 210 (and/or prefetch logic 230) can determine and/or monitor prefetch performance within regions of the address space covered by respective entries of the metadata 122. The metrics 212 may, therefore, quantify the degree to which the workloads within respective regions of the address space are suitable for prefetching. The prefetch logic 230 may utilize the metrics 212 to determine whether to implement prefetching within the respective address regions, the prefetch degree for respective address regions, the amount of metadata 122 to maintain for the respective address regions, and/or the like.

The cache logic 210 (and/or partition logic 310) can utilize the one or more metrics 212 to dynamically partition the cache memory 120. More specifically, the cache logic 210 may utilize the metrics 212 to determine, tune, adapt, and/or otherwise manage the amount of cache memory 120 allocated for storage of the metadata 122 pertaining to the address space (the amount of cache memory 120 allocated to the first portion 124) and/or the amount of cache memory 120 allocated for storage of cache data 128 (the amount of cache memory 120 allocated to the second portion 126). The cache logic 210 (and/or partition logic 310) may be configured to: a) increase the quantity of cache units 220 allocated to the first portion 124 when one or more of the metrics 212 exceed a first threshold (thereby decreasing the quantity of cache units 220 allocated for storage of cache data 128 within the second portion 126), or b) decrease the quantity of cache units 220 allocated to the first portion 124 when one or more of the metrics 212 is below a second threshold (thereby increasing the quantity of cache units 220 allocated for storage of cache data 128 within the second portion 126). Since the metrics 212 can be configured to quantify prefetch performance, the adjustments implemented by the cache logic 210 can dynamically allocate cache memory resources between the first portion 124 (metadata 122) and the second portion 126 (cache data 128) based on the degree to which workload(s) being serviced by the cache 110 are suitable for prefetching. The cache logic 210 can increase the amount of cache memory 120 allocated for the metadata 122 under workload conditions that are suitable for prefetching and can decrease (or eliminate) the allocation under workload conditions that are not suitable for prefetching, thereby increasing the amount of available cache capacity when servicing unsuitable workloads.

Increasing the quantity of cache units 220 allocated to the first portion 124 may include assigning or allocating one or more cache units 220 of the second portion 126 to the first portion 124. As disclosed herein, allocating a cache unit 220 to the first portion 124 may include configuring the metadata mapping scheme 314 (and/or metadata mapping logic) to include the cache unit 220, providing the prefetch logic 230 with access to the cache unit 220 (or CMU 320 thereof), and/or otherwise making the CMU 320 of the cache unit 220 available for storage of metadata 122 pertaining to the address space.

Allocating a cache unit 220 to the first portion 124 of the cache memory 120 may further include deallocating the cache unit 220 from the second portion 126. Deallocating a cache unit 220 from the second portion 126 of the cache memory 120 may include configuring the address mapping scheme 316 (and/or address mapping logic) to remove or exclude the cache unit 220. The address mapping scheme 316 may be configured to dereference the cache unit 220 such that the cache unit 220 is excluded from the C cache units 220 included in the second portion 126. The address mapping scheme 316 may be modified to remove the cache unit 220 from an index or other mechanism by which addresses 204 and/or address tags 206 are associated with cache units 220 (e.g., by disabling the cache tag 326 of the cache unit 220). Deallocating a cache unit 220 from the second portion 126 may further include evicting cache data 128 from the cache unit 220, setting a validity flag of the cache metadata 322 to "false," and/or the like. In some implementations, deallocating a cache unit 220 from the second portion 126 further includes identifying "dirty" cache data 128 within the cache unit 220 (based, at least in part, on cache metadata 322 associated with the cache data 128, such as "dirty" indicators) and flushing and/or destaging the identified cache data 128 (if any) to a backing memory, such as the memory 108 (e.g., writing the identified cache data 128 back to the memory 108).

The cache logic 210 (and/or partition logic 310) may be configured to preserve cache state when repartitioning the cache memory 120 to increase the size of the first portion 124 and/or decrease the size of the second portion 126. The cache logic 210 may preserve cache state when reducing the amount of cache memory 120 allocated to the second portion 126 by, inter alia, compacting cache data 128 stored within the second portion 126 for storage within fewer cache units 220. Allocating R cache units 220 from the second portion 126 of the cache memory 120 to the first portion 124 may include compacting cache data 128 stored within the second portion 126 of the cache memory 120 from current size corresponding to $C_1$ cache units 220 to a compacted size corresponding to $C_2$ cache units 220, where $C_2=C_1-R$. Compacting the cache data 128 may include evicting a first subset of the cache data 128 currently stored within the second portion 126 of the cache memory 120, the first subset including an amount of cache data 128 equivalent to R cache units 220 (and/or cache data 128 stored within R cache units 220 currently allocated to the second portion 126). The first subset of the cache data 128 may be selected for eviction based on a suitable eviction or replacement policy and/or criteria, such as FIFO, LIFO, LRU, TLRU, MRU LFU, random replacement, or the like. Evicting cache data 128 from a cache unit 220 may make the cache unit 220 available to store other cache data 128 (transition the cache unit 128 from "occupied" to "available" or empty). The cache logic 210 (and/or partition logic 310) may be further configured to move remaining cache data 128 stored within cache units 220 that are to be allocated to the first portion 124 (if any) to available cache units 220 that are to remain allocated to the second portion 126.

In some implementations, increasing the size of the first portion 124 of a cache memory 120 that includes X cache units 220 from M cache units 220 to M+R cache units 220 may include: a) selecting cache units 220 of the second portion 126 to allocate to the first portion 124 (e.g., selecting R cache units 220 for reallocation), b) evicting cache data 128 from R cache units 220 of the C cache units 220 currently allocated to the second portion 126 (where C=M−X), c) moving cache data 128 stored within the selected cache units 220 (if any) to available cache units 220 of the C-R cache units 220 to remain allocated to the second portion 126, and d) allocating the R selected cache units 220 from the second portion 126 to the first portion 124. The cache units 220 selected for eviction may be different from the cache units 220 selected for reallocation. As disclosed herein, the cache logic 110 may select cache units 220 for eviction based on an eviction or replacement policy. By contrast, the cache logic 110 (and/or partition logic 310) may select cache units 220 to reallocate from the second portion 126 to the first portion 124 (or vice versa) based on separate, independent criteria. The cache units 220 to reallocate from the second portion 126 to the first portion 124 (or vice versa) may be selected in accordance with a partition scheme 312, as disclosed herein. The partition scheme 312 may define rules, schemes, logic, and/or other criteria by which cache units 220 are divided (and/or dynamically allocated) between the first portion 124 and the second portion 126. The partition scheme 312 may divide the cache memory 120 in any suitable pattern or scheme including, but not limited to: a sequential scheme, a way-based scheme, a set-based scheme, and/or the like.

Decreasing the quantity of cache units 220 allocated to the first portion 124 may include increasing the quantity of cache units 220 allocated to the second portion 126 (e.g., increasing the available cache capacity). Decreasing the size of the first portion 124 may include assigning or allocating one or more cache units 220 from the first portion 124 to the second portion 126. Allocating a cache unit 220 to the second portion 126 may include removing the cache unit 220 from the metadata mapping scheme 314, such that the cache unit 220 is no longer included in the group of M cache units 220 available for storage of the metadata 122 (e.g., modifying the metadata address scheme $M_A$). Allocating the cache unit 220 to the second portion 126 may further include modifying the address mapping scheme 316 to reference the cache unit 220 (e.g., including the cache unit 220 in the group of C cache units 220 available for storage of cache data 128). The address mapping scheme 316 may be modified to enable addresses 204 and/or address tags 206 to map and/or be assigned to the cache unit 220 by, inter alia, enabling the cache tag 326 of the cache unit 220.

Decreasing the quantity of cache units 220 allocated to the first portion 124 may decrease the amount of cache memory 120 available for storage of the metadata 122. Decreasing the size of the first portion 124 may, therefore, include compacting the metadata 122 for storage within a smaller amount of cache memory 120. The metadata 122 may be compacted for storage within a smaller memory range (e.g., from a first size $M_1$ to a second, smaller size $M_2$). Compacting the metadata 122 may include removing a portion of the metadata 122, such as one or more entries of the metadata 122. The portion of the metadata 122 may be selected based on a removal criterion, such as an age criterion (oldest removed first, youngest removed first, or the like), least recently accessed criterion, least frequently accessed criterion, and/or the like.

Alternatively, or in addition, portions of the metadata 122 may be selected for removal based, at least in part, on one or more metrics 212. The metadata 122 may include a plurality of entries, each entry including access information pertaining to a respective region of the address space. The prefetch logic 230 may utilize respective entries of the metadata 122 to implement prefetch operations within the address regions covered by the respective entries. The one or more metrics 212 may be configured to quantify prefetch performance within the address regions covered by the respective entries of the metadata 122. Compacting the metadata 122 may include selecting entries of the metadata 122 for removal based, at least in part, on prefetch performance within the address regions covered by the entries, as quantified by the metrics 212. In some implementations, entries of the metadata 122 in which prefetch performance is below a threshold may be removed (and/or the amount of memory capacity allocated to the entries may be reduced). Alternatively, entries of the metadata 122 exhibiting higher prefetch performance may be retained, whereas entries exhibiting lower prefetch performance may be removed (e.g., the R lowest-performing entries of the metadata 122 may be selected for removal). Compacting the metadata may, therefore, include removing metadata 122 from one or more cache units 220 and/or moving metadata 122 (and/or entries of the metadata 122) from cache units 220 being reallocated to the second portion 126 to the remaining cache units 220 allocated to the first portion 124.

Figures 1, 4:
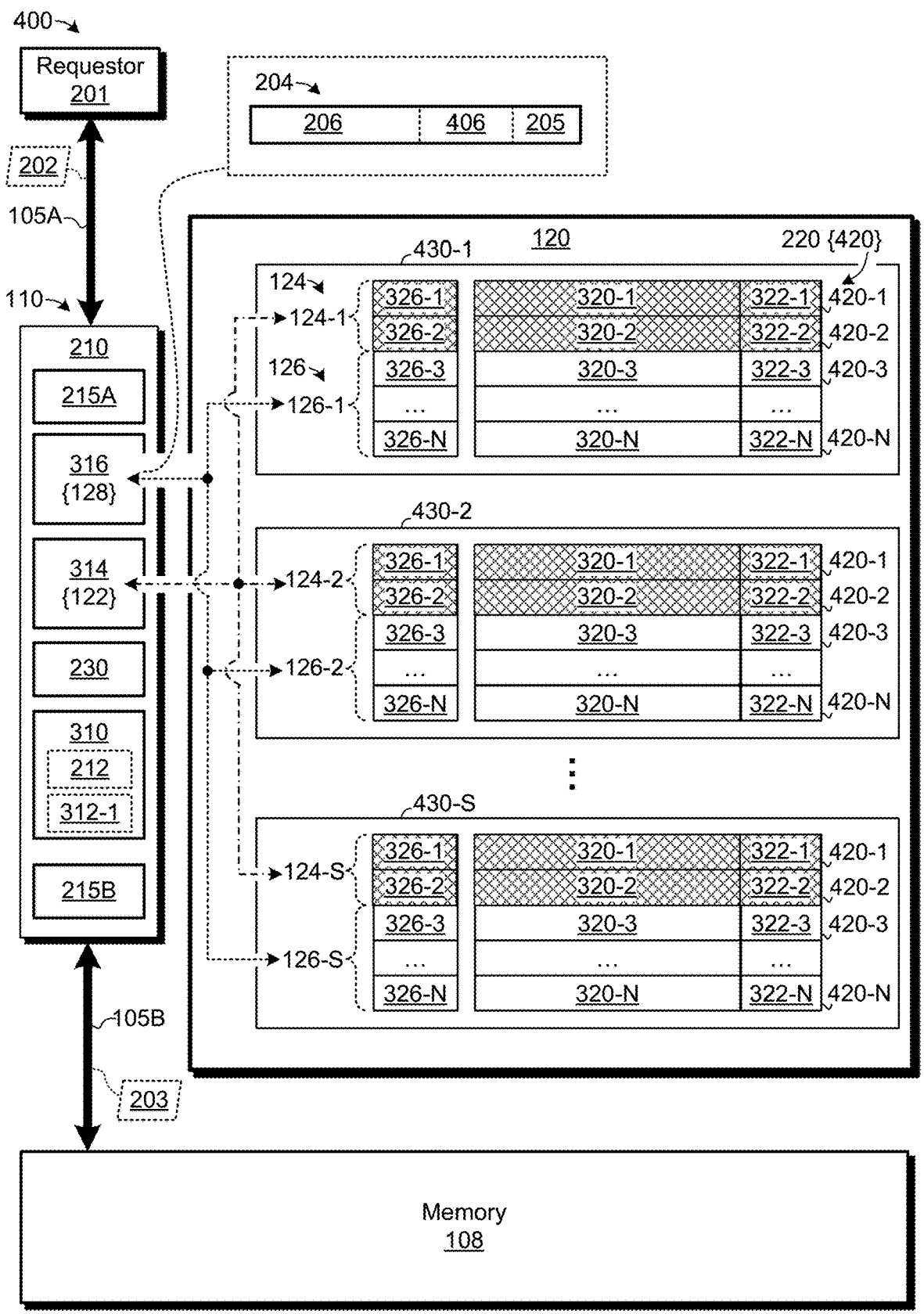
Figures 2, 4:
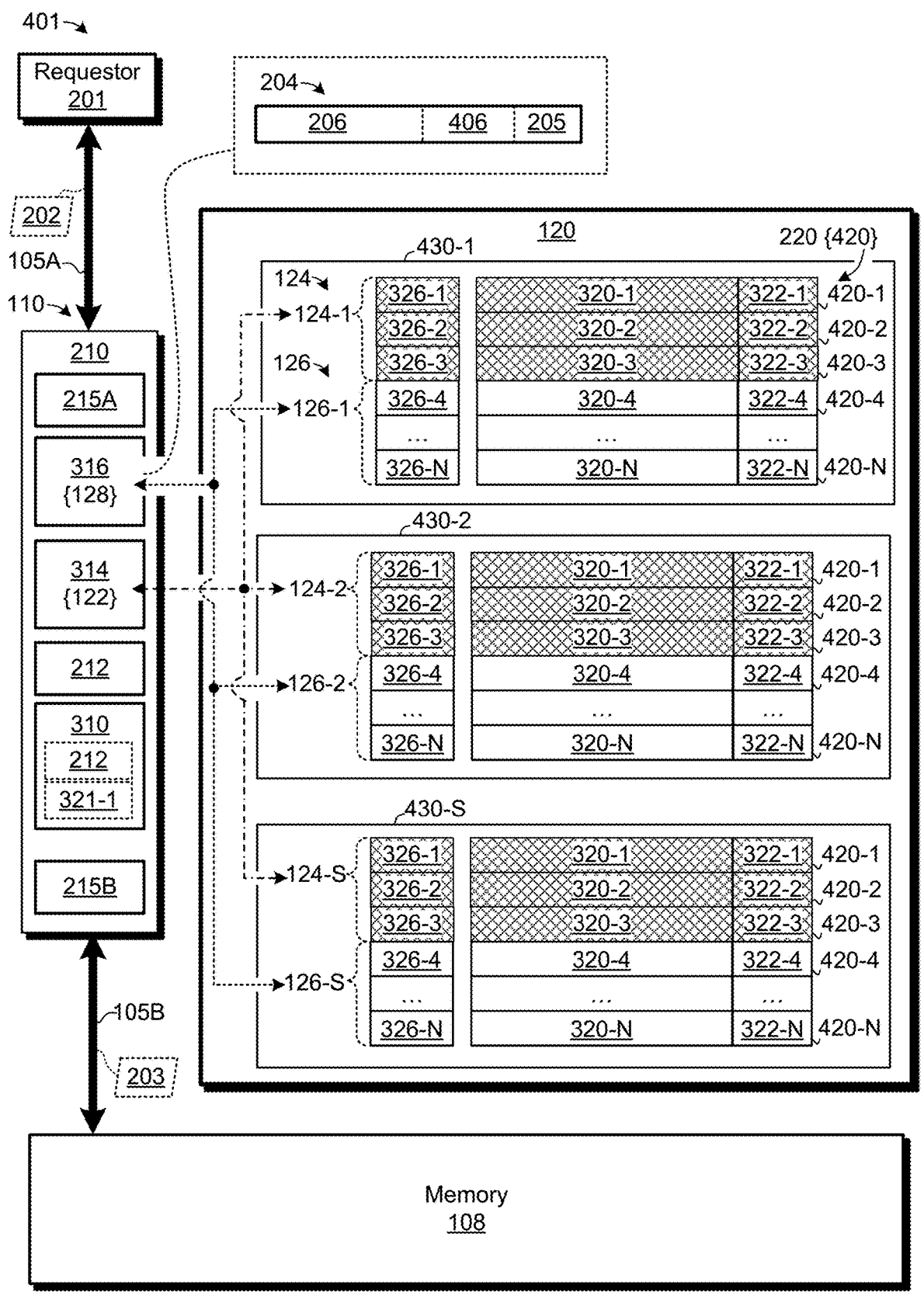
Figures 3, 4:
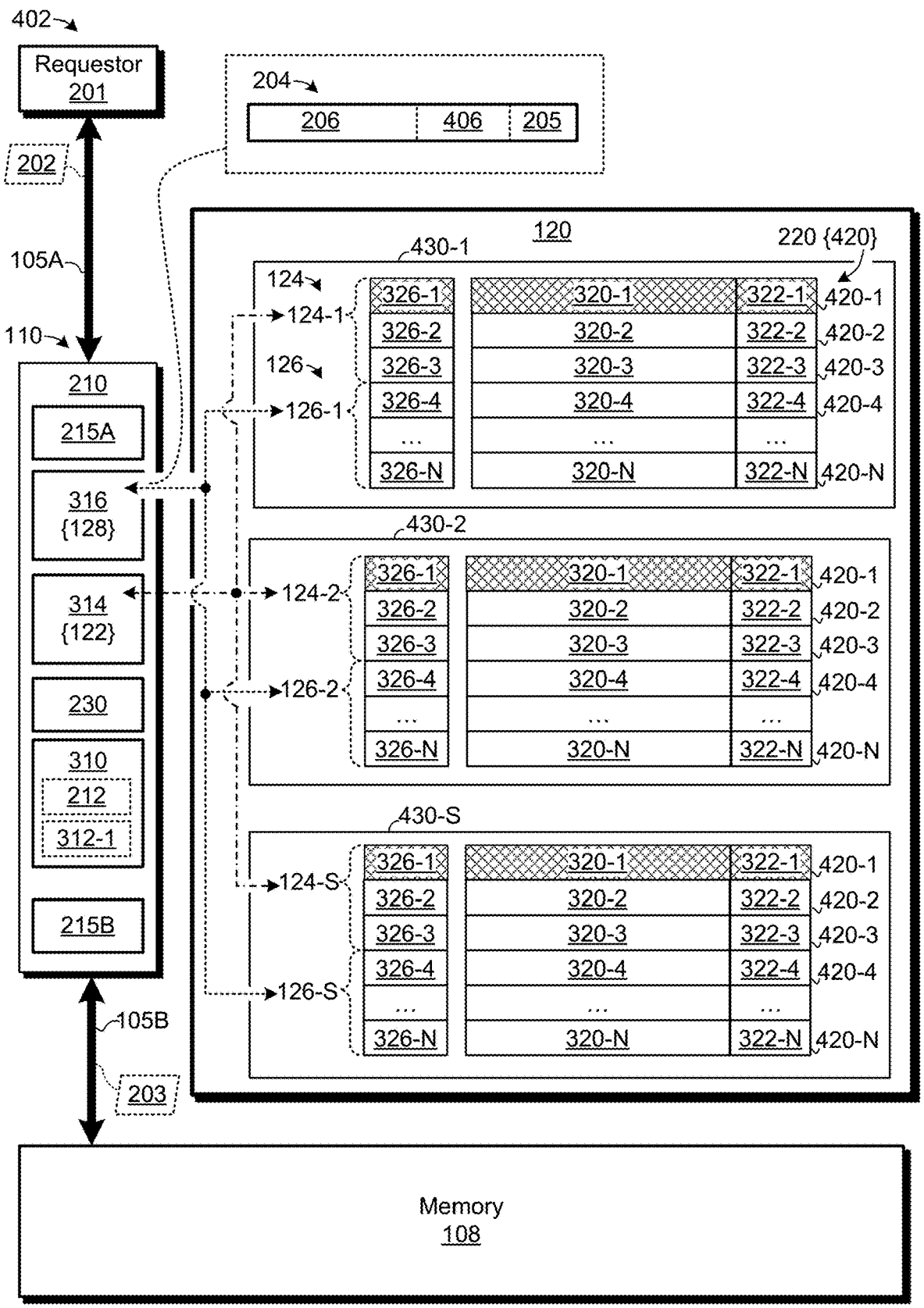

FIG. 4-1 illustrates another example 400 of an apparatus for implementing adaptive cache partitioning. The apparatus 400 includes a cache 110 that is configured to cache data pertaining to an address space associated with a memory 108. The cache 110 may include and/or be coupled to one or more interconnects. In the FIG. 4-1 example, the cache 110 includes and/or is coupled to a first interface 215A configured to couple the cache 110 to a first interconnect 105A and a second interface 215B configured to couple the cache 110 to a second interconnect 105B. The cache 110 may be configured to service requests 202 pertaining to addresses 204 of the address space from one or more requestors 201. The cache 110 may service the requests 202 by use of cache memory 120, which may include loading data associated with addresses 204 of the address space in transfer operations 203. The transfer operations may be implemented in response to cache misses, prefetch operations, and/or the like. The cache 110 may include and/or be coupled to an interface 215, which may be configured to couple the cache 110 (and/or cache logic 210) to one or more interconnects, such as interconnects 105A and/or 105B.

In the FIG. 4-1 example, the cache memory 120 includes a plurality of cache units 220, each cache unit 220 including and/or corresponding to a respective cache line. The cache units 220 may be arranged into a plurality of sets 430 (e.g., sets 430-1 through 430-S). The sets 430 may be N-way associative; each set 430 may include N ways 420, each way 420 including and/or corresponding to a respective cache unit 220 (a respective cache line). As illustrated, each set 430 may include N ways 420-1 through 420-N, each way 420 including and/or corresponding to a respective cache unit 220. The cache memory 120 may include X cache units 220 (or X cache lines), where X=S·N.

The address mapping scheme 316 (or address mapping logic) implemented by the cache logic 210 may be configured to divide addresses 204 into an offset 205, set region (set tag 406), and address tag 206. The offset 205 may correspond to a capacity of the cache units 220 (e.g., a capacity of the CMU 320), as disclosed herein. The address mapping scheme 316 may utilize set tags 406 to associate addresses 204 with respective sets 430. In some aspects, the address mapping scheme 316 includes a set mapping scheme by which set tags 406 are mapped to one of a group of available sets ($S_C$), $S_C$ {420-1, . . . , 420-S}, as follows $S_I = f_S(T_S, S_C)$, where $f_S$ is a set mapping function, $T_S$ is a set tag 406, and $S_I$ is the index or other identifier of the selected set 430. The address mapping scheme 316 may further include a way mapping scheme by which address tags 206 are mapped to one of the N ways 420 of the selected set 430 (e.g., by comparing the address tag 206 to cache tags 326 of the ways 420).

The cache logic 210 can include, implement, and/or be coupled to partition logic 310, which may be configured to partition the cache memory 120 into a first portion 124 and second portion 126. As disclosed herein, the first portion 124 may be allocated for storage of metadata 122 pertaining to the address space, and the second portion 126 may be allocated for storage of cache data 128 (may be allocated as available cache capacity). The cache logic 210 may allocate cache memory 120 between the first portion 124 and the second portion 126 in accordance with a partition scheme 312. The partition scheme 312 may specify an amount of cache memory 120 to be allocated to the metadata 122 (the first portion 124). The partition scheme 312 may also specify a manner in which cache units 220 are allocated to the first portion 124 and/or second portion 126. In the FIG. 4-1 example, the cache logic 210 is configured to partition the cache memory 120 by way 420 (may implement way-based or way partition scheme 312-1). The way partition scheme 312-1 may specify that the first portion 124 is allocated zero or more ways 420 within zero or more sets 430 of the cache memory 120. In some implementations, the way partition scheme 312-1 specifies that the first portion 124 is allocated zero or more ways 420 within each set 430 of the cache memory 120.

In some implementations, the cache memory 120 includes a plurality of banks (e.g., SRAM banks). The ways 420 of the cache memory 120 may be organized within respective banks. More specifically, the ways 420 of each set 430 may be split across multiple banks of the cache memory 120. In some examples, each way 420 may be implemented by a respective one of the banks: way 420-1 of each set 430-1 through 430-S may be implemented by a first bank, way 420-2 of each set 430-1 through 430-S may be implemented by a second bank, and so on, with way 420-N of each set 430-1 through 430-S being implemented by an Nth bank of the cache memory 120. The banks of the cache memory 120 may include separate memory blocks. The first portion 124 allocated to the metadata 122 may, therefore, include zero or more banks (or blocks) of the cache memory 120. The metadata mapping scheme 314 may address banks allocated to the first portion 124 as a linear (or flat) chunk of memory. The metadata mapping scheme 314 may, therefore, enable the metadata 122 to be arranged and/or organized in any suitable manner (e.g., as specified by a prefetcher, prefetcher logic 230, or the like).

In the FIG. 4-1 example, the partition scheme 312-1 allocates two ways 420 within each set 430 to the prefetch logic 230. The first portion 124 of the cache memory 120 allocated for storage of the metadata 122 may, therefore, include ways 420-1 and 420-2 within each set 430-1 through 430-S (may include M cache units 220, where M=2·S. The second portion 126 of the cache memory 120 available for storage of cache data 128 may include N−2 ways within each set 430-1 through 430-S (may include C cache units 220 where M=(N−2)·S. In FIGS. 4-1 through 4-3, ways 420 (and/or cache units 220) that are allocated to the first portion 124 are illustrated with crosshatching to distinguish them from ways 420 that are allocated to the second portion 126. As illustrated, the first portion 124 may include first portions 124-1 through 124-S within each set 430-1 through 430-S of the cache memory 120, and the second portion 126 may include second portions 126-1 through 126-S within sets 430-1 through 430-S.

Allocating a cache unit 220 (or way 420) to the first portion 124 may include configuring the address mapping scheme 316 to disable or ignore the cache unit 220. In FIG. 4-1, two ways 420 of each set 430 are allocated to the first portion 124 and the address mapping scheme 316 is adapted to disable or ignore ways 420-1 and 420-2 of each set 430 (e.g., by disabling cache tags 326-1 and 326-2 of the corresponding cache units 220-1 and 220-2). In the FIG. 4-1 example, the quantity of sets 430 available for storage of cache data 128 ($S_C$) may be substantially unchanged. As illustrated, the second portion 126 of the cache memory 120 may include S sets 430, each including N−2 ways 420 (ways 420-3 through 420-N). The address mapping scheme 316 may, therefore, distribute addresses 204 between the S sets 430 of the cache memory 120 (by set tag 406 or the like). The way mapping scheme implemented by the cache logic 210 (and/or address mapping scheme 316) may be adapted to modify the associativity of the sets 430. In the FIG. 4-1 example, the address mapping scheme 316 manages the sets 430 as [N−2]-way associative rather than N-way associative. More specifically, the address mapping scheme 316 maps N−2 addresses tags 206 to respective sets 430 rather than N address tags 206.

As disclosed herein, allocating a way 420 to the first portion 124 may include evicting cache data 128 from the way 420. Cache data 128 may be selected for eviction from respective sets 430 in accordance with an eviction or replacement policy, as disclosed herein. Allocating R ways 420 of a set 430 to the first portion 124 may include compacting the cache data 128 stored within the set 430 from a capacity of N cache units 220 to N-R cache units 220. The cache logic 210 can select cache data 128 to retain within respective sets 430 and move the selected cache data 128 to the N-R ways 429 of the respective sets 430 that are to remain allocated to the second portion 126. In the FIG. 4-1 example, allocating ways 420-1 and 420-2 of each set 430 to the first portion 124 may include compacting the cache data 128 within each set 430 from a capacity of N cache units 220 to a capacity of N−2 cache units 220 by, inter alia, evicting cache data 128 from a first group of two ways 420 of the set 430 (such that a second group of N−2 ways 420 of the set 430 are retained), moving cache data 128 stored within the second group of ways 420 to ways 420-3 through 430-N of the set 430 (if necessary), and assigning says 420-1 and 420-2 to the first portion 124.

The metadata 122 maintained within the first portion 124 of the cache memory 120 may be accessed in accordance with a metadata mapping scheme 314. In the FIG. 4-1 example, the metadata mapping scheme 314 may define metadata address space (M$_A$) that includes ways 420-1 and 420-2 of each set 430-1 through 430-S. For example, the metadata address space (M$_A$) may include an address range {0, . . . , (R·U·S)−1}, where R is the number of ways 420 allocated to the first portion 124 within each of the S sets 430 and U is the capacity of each way 420 (in terms of addressable data units). Alternatively, the metadata address space (M$_A$) may define addresses corresponding to indexes and/or offsets of respective ways 420 (or cache units 220) of the first portion 124, as follows {0, . . . , (R·S)−1}.

The cache logic 210 (and/or prefetch logic 230) can be configured to determine and/or monitor one or more metrics 212. The metrics 212 may be configured to quantify cache and/or prefetch performance, as disclosed herein. The cache logic 210 (and/or partition logic 310) can adapt the way partition scheme 312-1 based, at least in part, on one or more of the metrics 212. The cache logic 210 can adapt the way partition scheme 312-1 to: increase the size of the first portion 124 (and decrease the size of the second portion 126) when one or more of the metrics 212 exceeds a first threshold or decrease the size of the first portion 124 (and increase the size of the second portion 126) when one or more of the metrics 212 is below a second threshold. Increasing the size of the first portion 124 may include increasing the number of ways 420 allocated to first portion 124 within each set 430 of the cache memory 120. Decreasing the size of the first portion 124 may include decreasing the number of ways 420 allocated to the first portion 124 within each set 430 of the cache memory 120.

FIG. 4-2 illustrates an example 401 in which the number of ways 420 allocated for storage of metadata 122 pertaining to the address space is increased (e.g., from two ways 420 within each set 430 to three ways 420 within each set 430). The amount of cache memory 120 allocated to the first portion 124 may be increased in response to determining and/or monitoring the metrics 212 (e.g., in response to prefetch performance quantified by the metrics 212 exceeding a first threshold). As illustrated, the first portion 124 allocated for storage of the metadata 122 may include ways 420-1 through 420-3 of each set 430-1 through 430-S. The capacity available for storage of the metadata 122 may increase to M=3·S·U, where U is the capacity of a cache unit 220 (or CMU 320) in terms of addressable data units. Allocating the way 420-3 to the first portion 124 may include modifying the metadata mapping scheme 314 to reference way 420-3 within each set 430 (e.g., define a metadata address scheme including addresses 0 through (3·S·U)−1, way indexes 0 through (3·S)−1, or the like).

As illustrated in FIG. 4-2, increasing the size of the first portion 124 may result in decreasing the amount of cache memory 120 allocated for storage of cache data 128 (decrease the size of the second portion 126). Allocating the way 420-3 of each set 430 to the first portion 124 may include compacting cache data 128 stored within each set 430 into N−3 ways 420, as disclosed herein (by selecting cache data 128 within each set 430 for eviction and moving data to retain within each [N−3] associative set 430 to ways 420-3 through 420-N of each set 430. Allocating the way 420-3 may further include modifying the address mapping scheme 316 to associate addresses 204 with [N−3]-way associative sets 430 rather than [N−2] or N-way associative sets 430. Allocating the way 420-3 of each set 430 to the first portion 124 may include disabling the cache tag 326-3 of way 420-3 within each set 430.

FIG. 4-3 illustrates another example 402 in which the number of ways 420 allocated for storage of metadata 122 pertaining to the address space is decreased (e.g., to one way 420 within each set 430). The amount of cache memory 120 allocated to the first portion 124 may be reduced in response to determining and/or monitoring the one or more metrics 212 (e.g., in response to prefetch performance quantified by the metrics 212 falling below a second threshold). As illustrated, the first portion 124 allocated for storage of the metadata 122 may include a single way 420-1 within each set 430-1 through 430-S. The capacity available for storage of the metadata 122 may decrease to M=S·U, where U is the capacity of a cache unit 220 (or CMU 320) in terms of addressable data units (or S cache units 220). Reducing the size of the first portion 124 may include compacting the metadata 122 for storage within a reduced number of ways 420, as disclosed herein (e.g., by portions of the metadata 122, one or more entries of the metadata 122, and/or the like). Reducing the size of the first portion 124 may further include modifying the metadata mapping scheme 314 to reference the smaller number of ways 420 allocated to the first portion 124. In FIG. 4-3, the metadata mapping scheme 314 may reference ways 420-1 within each set 430 and/or define a metadata address scheme including addresses 0 through (S·U)−1, way indexes 0 through (S)−1, or the like.

As illustrated in FIG. 4-3, decreasing the amount of cache memory 120 allocated to the first portion 124 may result in increasing the amount of cache memory 120 allocated for storage of cache data 128 within the second portion 126. In the FIG. 4-3 example, ways 420-2 and 420-3 of each set are allocated to the second portion 126. Allocating ways 420-2 and 420-3 to the second portion 126 may include modifying the address mapping scheme 316 to include ways 420-2 and 420-3 of each set 430 (e.g., by enabling cache tags 326-2 and 326-3 of the ways 420-2 and 420-3).

Figures 1, 5:
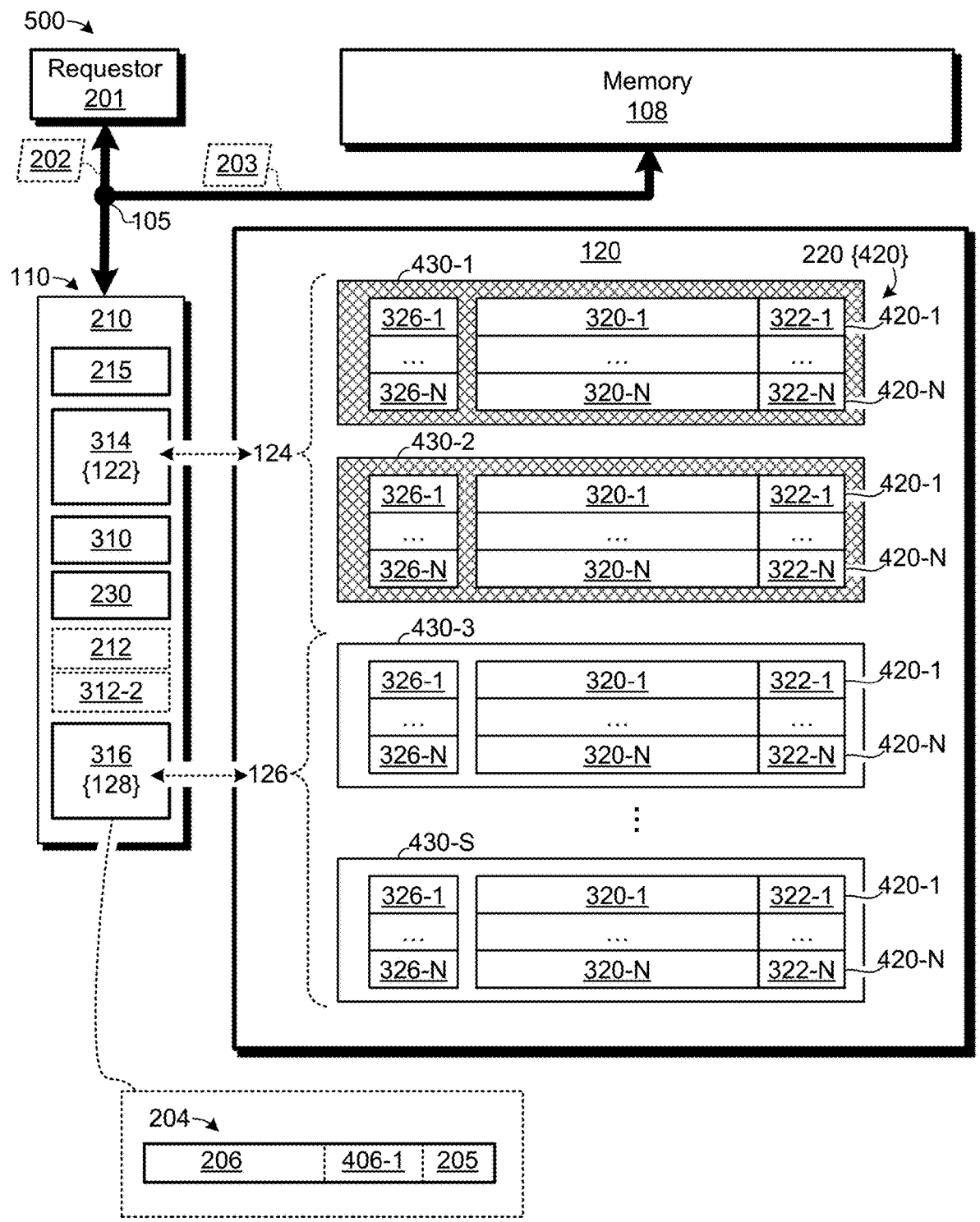
Figures 2, 5:
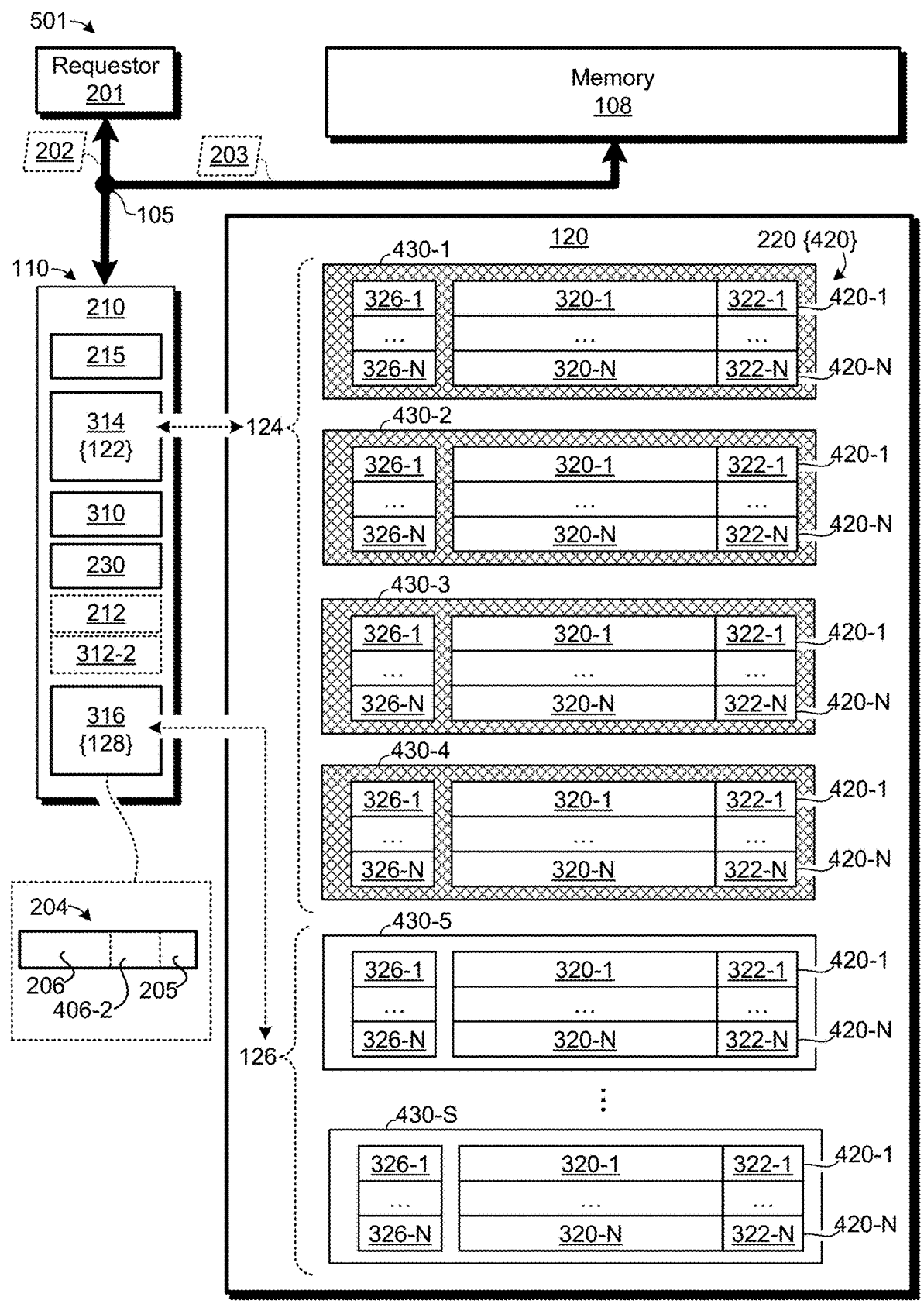
Figures 3, 5:
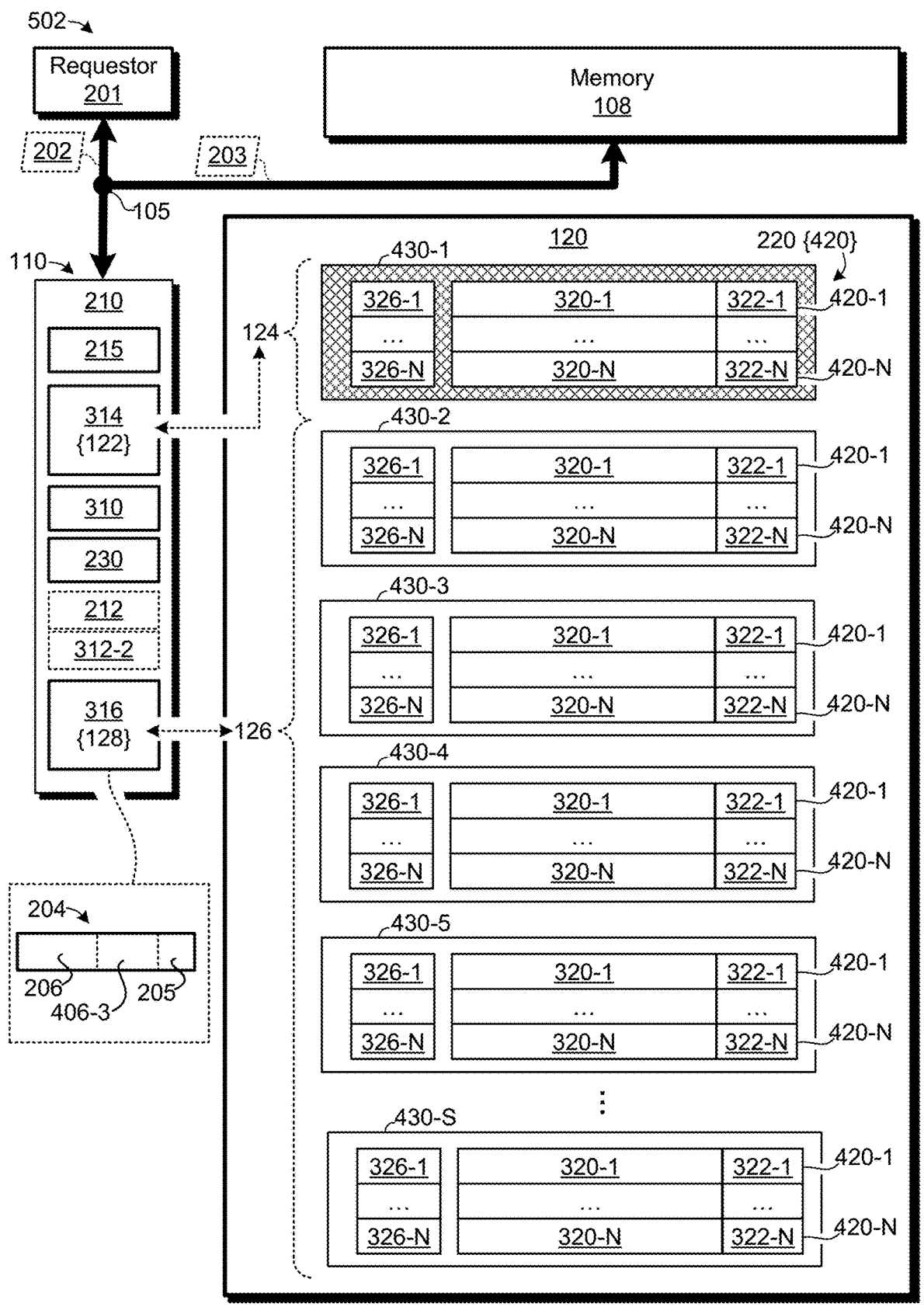

FIG. 5-1 illustrates another example 500 of an apparatus for implementing adaptive cache partitioning. The apparatus 500 includes a cache 110 that is configured to cache data pertaining to an address space associated with a memory 108. The cache 110 may include and/or be coupled to an interface 215, which may be configured to couple the cache 110 (and/or cache logic 210) to an interconnect, such as the interconnect 105 for a host 102. The cache 110 may be configured to service requests 202 pertaining to addresses 204 of the address space from a requestor 201. The cache 110 may service the requests 202 by use of cache memory 120, which may include loading data associated with addresses 204 of the address space in respective transfer operations 203. The transfer operations may be implemented in response to cache misses, prefetch operations, and/or the like. The memory 108, cache 110, and requestor 201 may be communicatively coupled through an interconnect 105.

As illustrated, the cache memory 120 may include a plurality of cache units 220, which may be organized into a plurality of N-way associative sets 430 (e.g., S sets 430-1 through 430-S, each including N ways 420-1 through 420-N). The cache logic 210 can implement, include, and/or be coupled to partition logic 310 configured to partition the cache memory 120 into a first portion 124 and a second portion 126. The cache logic 210 partition and/or divide the cache memory 120 in accordance with a partition scheme 312-1, which may specify an amount of cache memory 120 to allocate to storage of the metadata 122 (the first portion 124), cache data 128 (the second portion 126), and/or the like. The amount of cache memory 120 allocated to the first portion 124 may be based, at least in part, on one or more metrics 212 that, inter alia, quantify prefetch performance, as disclosed herein.

In the FIG. 5-1 example, the cache logic 210 (and/or partition logic 310) partitions the cache memory 120 by set and/or in accordance with a set or set-based partition scheme 312-2. More specifically, the cache logic 210 can allocate zero or more of sets 430 of the cache memory 120 for storage of metadata 122 pertaining to the address space (the first portion 124) and one or more of the sets 430 for storage of cache data 128 (the second portion 126). In FIG. 5-1, the first portion 124 of the cache memory 120 allocated to the prefetch logic 230 includes two sets 430 (e.g., sets 430-1 and 430-2) and the second portion 126 of the cache memory 120 allocated for use as available cache capacity includes S-2 sets 430 (e.g., sets 430-3 through 430-S). In FIGS. 5-1 sets 430 allocated to the first portion 124 are highlighted with a crosshatch fill pattern.

As disclosed above, the address mapping scheme 316 (or address mapping logic) implemented by the cache logic 210 may be configured to map addresses 204 to cache units 220 by, inter alia, associating the addresses 204 with respective sets 430, and matching address tags 206 of the addresses 204 to cache tags 326 of the associated sets 430. Allocating one or more sets 430 to the first portion 124, however, may reduce the number of sets 430 included in the second portion 126 (reduce the number of sets 430 to which addresses 204 may be mapped). Allocating R sets 430 for metadata storage may reduce the number of available sets 430 to S-R (or S-2 in the FIG. 5-1 example). Allocating R sets to the first portion 124 may include modifying the address mapping scheme 316 (and/or set mapping scheme thereof) to distribute addresses 204 between a group ($S_C$) of S-R sets 430, $S_C$ {420-R, ..., 420-S} or {420-1, ..., 420-[S-R]}, as follows $S_I = f_S(T_S, S_C)$, where $f_S$ is a set mapping function, $T_S$ is a set tag 406, and $S_I$ is the index or other identifier of a selected one of the available sets 430 ($S_C$). In some implementations, the address mapping scheme 316 modifies the manner in which addresses 204 are divided (and/or the size of respective address regions). The address mapping scheme 316 may adapt the number of bits included in set tags 406-1 based, at least in part, on the quantity of sets 430 allocated to the first portion 124. The address mapping scheme 316 may, for example, reduce the number of bits included in set tags 406-1 by $\log_2$ R, where R is the number of sets 430 allocated to store the metadata 122 (by one bit in the FIG. 5-1 example).

The metadata mapping scheme 314 may be configured to associate metadata 122 (and/or metadata addresses) with cache memory 120 allocated to the first portion 124. The metadata mapping scheme 314 may define a range of metadata addresses 0 through (R·N·U)−1 or indexes 0 through R·N, where R is the number of sets 430 allocated to the metadata 122, N is the number of ways 420 included in each set 430, and U is the capacity of each way 420 (and/or corresponding cache unit 220).

The cache logic 210 can be further configured to adapt the set partition scheme 312-2 based, at least in part, on one or more metrics 212 pertaining to prefetch performance. The cache logic 210 can increase the number of sets 430 allocated for the metadata 122 when one or more of the metrics 212 exceeds a first threshold and can decrease the number of sets 430 allocated for the metadata 122 (and increase the number of sets 430 available to store cache data 128) when one or more of the metrics 212 falls below a second threshold.

FIG. 5-2 illustrates an example 501 in which the amount of cache memory 120 allocated to the metadata 122 is increased as compared to the example 500 illustrated in FIG. 5-1. The size of the first portion 124 may be increased based on prefetch performance within one or more regions of the address space. In FIG. 5-2, the quantity of sets 430 included in the first portion 124 may be increased to four (e.g., increased from sets 430-1 through 430-2 to sets 430-1 through 430-4). Allocating additional sets 430-3 and 430-4 for metadata storage may include adapting the address mapping scheme 316 to distribute addresses between S-4 sets 430 (as opposed to S-2 or S sets 430). The address mapping scheme 316 may be modified to reduce the number of bits included in set tags 406-2 by two bits (or a single bit as compared to the set tags 406-1 of the FIG. 5-1 example). Allocating a set 430 to the first portion 124 may include evicting cache data from the set 430, disabling cache tags 326-1 through 326-N of each way 420 of the set 430, and so on. Allocating an additional set 430 to the first portion 124 may further include adapting the metadata mapping scheme 314 to include the additional set 430. In the FIG. 5-2 example, the metadata mapping scheme 314 may be adapted to define a range of metadata addresses 0 through (4·N·U)−1 or indexes 0 through 4·N.

FIG. 5-3 illustrates an example 502 in which the amount of cache memory 120 allocated to the metadata 122 is decreased as compared to example 501 of FIG. 5-2 (and example 500 of FIG. 5-1). The size of the first portion 124 may be decreased based on prefetch performance within one or more regions of the address space, as disclosed herein. In FIG. 5-3, the quantity of sets 430 included in the first portion 124 may be decreased to one (e.g., decreased to a single set 430-1). Reducing the size of the first portion 124 may, therefore, including allocating additional sets 430-4 through 430-2 for storage of cache data 128 (to the second portion 126). Allocating one or more sets 430 to the second portion 126 may include compacting the metadata 122 and storing compacted metadata within a reduced number of cache units 220. In the FIG. 5-3 example, the metadata 122 may be compacted for storage within N cache units 220. Compacting the metadata 122 may include removing portions of the metadata 122, such as one or more metadata entries. The entries may be selected based on any suitable criteria including, but not limited to: age criteria (oldest removed first, youngest removed first, or the like), least recently accessed criteria, least frequently accessed criteria, prefetch performance criteria (e.g., prefetch performance within address regions covered by respective entries of the metadata 122), and/or the like. The metadata mapping scheme 314 may be modified to decrease the number of cache units 220 referenced thereby (reduce the metadata address range to N·U or metadata index range to N), and so on. The address mapping scheme 316 may be modified to increase the quantity of available sets 430 to S-1. The address mapping scheme 316 may be configured to distribute addresses 204 between a larger number of sets 430 by, inter alia, increasing the number of bits included in set tags 406-2 of the addresses 204. Allocating a set 430 for cache data storage may further include enabling cache tags 326 of each way 420 of the set 430 (e.g., enabling cache tags 326-1 through 326-N of each way 420-1 through 420-N of the set 430 being allocated for storage of cache data 128).

Example Methods for Adaptive Cache Partitioning

Figure 6:
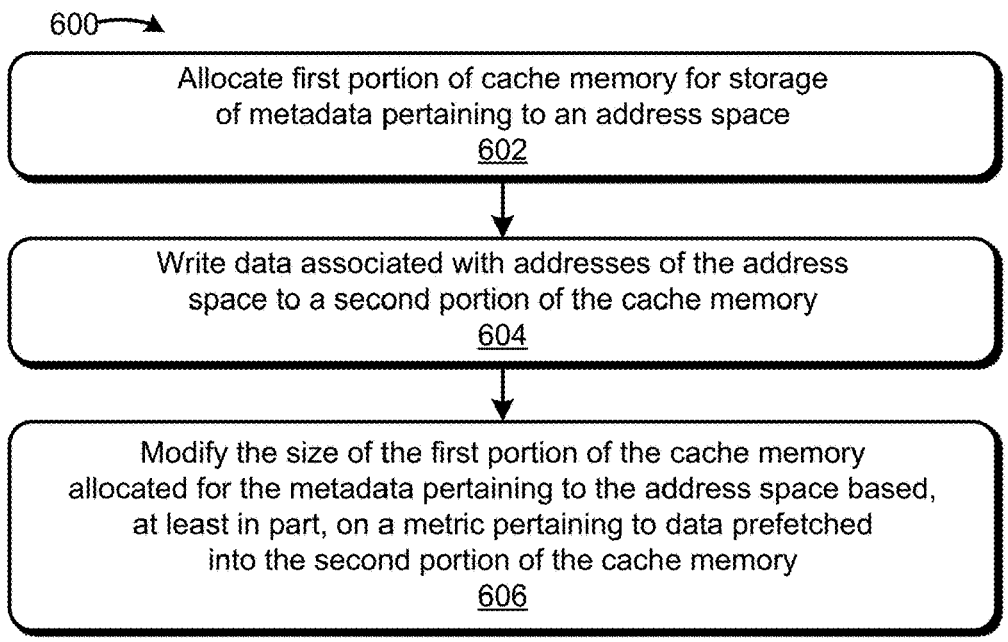
FIG. 6 illustrates an example flow diagram depicting operations for adaptive cache partitioning.

Example methods are described in this section with reference to the flowcharts and flow diagrams of FIGS. 6 through 9. These descriptions reference components, entities, and other aspects depicted in FIGS. 1-1 through 5-3 by way of example only. FIG. 6 illustrates with a flow diagram 600 example methods for an apparatus to implement adaptive cache partitioning. The flow diagram 600 includes blocks 602 through 606. In some implementations, a host device 102 (and/or component thereof) can perform one or more operations of the flow diagram 600 (and/or operations of the other flow diagrams described herein) to realize at least one method for adaptive cache partitioning. Alternatively, or in addition, one or more of the operations may be performed by a memory, memory controller, PIM logic, cache 110, cache memory 120, cache logic 210, prefetch logic 230, an embedded processor, and/or the like.

At 602, a first portion of the cache memory 120 of a cache 110 is allocated for storage of metadata 122 pertaining to an address space associated with a backing memory of the cache 110 (e.g., the address space associated with the memory 108). For example, allocating the first portion may include partitioning the cache memory 120 into a first portion 124 and a second portion 126. The first portion 124 may be allocated for storage of the metadata 122, and the second portion 126 may be allocated for storage of cache data 128 (may be allocated as available cache capacity). The metadata 122 maintained within the first portion of the cache memory 120 may include information pertaining to accesses to respective addresses and/or regions of the address space. A prefetcher and/or prefetch logic 230 of the cache 110 may utilize the metadata 122 to predict addresses 204 of upcoming requests 202 and prefetch data associated with the predicted addresses 204 into the second portion 126 of the cache memory 120. The metadata 122 can include any suitable information pertaining to the address space including, but not limited to: a sequence of previously requested addresses 204 or address offsets, an address history, an address history table, an index table, access frequencies for respective addresses 204, access counts (e.g., accesses within respective windows), access time(s), last access time(s), and/or the like. In some aspects, the metadata 122 includes a plurality of entries, each entry including information pertaining to a respective region of the address space. The metadata 122 pertaining to respective regions of the address space may be used to, inter alia, determine address access patterns within the respective regions, which may be used to inform prefetch operations within the respective regions.

The cache memory 120 may be partitioned into the first portion 124 (e.g., a first partition) and the second portion 126 (e.g., second partition) according to any suitable partition scheme 312, such as a sequential scheme, a way-based partition scheme 312-1, a set-based partition scheme 312-2, and/or the like. The first portion 124 may include any suitable portion, quantity, and/or amount of the cache memory resources of the cache memory 120 including, but not limited to, zero or more: cache units 220, CMU 320, cache blocks, cache lines, hardware cache lines, ways 420 (and/or corresponding cache units 220), sets 430, rows, columns, banks, and/or the like. In some implementations, the cache logic 210 allocates M cache units 220 to the first portion 124 and allocates X-M cache units 220 to the second portion 126 as available cache capacity (where X is the number of available cache units 220 included in the cache memory 120). Allocating the M cache units 220 may include allocating cache units 220-1 through 220-M to the first portion 124 (e.g., according to a sequential scheme), allocating cache units 220 within ways $W_1$ of each set 430 of the cache memory 120, where $$W_1 = \frac{M}{S}$$

and S is the sets 430 included in the cache memory 120 (e.g., according to a way-based partition scheme 312-1), allocating cache units 220 within sets 1 through $E_1$, where $$E_1 = \frac{M}{N}$$

and N is the number of ways 420 included in each set 430 of the cache memory 120 (e.g., according to a set-based partition scheme 312-2), and/or the like.

Allocating the M cache units 220 may include flushing and/or destaging cache data 128 from the M cache units 220, which may include writing dirty cache data 128 stored within the cache units 220 to the memory 108, and/or the like. Allocating the M cache units 220 may further include configuring an address mapping scheme 316 by which addresses 204 are mapped to respective cache units 220, sets 430, and/or ways 420 to disable, remove, and/or ignore the M cache units 220, such that the addresses 204 do not map to the M cache units 220 (and the M cache units 220 are not available for storage of cache data 128). In some implementations, the cache logic 210 disables cache tags 326 of the M cache units 220 allocated to the first portion at 602.

In one example, the cache logic 210 partitions the cache memory 120 by way 420 (e.g., by allocating ways 420 within respective sets 430 of the cache memory 120). In a way or way-based partition scheme 312-1. In a way partition scheme 312-1, allocating the M cache units 220 to the first portion 124 may include allocating $W_1$ ways 420 within each of S sets 430-1 through 430-S of the cache memory 120 to the first portion 124, where $$W_1 = \frac{M}{S},$$

such that $W_2$ ways 420 within each set 430 are allocated to the second portion 126, where $W_2 = S - W_1$ or $$W_2 = \frac{X - M}{S}.$$

In another example, the cache logic 210 may implement a set-based partition scheme 312-2 by which the cache memory 120 is divided by set 430. Allocating M cache units 220 to the first portion 124 per a set-based partition scheme 312-2 may include allocating $E_1$ sets 430 to the first portion 124, where $$E_1 = \frac{M}{N}$$

and N is the number of cache units 220 (ways 420) included in each set 430 such that $E_2$ sets 430 are allocated to the second portion 126, where $E_2 = S - E_1$ or $$E_2 = \frac{X - M}{N}.$$

Allocating the M cache units 220 for metadata storage may further include configuring a metadata mapping scheme 314 to provide access to memory storage capacity of the M cache units 220. The metadata mapping scheme 314 implemented by the cache logic 210 may provide access to memory storage capacity of the M cache units 220 included in the first portion 124 of the cache memory 120. The metadata mapping scheme 314 may define metadata address space $(M_A)$, $M_A \in \{0, \ldots, (M \cdot U)-1\}$, where U is the capacity of a cache unit 220 (capacity of a CMU 320). Alternatively, or in addition, 220, the metadata address space $(M_A)$ may define a range of cache unit indexes $M_I$, each corresponding to a respective one of the M cache units 220 allocated to the first portion 124, $M_A \in \{0, \ldots, M-1\}$. Although examples of metadata mapping schemes 314 (and/or metadata addressing and/or access schemes) are described herein, the disclosure is not limited in this regard and could be adapted to provide access to cache memory 120 allocated to the first portion 124 through any suitable mechanism or technique.

At 604, data associated with the address space is written to the second portion 126 of the cache memory 120. For example, the cache logic 210 may load the data into the cache memory 120 in response to requests 202 pertaining to addresses 204 that trigger cache misses (e.g., addresses 204 that have not yet been loaded into the second portion 126 of the cache memory 120). Alternatively, or in addition, the cache logic 210 (and/or prefetch logic 230) may prefetch cache data 128 into the second portion 126 of the cache memory 120 at 604. The prefetcher logic 230 may utilize the metadata 122 pertaining to the address space to predict addresses 204 of upcoming requests 202 and configure the cache logic 210 to prefetch cache data 128 corresponding to the predicted addresses 204 before requests 202 pertaining to the predicted addresses 204 are received. Prefetched cache data 128 may be transferred into the relatively faster cache memory 120 from the relatively slower memory 108 in transfer operations 203. Transfer operations 203 to prefetch cache data 128 may be implemented as background operations (e.g., during idle periods during which the cache 110 is not servicing requests 202).

In some aspects, the cache logic 210 (and/or prefetch logic 230) may be further configured to determine and/or monitor one or more metrics 212 pertaining to the cache 110 at 604. The metrics 212 may be configured to quantify any suitable aspect of cache and/or prefetch performance including, but not limited to: request latency, average request latency, cache performance, cache hit rate, cache miss rate, prefetch performance, prefetch hit rate, prefetch miss rate, quantity of useful prefetches, quantity of bad prefetches, ratio of useful prefetches to bad prefetches, and/or the like.

In some implementations, the cache logic 210 (and/or prefetch logic 230) may be further configured to record, update, and/or otherwise maintain metadata 122 pertaining to the address space within the first portion of the cache memory 120 allocated at 604 (e.g., within the first portion of the cache memory 120). The metadata 122 may be accessed by and/or through the metadata mapping scheme 314, as disclosed herein.

At 606, the size of the first portion of the cache memory 120 allocated for the metadata 122 pertaining to the address space is modified based, at least in part, on one or more metrics 212 pertaining to cache data 128 prefetched into the second portion of the cache memory. The amount of cache memory 120 allocated to the first portion 124 may be increased when one or more of the metrics 212 exceeds a first threshold. At 606, the size of the first portion 124 may be incrementally and/or periodically increased while prefetch performance remains above the first threshold and/or until a maximum or upper bound is reached. Conversely, at 606, the amount of cache memory allocated to the first portion 124 may be decreased when one or more of the metrics 212 is below a second threshold. At 606, the size of the first portion 124 may be incrementally and/or periodically decreased when prefetch performance remains below the second threshold and/or until a lower bound is reached. In some aspects, at the lower bound, no cache resources are allocated for storage of the metadata 122 and substantially all of cache memory 120 is available as cache capacity.

At 606, the amount of cache memory 120 allocated to the metadata 122 may be increased when the workload on the cache 110 is suitable for prefetching and may be decreased when the workload is not suitable for prefetching (as indicated by the one or more metrics 212). The cache 110 may, therefore, be capable of adapting to different workload conditions. For example, increasing the amount of cache memory 120 allocated to prefetch metadata 122 when servicing workloads that are suitable for prefetching may result in improved performance despite decreases in available cache capacity, whereas decreasing the amount of cache memory 120 allocated for the metadata 122 may enable the available capacity of the cache 110 to be increased, resulting in improved performance under workloads that are not suitable for prefetching.

In some implementations, modifying the size of the first portion 124 of the cache memory 120 allocated for the metadata 122 may include completing pending requests 202 (e.g., draining a pipeline of the cache 110), flushing the cache 110, resetting the prefetch logic 230 (and/or prefetcher), repartitioning the cache memory 120 to modify the amount of cache memory 120 allocated to the first portion 124 and/or second portion 126, and resuming operation using the repartitioned cache memory 120 (e.g., using the resized first portion 124 and/or second portion 126 of the cache memory 120). Alternatively, modifying the size of the first portion 124 of the cache memory 120 may include preserving cache and/or prefetcher state. When increasing the amount of cache memory 120 allocated to the first portion 124, the cache logic 210 can preserve cache state by, inter alia, compacting the cache data 128 maintained within the second portion 126 (e.g., selecting cache data 128 of R cache units 220 for eviction), moving cache data 128 from cache units 220 that are designated for allocation to the first portion 124 to cache units 220 that are to remain allocated to the second portion 126, and so on. When decreasing the amount of cache memory 120 allocated to the first portion, the cache logic 210 can preserve prefetcher state by, inter alia, compacting the metadata 122 maintained within the first portion 124 for storage within a smaller number of cache units 220 (e.g., by removing portions of the metadata 122, such as entries associated with address regions exhibiting poor prefetch performance), moving the compacted metadata 122 to cache units 220 that are to remain allocated to the first portion 124, and so on.

Increasing the amount of cache memory 120 allocated to the first portion (e.g., first portion 124) at 606 may include allocating one or more cache units 220 from the second portion (e.g., second portion 126) to the first portion 124. Allocating the one or more cache units 220 to the first portion 124 may include flushing and/or destaging the cache units 220, modifying the address mapping scheme 316 to disable, remove, and/or ignore the cache units 220 (e.g., disable cache tags 326 of the cache units 220), modifying the metadata mapping scheme 314 to include and/or reference the cache units 220, and so on, as disclosed herein. Increasing the amount of cache memory 120 allocated to the first portion may, therefore, include decreasing the amount of cache memory 120 allocated to the second portion (and/or decreasing the amount of cache memory 120 available for storage of cache data 128). Decreasing the size of the second portion 126 may include compacting the cache data 128 stored within the second portion 126 of the cache memory 120, which may include selecting cache data 128 to remove and/or evict from the cache 110. The cache data 128 may be selected according to any suitable replacement or eviction policy, such as FIFO, LIFO, LRU, TLRU, MRU, LFU, random replacement, or the like. Compacting the cache data 128 may include reducing the amount of cache memory 120 consumed by the cache data 128 by R cache units 220, where R is the number of cache units 220 being allocated from the second portion 126 to the first portion 124 (or R·U, where U is the capacity of a cache unit 220, CMU 320, or way 420).

In some aspects, the cache logic 210 selects a first group of cache units 220 to reallocate to the first portion 124 and selects a second group of cache units 220 for eviction. The first group and the second group may each include R cache units 220, where R is the quantity of cache units 220 to be reallocated to the first portion 124. The first group and second group may be selected independently and/or in accordance with respective selection criteria. The first group of cache units 220 may be selected in accordance with the address mapping scheme 316, metadata mapping scheme 314, partition scheme 312, or the like (which may allocate cache units 220 for storage of the metadata 122 per a predetermined pattern or scheme, such as a sequential scheme, way-based partition scheme 312-1, set-based partition scheme 312-2, or the like). The second group of cache units 220 may be selected in accordance with an eviction or replacement policy, as disclosed herein. Reallocating the R cache units 220 may include: a) flushing the second group of cache units 220, and b) moving cache data 128 from cache units 220 that are included in the first group (and are not included in the second group) to the second group of cache units 220. The cache logic 210 may, therefore, retain more frequently accessed data within the cache memory 120 when reducing the available cache data 128 capacity of the cache 110.

In some implementations, the cache logic 210 partitions the cache memory 110 according to a way or way-based partition scheme 312-1. Allocating R cache units 220 from the second portion 126 to the first portion 124 may include allocating one or more ways 420 within each set 430 of the cache to the first portion 124. Allocating R cache units 220 from the second portion 126 to the first portion 124 may include allocating an additional $W_{1A}$ ways 420 within each of S sets 430-1 through 430-S from the second portion 126 to the first portion 124, where $W_{1A}$=R/S. Alternatively, or in addition, the cache logic 210 may partition the cache memory 110 according to a set or set-based partition scheme 312-2. Allocating R cache units 220 from the second portion 126 to the first portion 124 may include allocating an additional $E_{1A}$ sets 430 of the cache memory 120 from the second portion 126 to the first portion 124, where $E_{1A}$=R/N and N is the number of cache units 220 (or ways 420) included in each set 430.

Decreasing the amount of cache memory 120 allocated to the first portion (e.g., first portion 124) at 606 may include allocating one or more cache units 220 from the first portion to the second portion (e.g., second portion 126). Allocating the one or more cache units 220 to the second portion 126 may include modifying the address mapping scheme 316 to enable, include, and/or otherwise reference the cache units 220 (e.g., enable cache tags 326 of the cache units 220), modifying the metadata mapping scheme 314 to remove the cache units 220, and so on, as disclosed herein.

Decreasing the amount of cache memory 120 allocated to the first portion may further include compacting the metadata 122. The metadata 122 may be compacted for storage within R fewer cache units 220, where R is the quantity of cache units 220 to be allocated from the first portion 124 to the second portion 126. Compacting the metadata 122 at 606 may include removing a portion of the metadata 122, such as one or more entries of the metadata 122. The portion of the metadata 122 may be selected based on a removal criterion, such as an age criterion (oldest removed first, youngest removed first, or the like), least recently accessed criterion, least frequently accessed criterion, and/or the like.

Alternatively, or in addition, portions of the metadata 122 may be selected for removal based, at least in part, on one or more metrics 212. The metadata 122 may include a plurality of entries, each entry including access information pertaining to a respective region of the address space. The prefetch logic 230 may utilize respective entries of the metadata 122 to implement prefetch operations within the address regions covered by the respective entries. The one or more metrics 212 may be configured to quantify prefetch performance within the address regions covered by the respective entries of the metadata 122. Compacting the metadata 122 may include selecting entries of the metadata 122 for removal based, at least in part, on prefetch performance within the address regions covered by the entries, as quantified by the metrics 212. In some implementations, entries of the metadata 122 in which prefetch performance is below a threshold may be removed (and/or the amount of memory capacity allocated to the entries may be reduced). Alternatively, entries of the metadata 122 exhibiting higher prefetch performance may be retained, whereas entries exhibiting lower prefetch performance may be removed (e.g., the R lowest-performing entries of the metadata 122 may be selected for removal). Compacting the metadata may, therefore, include removing metadata 122 from one or more cache units 220 and/or moving metadata 122 (and/or entries of the metadata 122) from cache units 220 being reallocated to the second portion 126 to the remaining cache units 220 allocated to the first portion 124.

Figure 7:
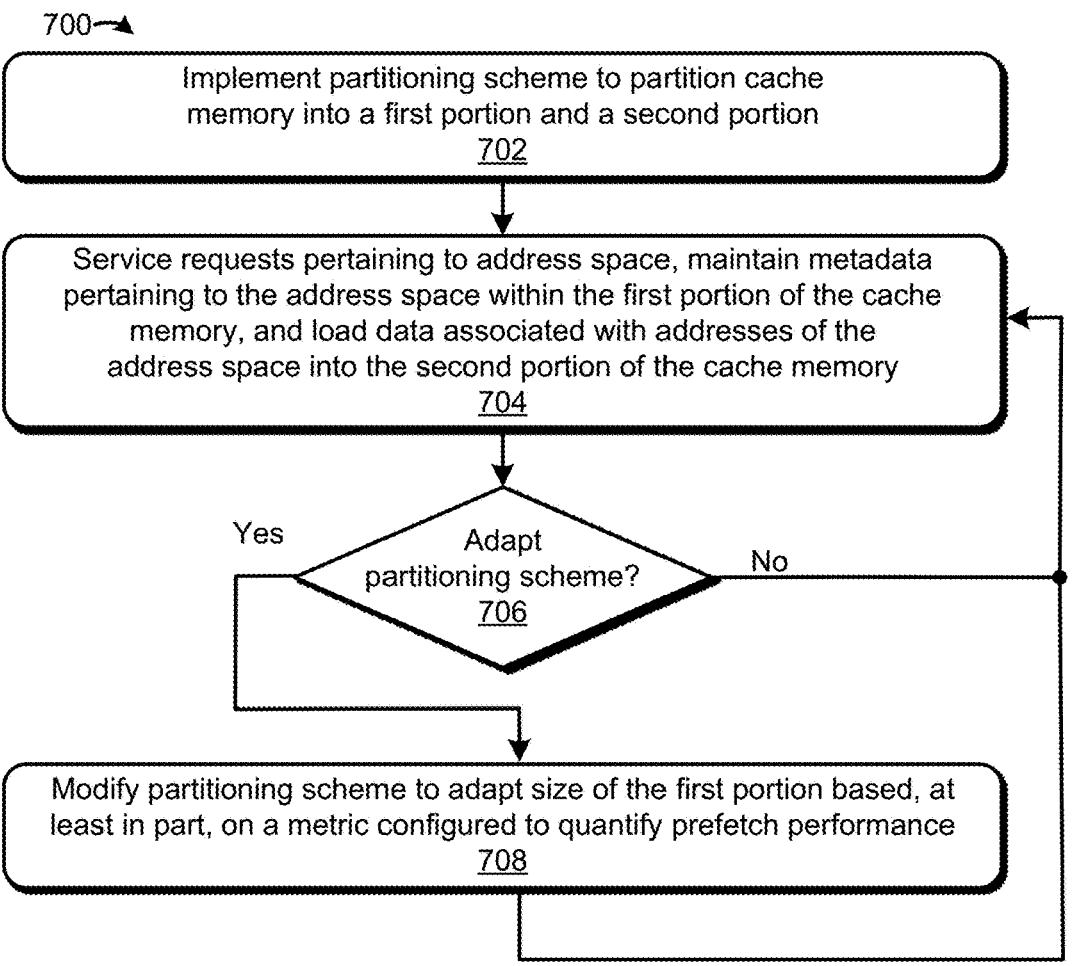
FIG. 7 illustrates an example flow diagram depicting operations for adaptive cache partitioning.

FIG. 7 illustrates with a flow diagram 700 further examples of methods for an apparatus to implement adaptive cache partitioning. The flow diagram 700 includes blocks 702 through 708. At 702, logic of a cache 110 (e.g., cache logic 210) implements a partition scheme 312 to, inter alia, partition a cache memory 120 into a first portion 124 and a second portion 126. The first portion 124 may include a first portion of the cache memory 120, and the second portion 126 may include a second portion of the cache memory 120, different from the first portion 124. The first portion 124 may be allocated for storage of metadata 122 pertaining to an address space, such as an address space associated with a backing memory of the cache 110 (a memory 108). The second portion 126 may be allocated for storage of cache data 128 pertaining to the address space (e.g., may be available cache capacity of the cache 110). Partitioning the cache memory 120 may include implementing a metadata mapping scheme 314 to access cache units 220 allocated to the first portion 124 and an address mapping scheme 316 to map addresses 204 of the address space to cache units 220 allocated to the second portion 126.

At 704, the cache 110 services requests pertaining to the address space, which may include maintaining metadata pertaining to the address space within the first portion 124 (e.g., within metadata 122 maintained within the first portion 124) and loading data associated with addresses of the address space into the second portion 126. Data may be loaded into the cache memory 120 in response to cache misses, such as requests 202 pertaining to addresses 204 that are not available within the cache 110. Alternatively, or in addition, data may be prefetched into the cache memory 120 at 704. A prefetcher (and/or prefetch logic 230 of the cache 110) may utilize the metadata 122 maintained within the first portion 124 to predict addresses 204 of upcoming requests 202, and data corresponding to the predicted addresses 204 may be prefetched into the second portion 126 before requests 202 pertaining to the predicted addresses 204 are received at the cache 110.

At 706, the cache logic 210 (and/or prefetch logic 230) may determine whether to adapt the partition scheme 312 of the cache memory 120. More specifically, the cache logic 210 (and/or prefetch logic 230) may determine whether to modify the size of the first portion 124 allocated for the metadata 122 (and/or modify the size of the second portion 126 allocated for storage of cache data 128) at 706. The determination may be based, at least in part, on one or more metrics 212, which may be configured to quantify prefetch performance, as disclosed herein. Determining whether to adapt the partition scheme 312 may include determining and/or monitoring one or more metrics 212 pertaining to data prefetched into the second portion 126 and comparing the metrics 212 to one or more thresholds. The partition scheme 312 may be adapted at 708 responsive to one or more of the metrics 212 being greater than a first threshold and/or being lower than a second threshold; otherwise, the flow may continue at 704 where the cache 110 may continue to service requests pertaining to the address space.

At 708, the cache logic 210 adapts the partitioning scheme to, inter alia, modify the amount of cache memory 120 allocated to the first portion 124 and/or second portion 126. At 708, the size of the first portion 124 allocated for the metadata 122 may be increased (and the size of the second portion 126 allocated for cache data 128 may be decreased) when the metrics 212 exceed one or more first thresholds (e.g., when prefetch performance exceeds one or more first thresholds). Conversely, the size of the first portion 124 may be decreased (and the size of the second portion 126 may be increased) when the metrics 212 are below one or more second thresholds (e.g., when prefetch performance is below one or more second thresholds).

Increasing the size of the first portion 124 may include allocating cache resources from the second portion 126 to the first portion 124 (e.g., one or more cache units 220, ways 420, sets 430, and/or the like). Increasing the size of the first portion 124 may include reducing the size of the second portion 126. Reducing the size of the second portion 126 may include compacting cache data 128 stored within the second portion 126, as disclosed herein (e.g., by selecting cache data 128 for eviction, moving cache data 128 to remaining cache units 220 allocated to the second portion 126, and so on). Conversely, decreasing the size of the first portion 124 may include allocating cache resources from the first portion 124 to the second portion 126. Decreasing the size of the first portion 124 may include compacting metadata 122 stored within the first portion 124 of the cache memory 120, as disclosed herein (e.g., by selecting portions of the metadata 122 for removal, moving portions of the metadata 122 to remaining cache units 220 allocated to the first portion 124, and so on). In response to adapting the partition scheme 312 of the cache memory 120 at 708, the flow may continue at 704 where the cache 110 may service requests pertaining to the address space, as disclosed herein.

Figure 8:
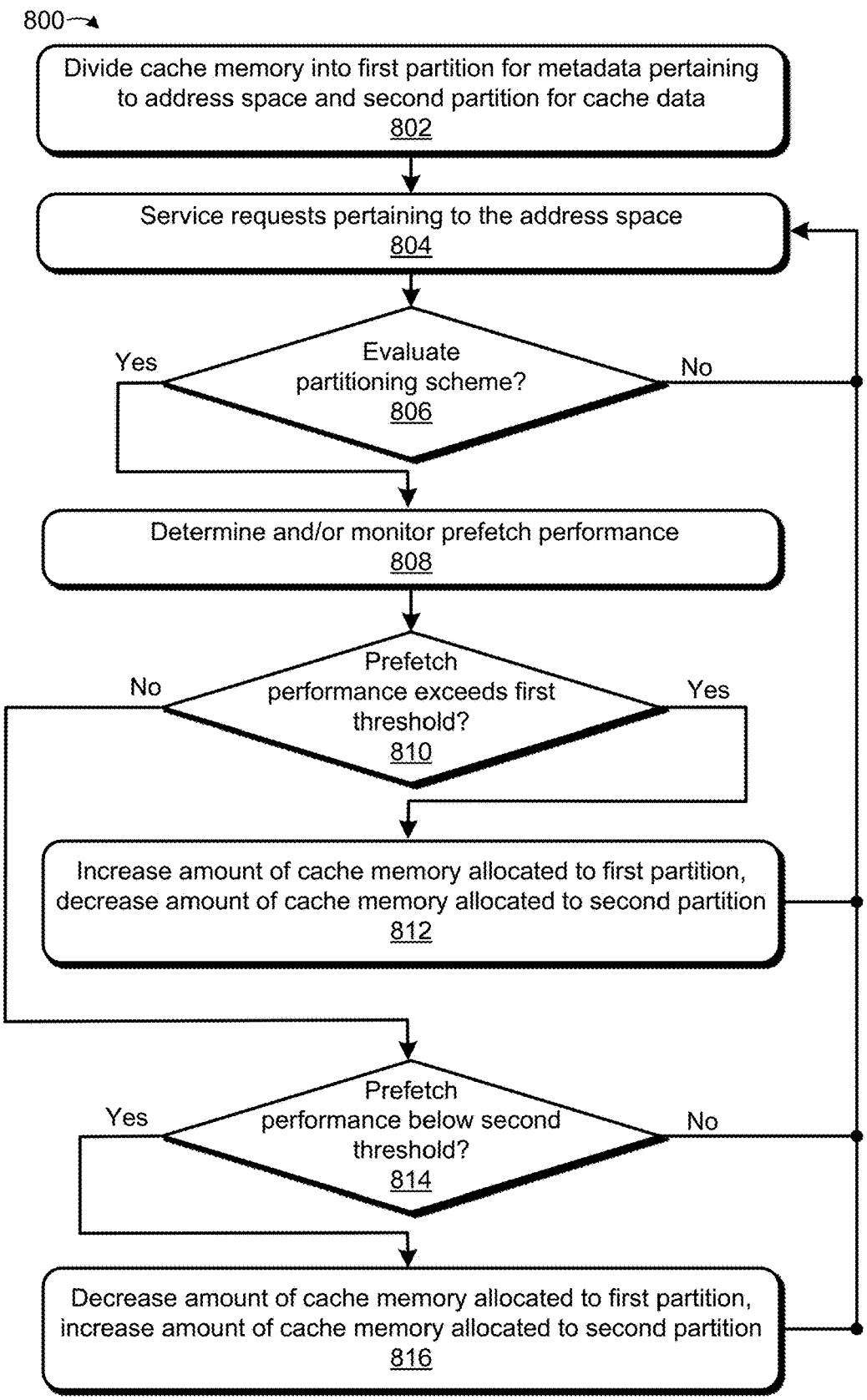
FIG. 8 illustrates an example flow diagram depicting operations for adaptive cache partitioning based, at least in part, on metrics pertaining to prefetch performance.

FIG. 8 illustrates another example flow diagram 800 depicting operations for adaptive cache partitioning based, at least in part, on metrics 212 pertaining to prefetch performance. The flow diagram 800 includes blocks 802 through 816. At 802, cache logic 210 (and/or prefetch logic 230) divides a cache memory 120 into a first portion 124 and a second portion 126. The first portion 124 includes a first partition of the cache memory 120 allocated for metadata 122 pertaining to an address space, and the second portion 126 may include a second partition of the cache memory 120 allocated for cache data 128 (the first portion separate from the second portion 126).

At 804, the cache 110 services requests pertaining to the address space, which may include loading data into the second portion 126 of the cache memory 120, retrieving data associated with respective addresses 204 of the address space in response to requests 202 pertaining to the addresses 204 from the second portion 126 of the cache memory 120, maintaining metadata 122 pertaining to accesses to respective addresses and/or regions of the address space within the first portion 124 of the cache memory 120, utilizing the metadata 122 maintained within the first portion 124 of the cache memory 120 to prefetch cache data 128 into the second portion 126 of the cache memory 120, and so on.

At 806, the cache logic 210 (and/or prefetch logic 230) determines whether to evaluate the partition scheme 312 of the cache memory 120. In some implementations, the partition scheme 312 may be evaluated in background operations and/or by use of idle resources of the cache 110. The determination of 806 may be based, at least in part, on whether the cache 110 is idle (e.g., is servicing one or more requests 202), whether idle resources are available, and/or the like. The determination of 806 may be based on one or more time-based criteria (e.g., may evaluate the partitioning scheme periodically and/or at a determined interval), a predetermined schedule, and/or the like. Alternatively, or in addition, the determination of 806 may be triggered by workload conditions and/or prefetch performance metrics (e.g., one or more metrics 212). The cache logic 210 may be configured to determine and/or monitor metrics 212 pertaining to prefetch performance periodically and/or continuously, and evaluation of the partition scheme 312 may be triggered at 806 in response to metrics 212 that exceed and/or are below one or more thresholds.

If the determination at 806 is to evaluate the partition scheme 312, the flow continues at 808; otherwise, the flow continues to service requests pertaining to the address space at 804.

At 808, the cache logic 210 (and/or prefetch logic 230) determines and/or monitors one or more aspects of prefetch performance, such as prefetch hit rate, prefetch miss rate, quantity of useful prefetches, quantity of bad prefetches, ratio of useful prefetches to bad prefetches, and/or the like. At 808, the cache logic 210 (and/or prefetch logic 230) may determine and/or monitor one or more metrics 212 pertaining to prefetch performance, as disclosed herein. Prefetch hit rate may be based on access metrics of prefetched cache data 128 maintained within cache metadata 122 associated with the prefetched cache data 128. The cache data 128 that was prefetched into the cache memory 120 may be identified by use of prefetch indicators, such as prefetch flags associated with the cache data 128, which may be maintained within cache metadata 322 associated with the cache units 220 in which the cache data 128 are stored).

At 810, the prefetch performance determined at 806 is compared to a first threshold. If the prefetch performance exceeds the first threshold, the flow continues at 812;

otherwise, the flow continues at 814. In some implementations, the determination of 810 is based on whether the prefetch performance determined at 810 exceeds the first threshold and the amount of cache memory 120 currently allocated to the first portion 124 is below a maximum amount, threshold, or upper bound. If so, the flow continues at 812; otherwise, the flow continues at 814.

At 812, the cache logic 210 modifies the partition scheme 312 to increase the amount of cache memory 120 allocated for storage of the metadata 122 pertaining to the address space (e.g., increase the size of the first portion 124 and/or first portion of the cache memory 120). Increasing the amount of cache memory 120 allocated to the first portion 124 may include decreasing the amount of cache memory 120 allocated to the second portion 126 (e.g., reducing the available capacity of the cache 110). At 812, the cache logic 210 may reassign designated cache memory resources from the second portion 126 to the first portion 124, such as one or more cache units 220, ways 420, sets 430, and/or the like. For example, the cache memory 120 may be partitioned into a first portion 124 comprising a first group of cache units 220 and a second portion 126 comprising a second group of cache units, different from the first group. Increasing the amount of cache memory allocated to the first partition (first portion 124) may include allocating one or more cache units 220 of the second group to the first group by, inter alia, evicting and/or moving cache data 128 from the one or more cache unit 220, removing the one or more cache units 220 from the address mapping scheme 316 (e.g., disabling cache tags 326 of the one or more cache units 220), adding the one or more cache units 220 to the metadata mapping scheme 314, and so on.

The cache logic 210 may be further configured to compact cache data 128 stored within the second portion 126 for storage within a smaller amount of the cache memory 120, configure the address mapping scheme 316 to remove, disable, and/or dereference the designated cache memory resources, configure the metadata mapping scheme 314 to include, reference, and/or otherwise provide access to the designated cache resources for use in storing the metadata 122, and so on, as disclosed herein. In response to implementing the modified partition scheme 312 to increase the amount of cache memory 120 allocated for the metadata 122 (and decrease the amount of available cache capacity), the flow may continue at 804.

At 814, the prefetch performance determined and/or monitored at 808 is compared to a second threshold. If the prefetch performance is below the second threshold, the flow continues at 816; otherwise, the flow continues at 804. In some implementations, the determination of 814 is based on whether the prefetch performance determined at 810 is below the second threshold and the amount of cache memory 120 currently allocated to the first portion 124 above a minimum amount, threshold, or lower bound. If so, the flow continues at 816; otherwise, the flow continues at 814.

At 816, the cache logic 210 modifies the partition scheme 312 to decrease the amount of cache memory 120 allocated for storage of the metadata 122 pertaining to the address space (e.g., decrease the size of the first portion 124 and/or first portion of the cache memory 120). Decreasing the amount of cache memory 120 allocated to the first portion 124 may include increasing the amount of cache memory 120 allocated to the second portion 126 (e.g., increasing the available capacity of the cache 110). At 816, the cache logic 210 may reassign designated cache memory resources from the first portion 124 to the second portion 126, such as one or more cache units 220, ways 420, sets 430, and/or the like. At 816, the cache logic 210 may be further configured to compact metadata 122 stored within the first portion 124 for storage within a smaller amount of the cache memory 120, configure the address mapping scheme 316 to enable, reference, and/or otherwise utilize the designated cache memory resources for cache data 128, configure the metadata mapping scheme 314 to remove, exclude, and/or dereference the designated cache resources, and so on, as disclosed herein. In response to implementing the modified partition scheme 312 to decrease the amount of cache memory 120 allocated for the metadata 122 (and increase the amount of available cache capacity), the flow may continue at 804.

Figure 9:
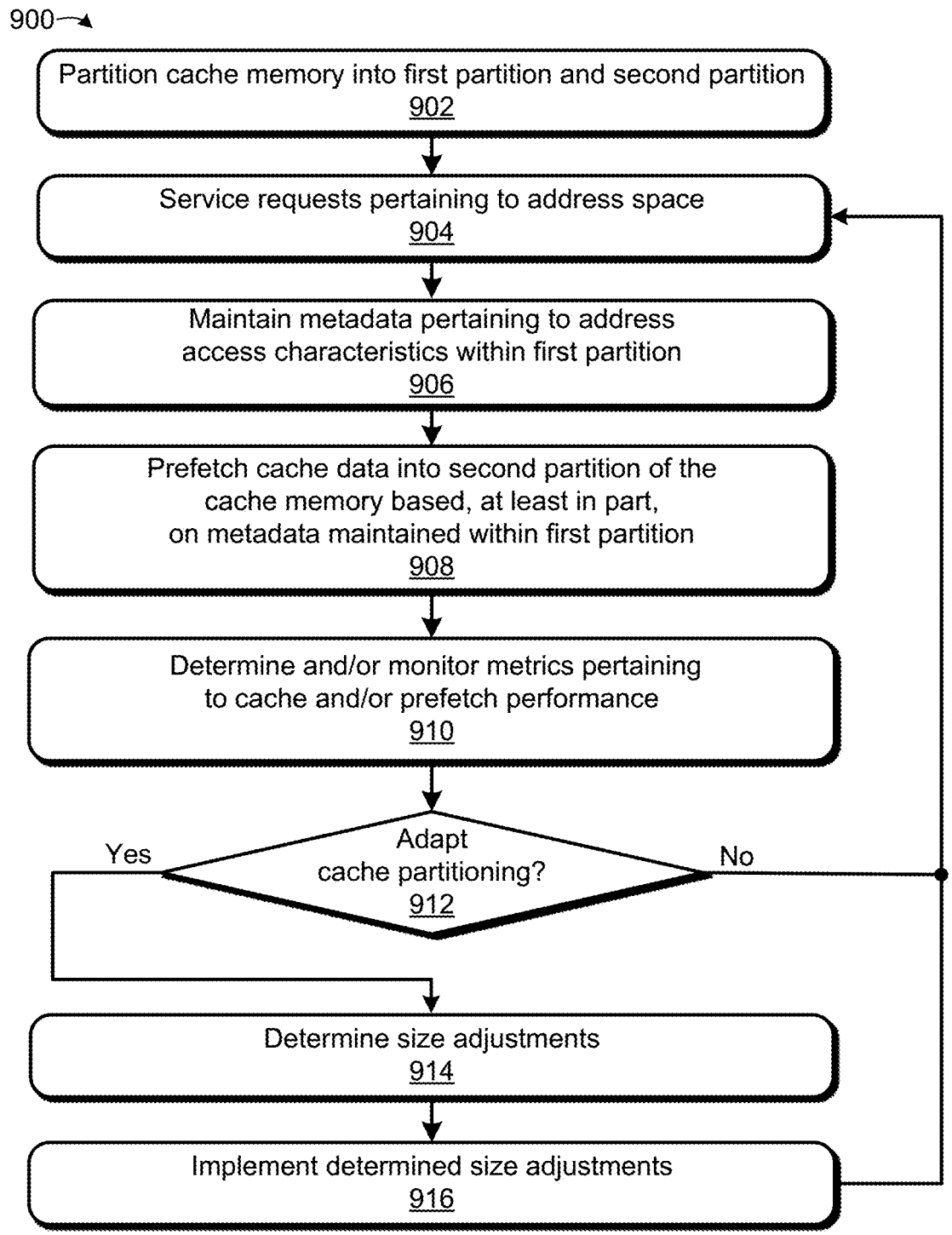
FIG. 9 illustrates an example flow diagram depicting operations for adaptive cache partitioning based, at least in part, on metrics pertaining to cache and/or prefetch performance.

FIG. 9 illustrates an example flow diagram 900 depicting operations for adaptive cache partitioning based, at least in part, on metrics pertaining to cache and/or prefetch performance. Flow diagram 900 includes blocks 902 through 916. At 902, a cache 110 partitions a cache memory 120 thereof into a first portion 124 and a second portion 126. The first portion 124 may include a first portion of the cache memory 120 (e.g., zero or more cache units 220, cache lines, hardware cache lines, ways 420, sets 430, and/or the like). The second portion 126 may include a second portion of the cache memory 120 different from the first portion 124. The first portion 124 may be allocated for metadata 122 pertaining to an address space, and the second portion 126 may be allocated for storage of cache data 128 (may be available cache capacity).

At 904, the cache 110 services requests pertaining to the address space, which may include, inter alia, receiving requests 202, loading cache data 128 into the second portion 126 of the cache memory 120 in response to cache misses, servicing the requests 202 by use of cache data 128 stored within the second portion 126 of the cache memory 120, and so on.

At 906, the cache 110, cache logic 210, prefetch logic 230, and/or a prefetcher coupled to the cache 110 maintains metadata 122 pertaining to address access characteristics within the first portion 124 of the cache memory 120. The metadata 122 may include any suitable information pertaining to accesses to respective addresses and/or address regions of the address space, as disclosed herein. At 908, cache data 128 are prefetched into the second portion 126 of the cache memory 120 based, at least in part, on the metadata 122 maintained within the first portion 124 of the cache memory 120.

At 910, the cache, cache logic 210, prefetch logic 230, and/or prefetcher coupled to the cache 110 determines and/or monitors one or more metrics 212. The metrics 212 may be configured to quantify cache and/or prefetch performance, as disclosed herein. At 912, the metrics 212 are evaluated to determine whether to adapt the partition scheme 312 of the cache memory 120 (e.g., determine whether to adapt the amount of cache memory 120 allocated to the first portion 124 or second portion 126). The determination of 912 may be based, at least in part, on the metrics 212 determined and/or monitored at 910. The determination of 912 may adapt the partition scheme 312 based on cache performance and/or prefetch performance. The partition scheme 312 may be adapted at 914 in response to: a) metrics 212 that are outside of one or more thresholds, b) prefetch performance that is outside of one or more prefetch thresholds, c) cache performance that is outside of one or more cache thresholds, and/or the like. The determination of 912 may be based on whether prefetch performance (e.g., prefetch hit rate) is above an upper prefetch threshold or below a lower performance threshold, whether cache performance (e.g., cache hit rate) is above an upper cache threshold or below a lower cache threshold, and/or the like. In some implementations, the determination of 912 may be based on both prefetch and cache performance (may be configured to balance prefetch and cache performance). The determination of 912 may be based on whether: a) prefetch performance exceeds a first prefetch threshold and cache performance is below a first cache threshold, b) prefetch performance is below a second prefetch threshold and cache performance is above a second cache performance threshold, and/or the like.

Alternatively, or in addition, the determination of 912 may be based on, inter alia, an amount of cache memory 120 currently allocated to the first portion 124 for the metadata 122 (metadata capacity). The determination 912 may be based on whether prefetch performance is above a first prefetch performance threshold and metadata capacity is below a first capacity threshold (e.g., a first prefetch or metadata capacity threshold), whether prefetch performance is below a second prefetch performance threshold and metadata capacity is above a second capacity threshold (e.g., a second prefetch or metadata capacity threshold), and/or the like. In some implementations, the determination of 912 is based on cache performance. The determination may be based on whether cache performance quantified by the metrics 212 (e.g., a cache performance metric 212) is below a cache performance threshold. The amount of cache memory 120 allocated for storage of metadata 122 pertaining to the address space may be iteratively and/or periodically adjusted to improve cache performance (e.g., either increased or decreased) at 914.

At 914, size adjustments for the first portion 124 and/or second portion 126 are determined. The size adjustments may be based, at least in part, on the metrics 212 determined and/or monitored at 910 (and/or the evaluation of the metrics 212 at 912). At 914, the size of the first portion 124 allocated for metadata 122 pertaining to the address space may be increased when prefetch performance quantified by the metrics 212 is at or above an upper prefetch threshold (and the metadata capacity is below a determined maximum). Conversely, the size of the first portion 124 may be decreased when the prefetch performance quantified by the metrics 212 is at or below a lower prefetch threshold. In another example, the amount of cache memory 120 allocated to the first portion 124 a) may be increased when prefetch performance is above a first prefetch threshold and cache performance is below a first cache threshold, or b) may be decreased when prefetch performance is below a second prefetch threshold and cache performance is above a second cache performance threshold, and/or the like.

Alternatively, or in addition, the size adjustments may be based on, inter alia, an amount of cache memory 120 currently allocated to the first portion 124 for the metadata 122 (metadata capacity). The amount of cache memory 120 allocated to the first portion 124 may be increased when prefetch performance is above a first prefetch performance threshold and the amount of cache memory 120 currently allocated to the first portion 124 is below a first capacity threshold. Conversely, the amount of cache memory 120 allocated to the first portion 124 may be decreased when prefetch performance is below a second prefetch performance threshold and the amount of cache memory 120 currently allocated to the first portion 124 is above a second capacity threshold, or the like. In some implementations, the size adjustments at 914 may be based on cache performance metrics, such as cache hit rate. At 914, The amount of cache memory 120 allocated for storage of metadata 122 pertaining to the address space may be iteratively and/or periodically adjusted to achieve improved cache hit rates (e.g., either increased or decreased). In some implementations, the determination of 912 and size adjustments at 914 may be implemented in accordance with an optimization algorithm, which may be configured to converge to optimal (or locally optimal) partition scheme 312 that results in optimal (or locally optimal) cache performance, as quantified by the metrics 212.

Example Systems for Adaptive Cache Partitioning

Figure 10:
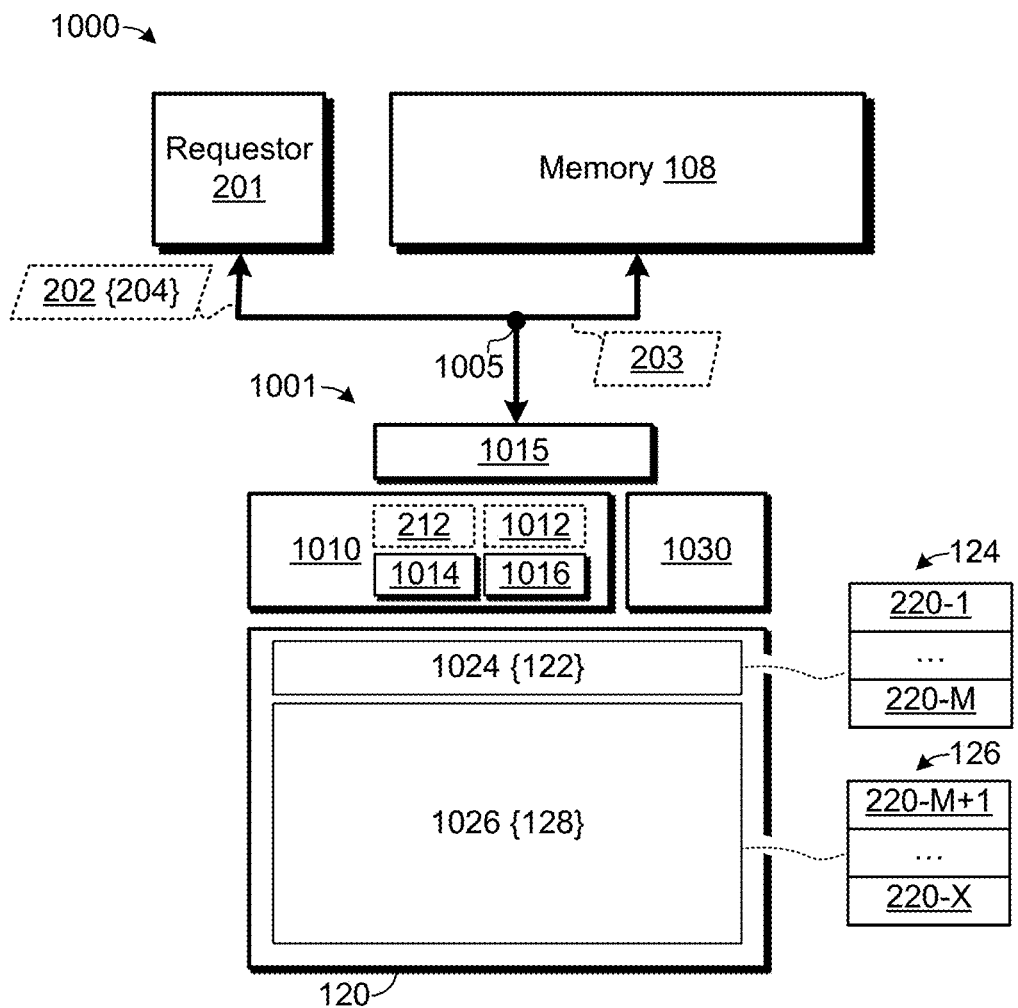
FIG. 10 illustrates an example of a system for implementing adaptive cache partitioning.

FIG. 10 illustrates an example system 1000 for adaptive cache partitioning. The system 1000 may include a cache apparatus 1001, which may include a cache 110 and/or means for implementing a cache 110, as disclosed herein. The description of FIG. 10 refers to aspects described above, such as the cache 110, which is depicted in multiple other figures (e.g., FIGS. 1-1 to 5-3). The system 1000 may further include an interface 1015 for coupling the cache apparatus 1001 an interconnect 1005, receiving requests 202 pertaining to addresses 204 of an address space associated with a memory 108 (e.g., from a requestor 201), implementing transfer operations 203 to fetch cache data 128 from a memory 108, and so on. The interface 1015 may be configured to couple the cache apparatus 1001 to any suitable interconnect including, but not limited to: an interconnect, a physical interconnect, a bus, an interconnect 105 for a host device 102, a front-end interconnect 105A, a back-end interconnect 105B, and/or the like. The interface 1015 may include, but is not limited to: circuitry, logic circuitry, interface circuitry, interface logic, switch circuitry, switch logic, routing circuitry, routing logic, interconnect circuitry, interconnect logic, I/O circuitry, analog circuitry, digital circuitry, logic gates, registers, switches, multiplexers, ALU, state machines, microprocessors, embedded processors, PIM circuitry, logic 220, an interface 215, a first interface 215A, a second interface 215B, or the like.

The cache apparatus 1001 may include and/or be coupled to a cache memory 120, which may include, but is not limited to: a memory, a memory array, semiconductor memory, volatile memory, RAM, SRAM, DRAM, SDRAM, and/or the like. In the FIG. 10 example, the cache memory 120 includes a plurality of cache units 220 (e.g., cache units 220-1 through 220-X), each cache unit 220 including and/or corresponding to a respective CMU 320 and/or cache tag 326. In some aspects, the cache units 220 are arranged into a plurality of sets 430 (e.g., sets 430-1 through 430-S), each set 430 including a plurality of ways 420 (e.g., ways 420-1 through 420-N), each way 420 including and/or corresponding to a respective cache unit 220.

The system 1000 may include a component 1010 for allocating a first portion 124 of the cache memory 120 for metadata 122 pertaining to the address space, caching data within the second portion 126 of the cache memory 120 different from the first portion 124 of the cache memory 120, and/or modifying a size of the first portion 124 of the cache memory 120 allocated for the metadata 122 based, at least in part, on a metric 212 pertaining to data prefetched into the second portion 126 of the cache memory 120. The component 1010 may be configured to divide the cache memory 120 into a first partition 1024 that includes a first portion 124 of the cache memory 120 and a second partition 1026 that includes a second portion 126 of the cache memory 120. The first partition 1024 may be allocated to store the metadata 122, and the second partition 1026 may be allocated to store cache data 128. The component 1010 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, cache logic 210, partition logic 310, a partition scheme 312, a metadata mapping scheme 314 (and/or metadata logic 1014), an address mapping scheme 316 (and/or address logic 1016), and/or the like.

The component 1010 may be configured to partition the cache memory 120 in accordance with a partition scheme 312. The partition scheme 312 may define logic, rules, criteria, and/or other mechanisms for dividing cache memory resources of the cache memory 120 (e.g., cache units 220) between the first partition 1024 and the second partition 1026. The partition scheme 312 may be further configured to specify an amount, quantity, capacity and/or size of the first partition 1024 and/or second partition 1026 (e.g., may specify the amount, quantity, capacity, and/or size of the first portion 124 and/or second portion 126). The partition scheme 312 may define logic, rules, criteria, and/or other mechanisms by which cache memory resources are dynamically reallocated and/or reassigned between the first partition 1024 and/or second partition 1026, a such a cache-unit-based scheme, a way-based partition scheme 312-1, a set-based partition scheme 312-2, and/or the like. In the FIG. 10 example, the partition scheme 312 configures the component 1010 to allocate M cache units 220 to the first partition 1024 (and X-M cache units 220 to the second partition 1026).

In some examples, the partition scheme 312 defines a cache-unit-based scheme. In a cache-unit-based scheme, allocating M cache units 220 to the first partition 1024 may include allocating cache units 220-1 through 220-M to the first portion 124 and/or allocating 220-M+1 through 220-X to the second portion 126, as illustrated in FIG. 10. In other examples, the partition scheme 312 defines a way-based scheme (e.g., a way partition scheme 312-1). In a way-based scheme, allocating M cache units 220 to the first partition 1024 may include allocating W1 ways 420 within each set 430 of the cache memory 120 to the first partition 1024, where $$W_1 = \frac{M}{S}$$

and S is the quantity of sets 430 included in the cache memory 120 such that $W_2$ ways 420 within each set 430 are allocated to the second partition 1026, where $W_2=N-W_1$ or $$W_2 = \frac{X-M}{S}.$$

Alternatively, the partition scheme 312 may define a set-based scheme (e.g., a set partition scheme 312-2). In a set-based scheme, allocating M cache units 220 to the first partition 1024 may include allocating $E_1$ sets 430 to the first partition 1024, where $$E_1 = \frac{M}{N}$$

and N is the number of ways 420 included in each set 430 such that $E_2$ sets are allocated to the second partition 1026, where $E_2=S-E_1$ or $$E_2 = \frac{X-M}{N}.$$

The component 1010 may implement, include, and/or be coupled to metadata logic 1014. The metadata logic 1014 may be configured for mapping, addressing, associating, referencing, and/or otherwise accessing (and/or providing access to) cache units 220 allocated to the first partition 1024. The metadata logic 1014 may implement and/or include a metadata mapping scheme 314, as disclosed herein. The metadata logic 1014 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, cache logic 210, partition logic 310, a partition scheme 312, a metadata mapping scheme 314, and/or the like.

The component 1010 may implement, include, and/or be coupled to address logic 1016. The address logic 1016 may be configured for mapping, addressing, associating, referencing, and/or otherwise accessing (and/or providing access to) cache units 220 allocated to the second partition 1026. The address logic 1016 may be configured to map and/or associate addresses 204 of the address space with cache data 128 stored within cache units 220 allocated to the second partition 1026. The address logic 1016 may implement and/or include an address mapping scheme 316, as disclosed herein. The address logic 1016 may include, but is not limited to: circuitry, logic circuitry, memory interface circuitry, memory interface logic, switch circuitry, switch logic, routing circuitry, routing logic, memory interconnect circuitry, memory interconnect logic, I/O circuitry, analog circuitry, digital circuitry, logic gates, registers, switches, multiplexers, ALU, state machines, microprocessors, embedded processors, PIM circuitry, cache logic 210, partition logic 310, a partition scheme 312, an address mapping scheme 316, and/or the like.

The component 1010 may be further configured to adapt the partition scheme 312 based, at least in part, on one or metrics 212. The metrics 212 may be configured to quantify prefetch performance, as disclosed herein. Alternatively, or in addition, the metrics 212 may be configured to quantify other aspects, such as cache performance (e.g., cache hit rate, cache miss rate, and/or the like). The component 1010 may be configured to determine and/or monitor the metrics 212. The component 1010 can modify a size of the first partition 1024 (and/or first portion 124) of the cache memory 120 allocated for the metadata 122 based, at least in part, on one or more of the metrics 212.

The component 1010 may implement, include, and/or be coupled to a prefetcher 1030 for updating the metadata 122 maintained within the first portion 124 of the cache memory 120 in response to requests 202 pertaining to addresses 204 of the address space and/or selecting data to prefetch into the second portion 126 of the cache memory 120 based, at least in part, on the metadata 122 maintained within the first portion 124 of the cache memory 120. The metadata 122 may include any suitable information pertaining to addresses of the address space, including, but not limited to: access characteristics, access statistics, an address sequence, address history, index table, delta sequence, stride pattern, correlation pattern, feature vector, ML feature, ML feature vector, ML model, ML modeling data, and/or the like. The prefetcher 1030 may include, but is not limited to: circuitry, logic circuitry, memory interface circuitry, cache circuitry, switch circuitry, switch logic, routing circuitry, routing logic, interconnect circuitry, interconnect logic, I/O circuitry, analog circuitry, digital circuitry, logic gates, registers, switches, multiplexers, ALU, state machines, microprocessors, embedded processors, PIM circuitry, a cache logic 210, prefetch logic 230, a stride prefetcher, a correlation prefetcher, an ML prefetcher, an LSTM prefetcher, and/or the like.

In some aspects, the component 1010 is configured to determine and/or monitor the metric 212 pertaining to the data prefetched into the second portion 126 of the cache memory 120, and to modify the size of the first portion 124 of the cache memory 120 in response to the monitoring. The component 1010 may be configured to increase the size of the first portion 124 of the cache memory 120 allocated for the metadata 122 (and decrease the size of the second portion 126) in response to the metric 212 being above a first threshold, or decrease the size of the first portion 124 (and increase the size of the second portion 126) in response to the metric 212 being below a second threshold. Alternatively, or in addition, the component 1010 may be configured to increase the size of the first portion 124 in response to a current size of the first portion 124 being below a metadata capacity threshold and one or more of: a) a prefetch performance metric 212 that is above a prefetch performance threshold and/or b) a cache performance metric 212 that is below a cache performance threshold. Conversely, the component 1010 may be configured to decrease the size of the first portion 124 of the cache memory 120 in response to the current size of the first portion 124 being above a prefetch capacity threshold and one or more of: a) a prefetch performance metric 212 that is below a prefetch performance threshold and/or b) a cache performance metric 212 that is above a cache performance threshold.

The component 1010 may be configured to allocate one or more cache units 220 to the first partition 1024. Allocating a cache unit 220 to the first partition 1024 (and/or first portion 124) may include configuring the metadata logic 1014 to address, reference, and/or otherwise provide access to the one or more cache units 220 for storage of the metadata 122 and/or removing, disabling, ignoring, and/or otherwise excluding the cache unit 220 from the address logic 1016. Conversely, allocating a cache unit 220 to the second partition 1026 and/or second portion 126 may include configuring the address logic 1016 to address, reference, and/or otherwise utilize the cache unit 220 as available cache capacity (e.g., for storage of cache data 128) and/or removing, disabling, ignoring, and/or otherwise excluding the cache unit 220 from the metadata logic 1014. Allocating a cache unit 220 to the first portion 124 may include evicting cache data 128 from the cache unit 220 and disabling a cache tag 326 of the cache unit 220. Allocating a cache unit 220 to the second portion 126 may include removing metadata 122 from the cache unit 220 and enabling the cache tag 326 of the cache unit 220.

The component 1010 may be configured to increase the size of the first portion 124 in response to a metric 212 that is above a first threshold). Increasing the size of the first portion 124 may include compacting the cache data 128 stored within the second portion 126. The component 1010 may be configured to preserve at least a portion of the cache data 128 maintained within the cache 110 when increasing the size of the first portion 124 (and decreasing the size of the second portion 126). In response to increasing the size of the first portion 124, the component 1010 may be configured to evict cache data 128 from a selected cache unit 220, the selected cache unit 220 to remain allocated to the second portion 126. The component 1010 may be further configured to move cache data 128 to the selected cache unit 220. The cache data 128 may be moved from a cache unit 220 that is to be allocated from the second portion 126 to the first portion 124.

Conversely, the component 1010 may be configured to decrease the size of the first portion 124 (e.g., in response to a metric 212 that is below a second threshold). Decreasing the size of the first portion 124 may include compacting the metadata 122 stored within the first portion 124. The component 1010 may be configured to preserve at least a portion of the metadata 122 when decreasing the size of the first portion 124. The component 1010 can be configured to reduce the amount of the cache memory 120 allocated for the metadata 122 from a first group of cache units 220 to a second group of cache units 220, the second group smaller than the first group. The component 1010 can be further configured to compact the metadata 122 for storage within the second group of cache units 220. The component 1010 may move metadata 122 stored within a cache unit 220 included in the first group of cache units 220 to a cache unit included in the second group of cache units 220.

Conclusion

Although implementations for adaptive cache partitioning have been described in language specific to certain features and/or methods, the subject of the appended claims is not necessarily limited to the specific features or methods described. Rather, the specific features and methods are disclosed as example implementations for adaptive cache partitioning.

The invention claimed is:

1. A method, comprising:
   allocating a first portion of a cache memory for metadata pertaining to an address space;
   writing data associated with addresses of the address space to a second portion of the cache memory different from the first portion of the cache memory; and
   modifying a size of the first portion of the cache memory allocated for the metadata pertaining to the address space based, at least in part, on a metric pertaining to data prefetched into the second portion of the cache memory.

2. The method of claim 1, further comprising:
   updating the metadata maintained within the first portion of the cache memory in response to requests pertaining to addresses of the address space; and
   prefetching data into the second portion of the cache memory based, at least in part, on the metadata pertaining to the address space maintained within the first portion of the cache memory.

3. The method of claim 1, further comprising maintaining within the first portion of the cache memory one or more of an address sequence, address history, index table, delta sequence, stride pattern, correlation pattern, feature vector, machine-learned (ML) feature, ML feature vector, ML model, or ML modeling data.

4. The method of claim 1, further comprising:
   monitoring the metric pertaining to the data prefetched into the second portion of the cache memory; and modifying the size of the first portion of the cache memory in response to the monitoring.

5. The method of claim 4, further comprising monitoring one or more of a prefetch hit rate, quantity of useful prefetches, quantity of bad prefetches, or ratio of useful prefetches to bad prefetches.

6. The method of claim 1, further comprising one of:
increasing the size of the first portion of the cache memory allocated for the metadata pertaining to the address space in response to the metric exceeding a first threshold; or
decreasing the size of the first portion of the cache memory allocated for the metadata pertaining to the address space in response to the metric being below a second threshold.

7. The method of claim 6, further comprising one of:
decreasing a size of the second portion of the cache memory in response to the metric exceeding the first threshold; or
increasing the size of the second portion of the cache memory in response to the metric being below the second threshold.

8. The method of claim 1, further comprising increasing the size of the first portion of the cache memory allocated for the metadata pertaining to the address space in response to the size of the first portion of the cache memory being below a metadata capacity threshold and one or more of:
a prefetch performance metric that is above a prefetch performance threshold; or
a cache performance metric that is below a cache performance threshold.

9. The method of claim 1, further comprising decreasing the size of the first portion of the cache memory allocated for the metadata pertaining to the address space in response to the size of the first portion of the cache memory being above a prefetch capacity threshold and one or more of:
a prefetch performance metric that is below a prefetch performance threshold; or
a cache performance metric that is above a cache performance threshold.

10. The method of claim 1, further comprising:
responsive to allocating a group of cache units of the cache memory for the metadata pertaining to the address space,
removing the group of cache units from an address mapping scheme, and
adding the group of cache units to a metadata mapping scheme.

11. The method of claim 1, further comprising:
responsive to allocating a group of cache units from the second portion to the first portion,
evicting cache data from cache units of the group of cache units, and
disabling cache tags associated with the cache units of the group of cache units.

12. The method of claim 11, further comprising:
evicting cache data from a selected cache unit, the selected cache unit to remain allocated to the second portion; and
moving cache data stored within a cache unit of the group of cache units being allocated from the second portion to the first portion to the selected cache unit.

13. The method of claim 1, further comprising reducing an amount of cache memory allocated for the metadata pertaining to the address space from a first group of cache units of the cache memory to a second group of cache units of the cache memory, the second group smaller than the first group, comprising:
compacting the metadata for storage within the second group of cache units;
moving metadata stored within a cache unit included in the first group of cache units to a cache unit included in the second group of cache units; and
allocating one or more cache units included in the first group of cache units to the second portion of the cache memory.

14. The method of claim 1, further comprising:
allocating a quantity of ways of the cache memory for the metadata pertaining to the address space; and
modifying the quantity of ways of the cache memory allocated for the metadata pertaining to the address space based, at least in part, on the metric.

15. The method of claim 14, further comprising:
dividing the ways of a set of the cache memory into a first group allocated for the metadata pertaining to the address space and a second group allocated for caching data associated with the address space; and
moving cache data from a way within the first group to a way within the second group.

16. The method of claim 1, further comprising:
allocating a quantity of sets of the cache memory for the metadata pertaining to the address space; and
modifying the quantity of sets of the cache memory allocated for the metadata pertaining to the address space based, at least in part, on the metric.

17. The method of claim 1, further comprising:
selecting a subset of the metadata pertaining to the address space in response to decreasing a capacity of the first portion of the cache memory from a first capacity to a second capacity smaller than the first capacity; and
storing the selected subset of the metadata pertaining to the address space within the decreased capacity of the first portion of the cache memory.

18. An apparatus, comprising:
a memory array configured as a cache memory; and
logic coupled to the memory array, the logic configured to:
allocate a first portion of the cache memory to store metadata pertaining to an address space,
determine a metric pertaining to cache data loaded into a second portion of the cache memory, the second portion different from the first portion, and
modify an amount of the cache memory allocated to the first portion based, at least in part, on the determined metric.

19. The apparatus of claim 18, further comprising partition logic configured to allocate a first group of cache units of a plurality of cache units of the cache memory to the first portion and a second, different group of cache units of the plurality of cache units to the second portion.

20. The apparatus of claim 19, wherein the cache units of the cache memory comprise one or more of memory units, blocks, memory blocks, cache blocks, cache memory blocks, pages, memory pages, cache pages, cache memory pages, cache lines, hardware cache lines, ways, rows of a memory array, or columns of a memory array.

21. The apparatus of claim 19, further comprising prefetch logic configured to:
store metadata pertaining to the address space within the first group of cache units;

determine addresses of upcoming requests based, at least in part, on the metadata stored within the first group of cache units; and write data corresponding to one or more of the determined addresses into the second group of cache units.

22. The apparatus of claim 19, wherein:

the cache memory comprises a plurality of sets, each set comprising a plurality of ways, each way corresponding to a respective cache unit of the plurality of cache units of the cache memory; and the first portion comprises one or more ways within each set of the plurality of sets.

23. The apparatus of claim 22, wherein, to increase the amount of the cache memory allocated to the first portion, the logic is configured to:

evict cache data from a selected way of a set of the plurality of sets;

move cache data from a designated way of the set to the selected way of the set;

disable a cache tag of the designated way; and include the designated way of the set in the first portion of the cache memory.

24. The apparatus of claim 19, wherein:

the cache memory comprises a plurality of sets, each set comprising a plurality of ways;

the first portion comprises a first group of the plurality of sets;

the second portion comprises a second group of the plurality of sets, the second group different from the first group; and to increase the amount of the cache memory allocated to the first portion, the logic is configured to:

evict cache data from a set of the second group, disable cache tags of each way included in the set, and include the set in the first group.

25. A system, comprising:

a cache memory comprising a plurality of cache units;

an interface configured to couple to an interconnect of a computing device; and logic coupled to the interface and the cache memory, the logic configured to:

partition the cache memory into a first portion and a second portion, the first portion allocated for metadata pertaining to an address space associated with a memory, and the second portion allocated for storing cache data corresponding to addresses of the address space, write metadata pertaining to the address space to the first portion of the cache memory, write data into the second portion of the cache memory based, at least in part, on the metadata written to the first portion of the cache memory, and modify an amount of the cache memory allocated to the first portion based, at least in part, on a metric pertaining to the data written into the second portion of the cache memory.

26. The system of claim 25, wherein the logic is further configured to:

allocate a first quantity of ways within each set of a plurality of sets of the cache memory to the first portion; and store the metadata pertaining to the address space within the first quantity of ways allocated within each set of the plurality of sets of the cache memory.

27. The system of claim 26, wherein the logic is further configured to:

allocate a second quantity of ways within each set of the plurality of sets of the cache memory to the second portion; and cache data associated with addresses of the address space within the second quantity of ways allocated within each set of the plurality of sets of the cache memory.

28. The system of claim 27, wherein to increase the amount of the cache memory allocated to the first portion, the logic is further configured to allocate a designated way within each set of the plurality of sets of the cache memory from the second portion to the first portion, including being configured to:

evict cache data from a selected way of a set of the plurality of sets;

moving cache data from a designated way to the selected way; and disable a cache tag of the designated way.

29. The system of claim 25, wherein the logic is further configured to:

allocate a first group of one or more sets of a plurality of sets of the cache memory to the first portion;

allocate a second group of one or more sets of the plurality of sets of the cache memory to the second portion, the second group different from the first group;

store the metadata pertaining to the address space within the first group of one or more sets; and cache data associated with addresses of the address space within the second group of one or more sets.

* * * * *